(12) United States Patent
Dutt

(10) Patent No.: US 10,062,354 B2
(45) Date of Patent: Aug. 28, 2018

(54) SYSTEM AND METHODS FOR CREATING VIRTUAL ENVIRONMENTS

(71) Applicant: DimensionalMechanics, Inc., Redmond, WA (US)

(72) Inventor: Rajeev Dutt, Redmond, WA (US)

(73) Assignee: DIMENSIONALMECHANICS, INC., Redmond, WA (US)

( * ) Notice: Subject to any disclaimer, the term of this patent is extended or adjusted under 35 U.S.C. 154(b) by 303 days.

(21) Appl. No.: 14/878,262

(22) Filed: Oct. 8, 2015

(65) Prior Publication Data

US 2016/0293133 A1 Oct. 6, 2016

Related U.S. Application Data

(60) Provisional application No. 62/062,790, filed on Oct. 10, 2014.

(51) Int. Cl.
*A63F 13/57* (2014.01)
*A63F 13/55* (2014.01)
(Continued)

(52) U.S. Cl.
CPC .............. *G09G 5/006* (2013.01); *A63F 13/55* (2014.09); *A63F 13/57* (2014.09); *A63F 13/67* (2014.09); *G06F 8/20* (2013.01); *G06F 8/38* (2013.01); *G06F 9/00* (2013.01); *G06F 9/455* (2013.01); *G06N 3/0472* (2013.01); *H04L 41/083* (2013.01); *H04L 41/0886* (2013.01); *H04L 67/10* (2013.01); *H04L 67/32* (2013.01); *H04L 67/38* (2013.01); *A63F 2300/6027* (2013.01);
(Continued)

(58) Field of Classification Search
None
See application file for complete search history.

(56) References Cited

U.S. PATENT DOCUMENTS 5,485,600 A * 1/1996 Joseph ..................... G06F 8/34
345/473
5,625,788 A * 4/1997 Boggs ................... G06F 9/3836
712/214
(Continued)

FOREIGN PATENT DOCUMENTS

WO WO 2006/119099 A1 11/2006

OTHER PUBLICATIONS

Int'l Searching Authority of the PCT; Notification of Transmittal of International Search Report & Written Opinion; dated Feb. 3, 2016; Appl. No. PCT/US15/54867; pp. 1-14.
(Continued)

*Primary Examiner* — Joni Richer
(74) *Attorney, Agent, or Firm* — Lane Powell PC

(57) ABSTRACT

Systems and methods for creating entities that operate within a virtual environment, where in some embodiments the entities are substantially autonomous in the sense that they are capable of communications and interactions with the environment and other entities. In some embodiments, the entities may be capable of interacting with an environment other than the one in which they were created and originally configured. In some embodiments, the entities may engage in interactions with other entities that operate to enable changes in behavior of one or both of the entities.

18 Claims, 30 Drawing Sheets
(11 of 30 Drawing Sheet(s) Filed in Color)

(51) Int. Cl.
| | |
|---|---|
| *G09G 5/00* | (2006.01) |
| *A63F 13/67* | (2014.01) |
| *G06N 3/04* | (2006.01) |
| *H04L 12/24* | (2006.01) |
| *H04L 29/08* | (2006.01) |
| *H04L 29/06* | (2006.01) |
| *G06F 9/00* | (2006.01) |
| *G06F 8/20* | (2018.01) |
| *G06F 8/38* | (2018.01) |
| *G06F 9/455* | (2018.01) |
| *G06N 7/00* | (2006.01) |
| *G06F 9/4401* | (2018.01) |

(52) U.S. Cl.
CPC ..... *A63F 2300/8082* (2013.01); *G06F 9/4411* (2013.01); *G06N 7/005* (2013.01); *G09G 2370/022* (2013.01)

(56) References Cited

U.S. PATENT DOCUMENTS

| | | | |
|---|---|---|---|
| 5,884,027 A | 3/1999 | Brush, II et al. | |
| 6,049,805 A | 4/2000 | Drucker et al. | |
| 6,377,263 B1 | 4/2002 | Falacara et al. | |
| 6,421,047 B1* | 7/2002 | de Groot | A63F 13/12 345/419 |
| 6,725,208 B1 | 4/2004 | Hartman et al. | |
| 6,757,736 B1 | 6/2004 | Hutchison et al. | |
| 6,792,606 B2 | 9/2004 | Halter et al. | |
| 7,036,082 B1 | 4/2006 | Dalrymple et al. | |
| 7,775,885 B2 | 4/2010 | Van Luchene et al. | |
| 7,814,154 B1* | 10/2010 | Kandekar | A63F 13/35 463/42 |
| 7,937,518 B2 | 5/2011 | Boyd et al. | |
| 7,944,448 B2 | 5/2011 | Iwamura et al. | |
| 8,066,571 B2 | 11/2011 | Koster et al. | |
| 8,127,297 B2 | 2/2012 | Hamilton, II et al. | |
| 8,257,173 B2 | 9/2012 | Bergelt et al. | |
| 8,412,662 B2 | 4/2013 | Ramic et al. | |
| 8,667,081 B2 | 3/2014 | Edeckeer et al. | |
| 8,751,203 B2 | 6/2014 | Falash et al. | |
| 8,825,187 B1 | 9/2014 | Hamrick et al. | |
| 8,878,877 B2 | 11/2014 | Bhosale et al. | |
| 8,881,254 B2 | 11/2014 | Applewhite et al. | |
| 9,224,218 B2* | 12/2015 | Pahwa | G06T 11/203 |
| 9,594,907 B2 | 3/2017 | Duke et al. | |
| 2004/0083389 A1 | 4/2004 | Yoshida | |
| 2004/0088392 A1* | 5/2004 | Barrett | G01C 21/26 709/223 |
| 2004/0199481 A1 | 10/2004 | Hartman | |
| 2005/0223102 A1 | 10/2005 | Zhang et al. | |
| 2007/0066403 A1 | 3/2007 | Conkwright | |
| 2007/0129148 A1 | 6/2007 | Van Luchene | |
| 2008/0120558 A1 | 5/2008 | Nathan et al. | |
| 2008/0220873 A1 | 9/2008 | Lee et al. | |
| 2008/0225718 A1 | 9/2008 | Raja et al. | |
| 2008/0280684 A1 | 11/2008 | McBride et al. | |
| 2012/0004041 A1 | 1/2012 | Pereira et al. | |
| 2012/0188256 A1 | 7/2012 | Lee et al. | |
| 2012/0274585 A1* | 11/2012 | Telfer | G06F 3/0488 345/173 |
| 2013/0159068 A1 | 6/2013 | Change et al. | |
| 2013/0232344 A1* | 9/2013 | Johnson | G06F 21/6218 713/193 |
| 2014/0094938 A1 | 4/2014 | Kihas | |
| 2014/0274370 A1 | 9/2014 | Shah | |
| 2014/0279800 A1 | 9/2014 | Anastasopoulos | |
| 2014/0317745 A1* | 10/2014 | Kolbitsch | H04L 63/1416 726/24 |
| 2014/0325406 A1 | 10/2014 | Rowe et al. | |
| 2014/0335948 A1 | 11/2014 | Jung et al. | |
| 2016/0012640 A1* | 1/2016 | Abraham | G06T 19/006 345/420 |

OTHER PUBLICATIONS

Int'l Searching Authority of the PCT; Notification of Transmittal of International Search Report & Written Opinion; dated Feb. 4, 2016; Appl. No. PCT/US15/54871; pp. 1-11.

Choo Tian Fook, et al. "A Novel Approach for Addressing Extensibility Issue in Collaborative Virtual Environment," The Computer Society, Sep. 2003, pp. 1-7.

F. Breant et al., "Towards Open Virtual Environments Interoperability," 1994, pp. 1-9, Jul. 1994.

* cited by examiner

| Event Header (created time, event identifier, expiry time, checksum, event size, source HDLB Id) | Applicable HDLB families |
|---|---|
| Security Context Data ||
| Event Signature ||
| Global Data ||
| Message Verb (1) | Verb Data |
| Message Verb (2) | Verb Data |
| Message Verb (3) | Verb Data |

| Message Verb (n) | Verb Data |
|---|---|

Figure 24

SYSTEM AND METHODS FOR CREATING VIRTUAL ENVIRONMENTS

CROSS REFERENCE TO RELATED APPLICATION

This application claims the benefit of U.S. Provisional Application No. 62/062,790, entitled "System and Method for Interactive Virtual Environment," filed Oct. 10, 2014, which is incorporated herein by reference in its entirety (including the Appendix) for all purposes.

BACKGROUND

A virtual environment is a computer based simulated reality that may depict real or fictitious entities, such as characters and objects, in a space in which the entities may interact with each other and where one or more external actors can interact with the objects in the space and/or other actors. Examples of a virtual environment (VEnv) may present visual, audio, haptic or other stimuli to an actor, e.g. a gamer or user, who, in turn, acts on (or interacts with) entities in the simulated reality through touch, gestures, or movement, or through equipment capable of translating human action into action on an entity inside the VEnv (such as a virtual reality (VR) headset). In some examples, an actor is represented within a VEnv as an avatar that may be perceived by other actors who are using the VEnv at the same time.

Other examples of VEnvs could include a space capable of hosting containers such as virtual machines that are capable of executing programs or performing functions. Another example could be a digital environment in which conditions exist for agents representing real or abstract entities to exist and interact with each other.

Virtual entities and virtual environments may be used to provide several different types of user experiences. These include, but are not limited to, simulations, models of the evolution of systems, and multiple forms of electronic games (such as contests, missions, development of a narrative, etc.). However, conventional systems and methods for generating these types of virtual experiences, while quite advanced when compared to prior generations, still have inherent limitations. This is because the conventional way of satisfying a desire for greater gaming complexity is to increase the capabilities of the hardware (such as by increasing processor clock speed, available RAM, improved memory management techniques, etc.) to allow a greater number (and complexity) of instructions to be executed. This means that in some cases available memory or bandwidth limitations (e.g., for multi-player games played by non-collocated players communicating over a communications network) may still have the effect of preventing certain types of entity behavior and/or environment characteristics. Similarly, conventional gaming or virtual entity/virtual environment systems do not deliver a satisfactory user experience when it is desired that the entities interact in ways that require some degree of autonomy or independent decision making. This is because the entities within the virtual environment are typically centrally defined and controlled, making independent actions more difficult to implement without harming the capabilities of other entities, such as by restricting resources that those entities may require.

As an example of a conventional architecture for implementing a virtual environment, FIG. 1 is a diagram illustrating an example of a system architecture for a conventional gaming or other similar system 1 for simulating a virtual environment. In this example, a three dimensional (3D) gaming system that generates a game 10 includes a game engine 20 that executes computer implemented instructions (i.e., software code) to generate and permit interactions with the game/environment. The game engine typically includes a physics engine for simulating the motion and state of objects in the game, as those are determined by fundamental principles of mechanics and motion. For example, Newtonian physics may be applied to the objects to determine their motion in interactions with a user, where that motion is based on a fictitious "mass" assigned to the object. Alternatively or in addition, a fluid dynamics model may be applied to the object if a fluid environment is simulated; this typically relies on data such as flow rate and fluid/environment viscosity parameters.

Because of data processing or other resource constraints, simplifications or approximations are often required when using the physics models. These reduce the precision of the simulation, but require less data processing and, therefore, the results may be obtained more quickly for use in real-time simulations. For example, collision detection is often applied to object interactions and the objects are simplified in a physical model, such as by use of a non-visible mesh or collision geometry; this is used to define the geometric shape of the object and is often different from a visual mesh that defines the appearance of the object. Additional examples of the physics or dynamics processing that may be applied to objects include force feedback, Brownian motion, finite element analysis, ragdoll physics, cartoon physics, vehicle dynamics, rigid body dynamics, and soft body dynamics, each of which place demands on the data processing and visualization display capabilities of the system.

Game engine 20 calls subroutines 42 and 44 in libraries 40 to perform the calculations on the physical models of the objects in the simulation to determine the motion and state of the objects within the environment. Game engine 20 and the subroutines 42 and 44 make systems calls to kernel 50 via system call interface 52. Kernel 50 provides operations management and an abstraction of hardware 70. Rendering engine 30 processes the state data for objects along with representational graphics data for the objects using 3D graphics libraries 46 in order to generate the graphics/images for a scene. The 3D graphics libraries 46, in this example, access a GPU (graphics processing unit), graphics RAM and a display controller via system call interface 52 of kernel 50.

In a typical example, a game user throws a ball in the simulated environment and a Newtonian physics subroutine is called to apply Newtonian physics to the physical model for the ball (e.g. a sphere with a known mass) based on the force vector imparted to the ball in order to determine its resulting velocity and trajectory. Once the trajectory is known, then a collision detection subroutine may be called to determine the interactions with other objects in the simulation. If it is determined that the ball object collides with a wall, for example, then, if the ball and the wall are sufficiently hard, a rigid body subroutine may be called to determine how the ball moves after encountering the wall. Note that physical characteristic are defined by a user or programmer for the virtual environment and the objects under simulation, e.g. size, mass, drag coefficients, resilience, or viscosity.

Additional subroutines may be applied to objects in the virtual environment under simulation. For example, a particle system subroutine may be applied that typically uses a large number of small graphical objects known as sprites to simulate chaotic systems, such as natural phenomena (e.g., smoke, fire or flowing water, chemical reactions, explosions, etc.). Typically, individual sprites or particles within the simulated environment are modelled using other elements of the physics simulation; for example, fluid dynamics models may be applied to each sprite object, where the number of particles that can be simulated is generally limited by the computing power of the hardware. Thus, for purposes of reasonable game play, explosions may need to be modelled as a small set of large particles, rather than as a more accurate simulation of a large number of fine particles if the computing power is insufficient to perform the necessary calculations within the time available (e.g., between video frames of a computer game); this naturally reduces the realism and precision of the simulation.

State and spatial data is also typically maintained for a virtual environment. This data may include the size and configuration of a virtual space, the position of objects within that space, the orientation of the objects, and the velocity/movement of the objects. The state may also include the position and orientation of a virtual camera, which typically represents the perspective of a user of the system and is often the perspective from which the graphics are rendered.

One example of state and spatial data is a scene graph that defines the logical and spatial representation of entities or objects in a graphical scene. A scene graph is often a collection of nodes in a graph or tree structure. A tree node typically has a single parent, but may have multiple child nodes, where the effect of a parent is applied to all of its child nodes. In this way, an operation performed on a group may be automatically propagated to its members. For instance, multiple shapes and objects may be grouped together to form a compound object that can be acted upon, e.g. moved, transformed or selected, in much the same manner as a single object. For example, a driver object may be related to a vehicle object through a scene graph so that the driver moves along with the vehicle in the scene.

Similar to scene graphs are Bounding Volume Hierarchies (BVHs) that may be used to define a spatial structure for collision detection and other purposes. A BVH is a tree of bounding volumes, such as spheres or boxes, which are sized to closely enclose an object. In a hierarchical BVH tree, each node has a defined volume that can contain the volumes of the nodes beneath it in the hierarchy. An entire graphical scene, for example, may be the root of a tree graphic whose volume encloses all of the volumes of the other nodes in the tree. This may be useful for simplifying collision detection because if an object's bounding volume does not intersect a moving object's bounding volume (i.e., there is no collision between the objects), then the objects below that node also don't intersect the moving object's bounding volume and may be eliminated from consideration as sources of further interactions (at least to a first approximation).

Spatial partitioning may also be utilized to divide the virtual space of a scene into regions that may be organized into a tree, such as a binary space partitioning (BSP) tree, and for organizing objects in a virtual scene. Storing objects in a space partitioning data structure facilitates some types of geometric queries, such as ray tracing in order to determine whether a ray intersects an object. For example, the structure of a BSP tree may store spatial information about the objects in a virtual scene, such as their ordering from front-to-back with respect to the virtual camera representing a viewer's perspective. It may also be used in scanline algorithms to eliminate polygons in a virtual scene that are out of the virtual camera's viewing frustum, which limits the number of polygons that must be processed during rendering. It may also be useful in collision detection for determining whether two objects are close to one another. Further, BSP trees are used by some 3D games to contain static geometry for a scene to correctly merge movable objects, such as doors and characters onto the background of a scene, and are often combined with depth buffering to manage depth coordinates in 3D graphics.

The graphical appearance of objects in a simulation is obtained from a renderer or rendering engine 30 that produces two-dimensional or 3D graphics based on the graphical characteristics defined by representational graphics data for each object. Examples of representational graphics data may include a 3D mesh that defines a shape of the object along with the width, length, depth, color, pattern, texture, surface scattering and shading, light sources and models for the object and its environment. The graphics engine 30 may be a graphics rendering pipeline that applies the object state information and the representational graphics data in a first stage to create a geometry of the graphics to be presented, which is then passed to a geometry stage.

The geometry stage computes a model of what is to be drawn, how it should be drawn, and where it should be drawn; the model is then transformed into a 3D view space where the virtual camera is positioned at the center or origin of the view space. In different implementations, this stage may be one pipeline stage or multiple stages divided into different functional groups. One or more light sources are usually applied in the process of transforming the model to illuminate the view space. Projection operations may be applied, such as orthographic and perspective projection. Orthographic projection is typically used to represent a 3D model in a two-dimensional space and reduces distortion by ensuring that parallel lines remain parallel even after transformation. Perspective projection is applied so that an object appears smaller when the object model position is distant from the virtual camera; i.e., the farther away the object, the smaller it appears (similar to the way distant objects appear smaller to the human eye). Clipping is typically applied to remove objects that are outside of a view box for the virtual camera and screen mapping determines the coordinates of objects that are within the view box. Finally, at a rasterization stage, the elements within the view box, including the lines that have been drawn and any models that have been transformed are translated into pixels or picture elements.

The game engine 20 and rendering engine 30 generally run on a processor board for a user's platform, such as a personal computer, game console, or supercomputer. The amount of processing power available in the hardware platform 70 generally determines the precision of the simulation that the platform can support. The processors may include multiple cores, such as a multi-core microprocessor, to provide additional processing power for the physics processing and/or graphics processing. Additional processors, such as a dedicated physics processing unit (PPU) or a graphics processing unit (GPU), may be provided for hardware acceleration of the physics calculations. A GPU is also typically provided for computer graphics and image processing to more rapidly manipulate and modify memory to create images in a frame buffer for output to a display.

As mentioned, a conventional virtual environment, such as a video game, is typically generated and controlled by computer code hosted on an actor's machine, e.g. a gaming console, or remotely on one or more computers connected through a network. The computer code governs the behavior of the entities in the virtual environment, such as how the entities are displayed and how they respond to interaction with actors or other entities. The behavior and complexity of the virtual entities is generally limited by the performance capabilities of the combined computer code, execution platform, and communications network(s). For example, the networks may be limited by technical constraints on bandwidth or the number of users, which can impact the behaviors and interactions that the virtual entities are capable of demonstrating in an effective manner.

Conventional virtual environments are also commonly unable to update the controlling computer code while it is being executed (i.e., it is running). Further, the behavior of the virtual entities is often limited to the set of behaviors defined by the controlling computer code. In addition, it is often difficult or impossible for virtual entities hosted on different platforms or defined by different sources to interact with one another or to form ad hoc connections with each other. The ability to implement security controls, external data access, customizable storage, and input and output involving arbitrary sources is also limited. An actor in such a virtual environment is also generally unable to specify computing resource requirements based on their operational needs, and the resources may have limited or no ability to scale with the number of users, virtual entities, or virtual environments.

Conventional virtual environments also lack the ability to enumerate and address the virtual entities that are contained within the virtual environment. This typically forces an actor/user to navigate through a virtual environment in order to locate a desired virtual entity, unless the actor is provided with specific information on where to find the virtual entity within the virtual environment.

These constraints limit the complexity of virtual entities and the interactions they are capable of, both with other entities and with a virtual environment. These limitations also restrict how the virtual environment may be used and whether and how virtual environments from different sources can interoperate, which makes it difficult to build extensible virtual environment networks that can scale efficiently.

Embodiments of the invention are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the inventive system and methods are directed to systems and methods for creating entities that operate within a virtual environment, where in some embodiments the entities are substantially autonomous in the sense that they are capable of communications and interactions with the environment and other entities. In some embodiments, the entities may be capable of interacting with an environment other than the one in which they were created and originally configured. In some embodiments, the entities may engage in interactions with other entities that operate to enable changes in behavior of one or both of the entities.

In one embodiment, the invention is directed to a system for generating a virtual environment including one or more virtual entities, where the system includes:

an element that operates to couple an electronically executable process configured to manage the virtual environment to a process to control the allocation of one or more resources of an electronic data processing system;

the process to manage the virtual environment, wherein the process operates to generate one or more entities that are represented in the virtual environment; and the one or more entities, wherein each entity is associated with an electronically stored data structure and wherein the associated data structure includes an event handler, executable logic, and data storage.

In another embodiment, the invention is directed to a virtual environment system for providing access to virtual entities for multiple users, where the system includes at least one server configured to:

communicatively connect to at least one communication network, the communication network providing communication to user devices for interfacing with virtual entities in the virtual environment system;

support a kernel environment that controls at least one of a physics engine, a gaming engine, a rendering engine, data input and output, a runtime, database access, and storage access;

support a core data structure having modules, wherein each module corresponds to a virtual entity and includes behavior logic and representational data for the corresponding virtual entity;

create a virtual entity by instantiating the core data structure, creating a foundation runtime for the core data structure configured to execute the behavior logic imparted by the module corresponding to an entity to the entity, and communicate with other core foundation runtimes;

support event messaging between a first and a second virtual entity and between a virtual entity and the virtual environment by, responsive to detecting an event message, identifying an instantiated core data structure to which the event message is registered, forward the event message to the identified core, and process the event message in accordance with logic defined in the core data structure for handling the received event message;

render representational data for the virtual entity for presentation to at least one user external to the virtual environment; and provide at least one interface for the one user to perceive the virtual entity.

Other objects and advantages of the present invention will be apparent to one of ordinary skill in the art upon review of the detailed description of the present invention and the included figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the invention in accordance with the present disclosure will be described with reference to the drawings, in which:

FIG. 24 is a diagram illustrating an example of the format and content of a typical "event" packet;

Note that the same numbers are used throughout the disclosure and figures to reference like components and features.

DETAILED DESCRIPTION

Figure 1:
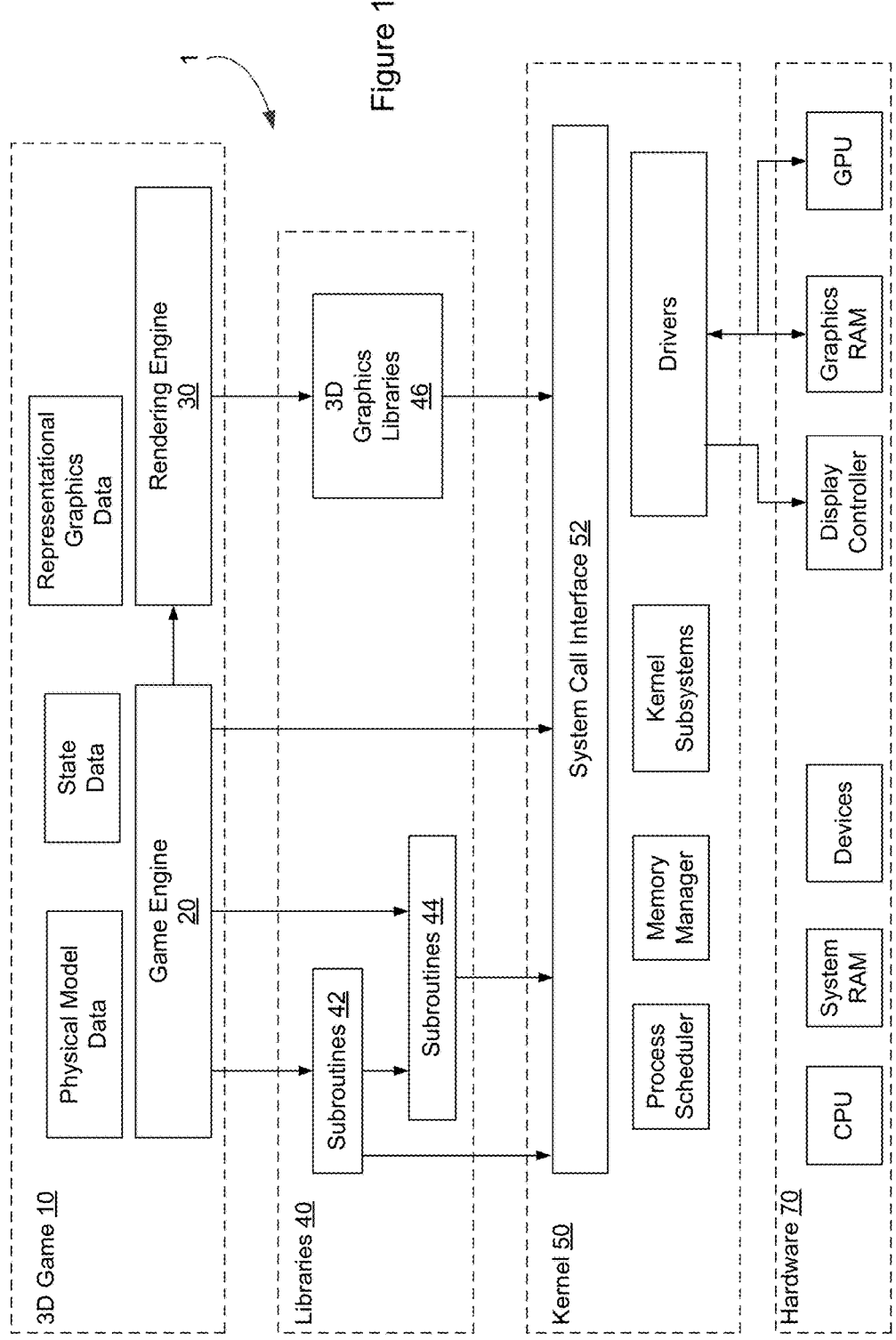
FIG. 1 is a diagram illustrating an example of a system architecture for a conventional gaming or other similar system 1 for simulating a virtual environment.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that are part of a client device, server, network element, or other form of computing or data processing device/platform and that are programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Disclosed herein are systems and methods that permit the creation and management of a virtual environment and of entities existing and operating within such environments. An exemplary embodiment of a virtual environment system or platform that enables the creation of, modification of, interaction with, perceiving of, and destruction of largely independent interacting entities is described herein. The entities in this (and other) embodiment(s) may be independently/individually programmed to demonstrate individual and intrinsic behavior(s), were such behavior(s) may be caused to adapt or vary based on interactions with other entities and/or with a virtual environment.

Prior to providing further details regarding one or more embodiments of the inventive system and methods, it is noted that the following terms have at least the indicated meanings:

| Term | Meaning |
| --- | --- |
| C-Core | A logically distinct application domain that sits within a VEnv |
| Class | A module creates a class or classes of HDLBs. A HDLB can belong to one or many classes. |
| Event | A transportable data object that implements one of three verbs: Query, Notify, Execute |
| Module | A compiled executable service that resides in a C-Core that is capable of generating one or more HDLBs (virtual entities) |
| HDLB | Heuristic Digital Logic Block (HDLB)—an atomic data entity that can represent abstract or visible data as well as accompanying intelligence to go along with it |
| VEnv | Virtual Environment corresponding to a given instance of the inventive platform |
| VR | Virtual Reality |

The exemplary virtual environment system described herein provides a framework or infrastructure for designing, modifying, instantiating and destroying virtual entities (an example of which is referred to herein as "Heuristic Digital Logic Blocks" or "HDLBs"), as well as the mechanisms and services to enable such entities to interact with one another and/or with human or machine actors using a variety of devices and external resources (including, for example, virtual and non-virtual objects using an appropriate mechanism). HDLBs represent a class or type of virtual entity that has a structure and elements that enable a HDLB to function as a semi- or fully autonomous entity within a virtual environment. This functionality results from the combination of structure, functional capabilities, and data that may be part of a HDLB, as is described in detail with reference to FIG. 4($b$). Although reference is made to the properties and characteristics of HDLBs, note that the concepts, techniques, and implementation details discussed are applicable to other forms of virtual entities (such as those having different structure, functions, or characteristics).

In some embodiments, the inventive system may accept code or executable binaries from an authorized developer to enable the creation of one or more virtual entities and provide a framework for the entities to interact with one another, and if desired, with external resources or objects. In some embodiments, the inventive system may enable an authorized actor or user to perceive and interact with these and other virtual entities using a plurality of devices, access methods, and techniques. The inventive system may be implemented using one processing unit, multiple processing units, and/or with a network of processing units, along with software instructions (code) executing on the processing units to enable control of the virtual environment framework and the input and output devices that permit perception of, and interaction with, one or more virtual environments.

In some embodiments, a computer system/platform that generates one or more Virtual environments (VEnvs) may be updated/modified while running. In some embodiments, Heuristic Digital Logic Blocks (HDLB) are virtual entities/objects defined in a computer system based simulated (virtual) reality, and which may be assigned new or customized behaviors by developers or users. In some embodiments, the HDLBs created by one user or environment may be shared with other users of the system and/or may be capable of functioning in a VEnv that is different from the that in which they were originally created.

In some embodiments, the inventive system may enable virtual entities originating from different sources or platforms to interact with one another, allow actors to navigate between disparate and unrelated VEnvs, provide secure access and authentication control to, and auditing of, the VEnv and the entities contained within it, among other capabilities. Some embodiments may provide an actor/user with permanent or temporary storage of data related to VEnvs or HDLBs. Some embodiments may allocate predefined computation resources to a VEnv and/or dynamically allocate computational resources on demand or permit resources and data pertaining to a VEnv to be shared among multiple actors. Some embodiments may permit a developer to create HDLBs with behavior(s) that extend the behavior and functionality of the underlying system or platform and share such HDLBs with other actors.

In some embodiments, the inventive system may accept raw code or compiled code from an authorized developer and in response produce HDLBs that may be utilized by a suitable capable device and be displayed to the actor/user with no special requirements being placed on the actor. This capability may be termed a "write once deploy everywhere" feature. Further, each HDLB may be associated with a unique address, identifier, or locator that enables an actor to uniquely access the HDLB without conducting a manual search.

In some cases, a set of HDLBs are capable of forming a network wherein each HDLB maintains a local index (table) of "known" HDLBs, typically using a set of HDLB identifiers. In such a situation, if a search request is issued and received by one HDLB, then the HDLB internal logic is able to pass the request to the known HDLBs in its index; this passing of a message, microcode, event data, etc. to one or more HDLBs known to a specific HDLB, and then repeating the process for each HDLB that receives the message, microcode, or event data, provides a mechanism for information to be spread throughout a larger network in an efficient manner. In some embodiments, this allows the HDLBs to form what is termed a "small world" network. In a typical situation, each HDLB goes through its table of known HDLBs and sends out events to these; the recipient HDLBs in turn send out event(s) to their known HDLBs, and so on until a search query, notification, or code revision is received and acted upon by one or more intended recipients. In this way, a search can return a result in a time proportional to Log (N), where N is the number of nodes or HDLBs in the network. Similarly, when updating, patching, or revising code or executable instructions, one or more HDLBs can send out cascading events that include microcode to update other HDLBs; this can occur exponentially fast as well (i.e., proportional to a time period of Log(N)). Note that in these embodiments, there is no central updating or broadcast mechanism. Instead, the microcode update spreads exponentially through the system. Similarly, notifications/communications may be spread in a time proportional to Log (N). This provides for a very efficient transfer of information, data, microcode, notifications, etc. among a scalable network.

Embodiments of the inventive system and methods may be used to create a VEnv and enable multiple unrelated actors, who may or may not have knowledge of each other, to construct a network of virtual entities that are capable of interacting with each other in multiple ways. Some embodiments may include the capability to construct and interact with virtual entities that are abstract representations of underlying data or information, where such entities can only be perceived and/or manipulated by authorized actors or other virtual entities. This may allow the modeling of complex interdependent networks or systems in which a set of semi-autonomous or fully autonomous nodes operate to make decisions, perform complex data processing functions, or optimize relationships within a network. Applications of such a network of virtual entities may include electoral or econometric modeling, optimization of signal transmission through a set of switching nodes, etc.

Another embodiment may represent a situation where two distinct HDLBs, each created by creators who have no knowledge of each other at the point of creation, discover at some point after the creation of their respective HDLBs that they can benefit from their respective HDLBs being able to interact and/or share some subset of information accessible by each individual HDLB. This may represent a form of communication and/or data transmission between independently created HDLBs. Another embodiment may include the capability for an actor to transit from one VEnv to another in a consistent and predictable way that allows them to retain access and/or control over their virtual entities. Still another embodiment may enable the virtual entities in a VEnv to interact with each other in a more realistic way because each entity has its own ruleset that can be customized for the type, size, shape, perceptual characteristics or composition of the virtual entity and/or the environment.

In one embodiment of the inventive system and method, a set of services is hosted on a computing device/platform or network of computing devices and provides capabilities to create, modify, host and interact with virtual entities. The set of services may include capabilities to execute logic in a function rich runtime. The set of provided services may enable interaction with virtual entities, the provision of security and access controls for a virtual entity, and networking, storage, input and output, graphics rendering and management capabilities for users. Other services may include hosting virtual entities that are programmable and have underlying logic that can be executed in the runtime. In some embodiments, a developer may create, modify or remove a virtual entity from the system/platform hosting the services using one of multiple computer programming languages.

In some embodiments, the created virtual entities may be programmable and capable of exhibiting independent and/or intrinsic behavior(s). In some embodiments, virtual entities may interact with one another based on (and using) their underlying logic. Some embodiments may support virtual entities that are perceivable using one or more computing devices or visualization methods. Some embodiments may include software and/or hardware "adaptors" that enable the perception of, or interaction with, virtual entities using computing devices. In some embodiments, the virtual entities may be uniquely addressable.

In some embodiments, application programming interfaces (APIs) may be provided by the services/platform to enable applications, programs or systems to make use of the services programmatically. In some embodiments, the services may be accessible through multiple communication methods. In some embodiments, multiple instances of the services may exist simultaneously and instances may be selectively enabled to interact with each other or selectively prevented from interacting with one another.

In some embodiments, if multiple instances of a service or services exist and can interact with one another, then an actor/user interacting with one instance may locate a virtual entity hosted by another of the connected instances using the addressing system that is used by the instances. In some embodiments, access controls may be placed on the instances and virtual entities may selectively restrict access to the entity by a single actor or group of actors. In some embodiments, virtual entities may interact with other virtual entities or entities external to the services. In some embodiments, one or more of the virtual entities may exhibit independent behavior with or without actor interaction.

Although much of the description of one or more embodiments of the inventive system and methods may relate to the construction of virtual environments and virtual entities, it should be noted that the described techniques, system architectures, and processes may be used to construct a distributed network of autonomous agents, each with certain basic capabilities and functionality, and also with agent specific qualities. Further, each agent may belong to one or more sub-groups, sets, etc., which do not include all of the agents. In some cases, such agents may function as an operating entity (such as a node) in a simulated communications network, computing network, transportation network, social network, etc. As will be discussed in greater detail, a key aspect of the inventive system is that because of certain qualities/capabilities of the created virtual entities, those entities are capable of moving between networks and establishing communications and participating in interactions such as network monitoring, collecting data, detecting events, self-organization, etc.

From one perspective (although a relatively higher level one), an embodiment of the inventive system comprises a cloud-based federated operating system that enables the creation of, management of, and communication between custom virtual spaces that in turn host objects that are capable of exhibiting certain types of functionality. This functionality or capabilities include the ability to ingest, manipulate and output streams of data necessary for an actor (human or machine) to interact with a highly immersive environment using devices such as an augmented reality headset or a VR headset. Note that in a typical embodiment of the inventive system, there is no centralized server, but instead embodiments of the inventive server/platform can theoretically connect to any other server using a series of lookup tables. This decentralized model allows the overall system to scale more efficiently and effectively than conventional architectures. Communications with the inventive server(s) is typically through a device that is optimized for high bandwidth communications, computationally intensive operations, and portability. In some embodiments, the server(s) provide a universal I/O and computational layer that enables distributed computation and I/O across multiple machines spanning multiple physical locations.

The architectural design and implementation of the inventive system described herein is capable of providing one or more of the following benefits to users and overcoming the noted disadvantages of conventional approaches:

1. Efficiently providing high fidelity, rich content via optimization of the client to minimize downloads, with extensive processing handled by the cloud environment platform;
2. Enabling real-time interaction via optimization of the client to minimize downloads, real-time event propagation, and cloud-based operations;
3. Accommodating increasingly complex workflows that demand ever richer integration across functionally disparate applications via efficient update of "nodes" in the system to enable interaction with content (as described with reference to microcode transmission between HDLBs, for example);
4. Addressing the potential problem of high volumes of data created and maintained in unsearchable silos by enabling each data node to be intelligent and include search logic that evolves over time based on the class of the data node; and
5. Providing ubiquitous availability via a cloud-based platform that is accessible anywhere and at any time.

Figure 2:
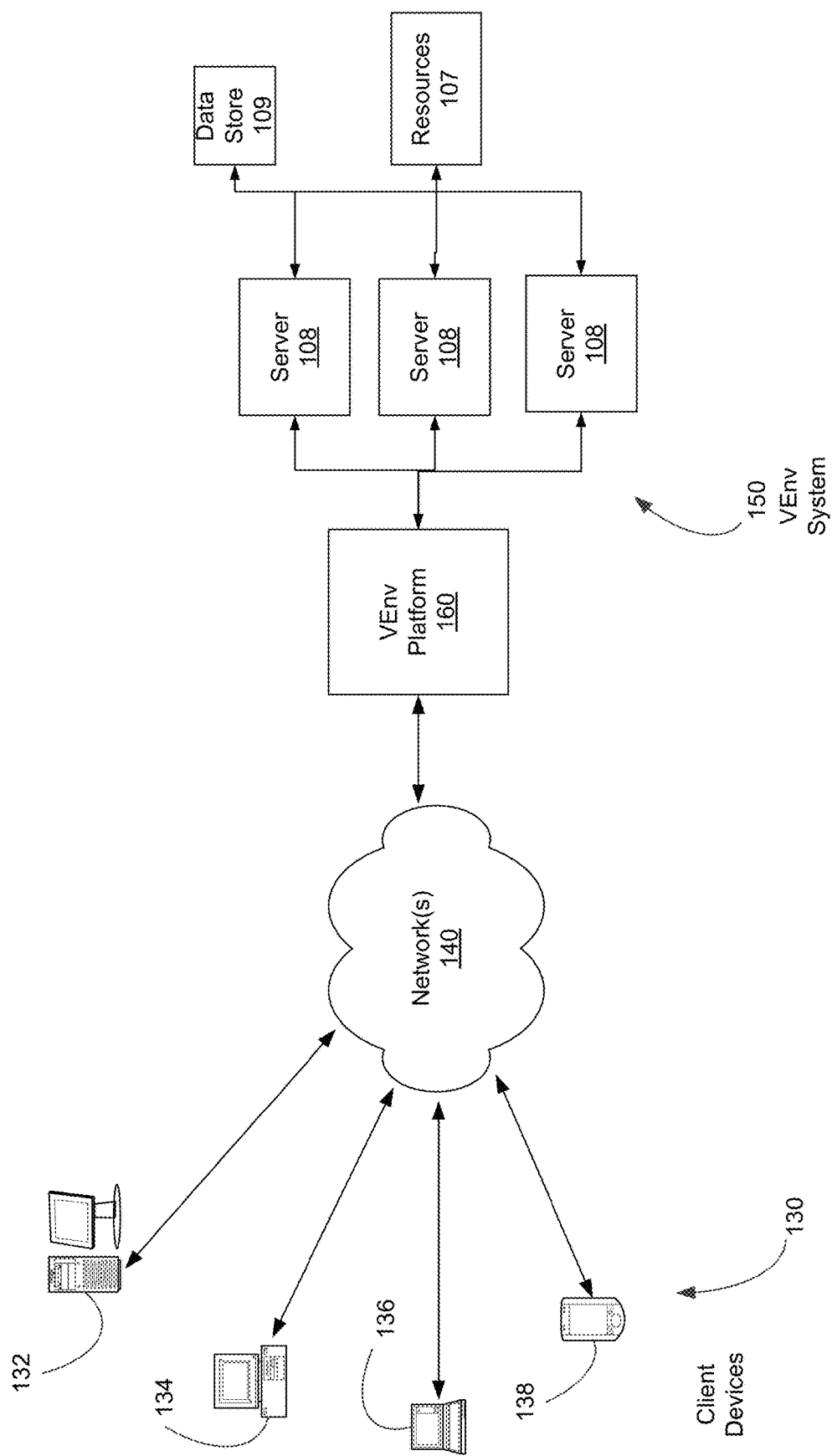
FIG. 2 is a diagram illustrating aspects of one example of a computing network architecture in which an embodiment of the invention may be implemented.

FIG. 2 is a diagram illustrating aspects of one example of a computing network architecture in which an embodiment of the invention may be implemented. As shown in the figure, a variety of clients 130 incorporating and/or incorporated into a variety of computing devices 132, 134, 136 and 138 may communicate with a VEnv system or service 150 through one or more networks 140 (such as, or including the Internet). For example, a client may incorporate and/or be incorporated into a client application (e.g., software) implemented at least in part by one or more of the computing devices. Examples of suitable computing devices include game consoles, personal computers, server computers, desktop computers, laptop computers, notebook computers, personal digital assistants (PDAs), smart phones, cell phones, and consumer electronic devices incorporating one or more computing device components (such as one or more processors, central processing units (CPU), or controllers).

Examples of suitable networks 140 include networks utilizing wired and wireless communication technologies and networks operating in accordance with any suitable networking and/or communication protocol (e.g., the Internet). One of ordinary skill in the art will recognize that other computing devices and/or communication networks may be used to implement the inventions described herein.

In the illustrated example embodiment, the VEnv system 150 includes a VEnv platform 160 that communicates with one or more client devices 130 via network 140, and serves as a front-end to one or more servers 108. VEnv platform 160 hosts a VEnv kernel that interacts with the servers 108, data store 109 and other resources 107 to generate and permit interaction with a virtual environment. Note that in some embodiments, system 160 may be integrated into one or more of the servers 108.

Figure 3:
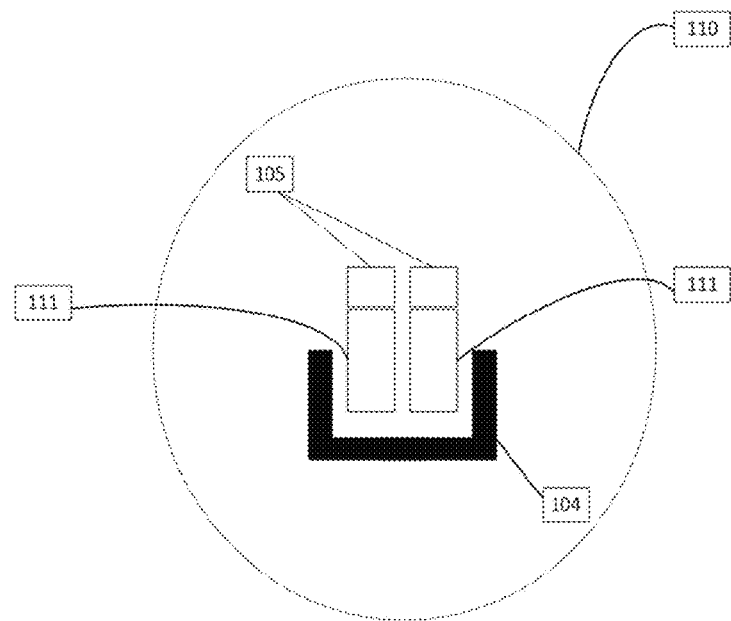
FIG. 3 is a diagram illustrating a simplified example of a Constructor 110, which is a virtual entity program unit or structure.
Figure 4A:
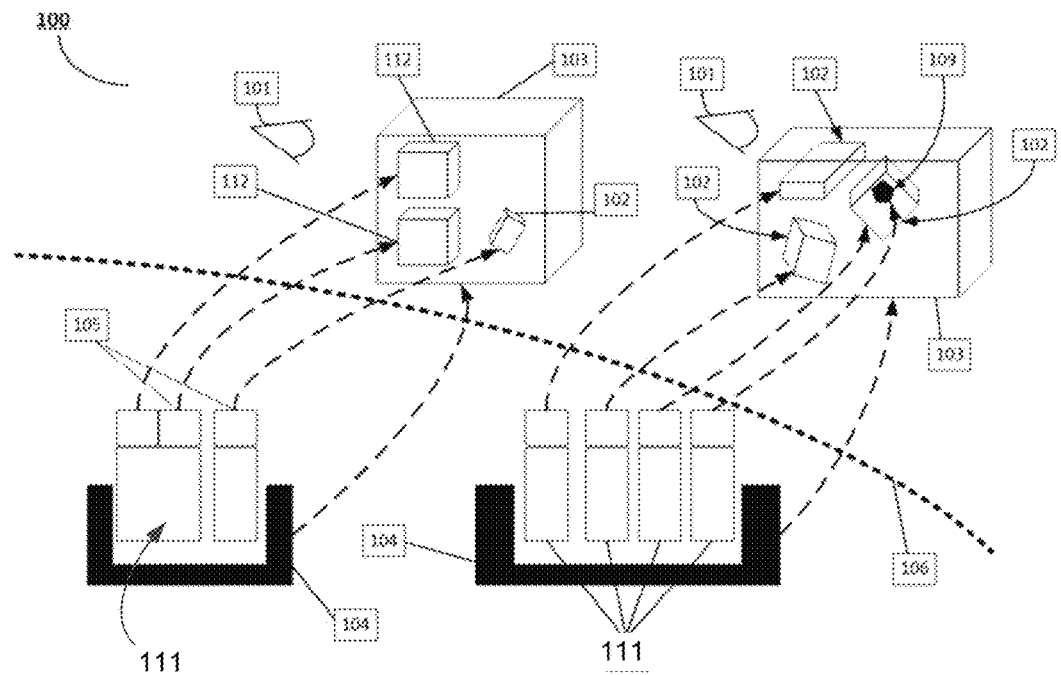
FIG. 4(a) is a diagram illustrating the relationship between an example C-Core 104, a user 101, and the virtual entities and/or virtual environment perceived by the user.

FIG. 3 is a diagram illustrating a simplified example of a Constructor 110, which is a virtual entity program unit or structure that resides in a virtual environment (VEnv) and includes, in this example, a Constructor Core (C-Core) 104, Modules (Mods) 111, and HDLBs/Virtual Entities (VE) 105. A Constructor Core (C-Core) 104 is a data construct representing a virtual space that provides a framework for the virtual space, including libraries, tools and services, as well as virtual physical characteristics (e.g., dimensions, size and configuration). The libraries and resources of C-Core 104 are used by one or more Modules (Mods) 111 contained within the Constructor 110 to instantiate virtual entities HDLBs 105 and ultimately to produce an interactive representation 103 of the HDLB perceptible to one or more actors/users 101, as illustrated in FIG. 4(a) (which is a diagram illustrating the relationship between an example C-Core 104, a user 101, and the virtual entities and/or virtual environment perceived by the user). Each Mod 111 may be configured to create one or more HDLBs 105, depending upon the program used to create them. As noted, an HDLB is an example of a type of virtual entity that may be created within the inventive system.

In the example illustrated in FIG. 4(a), C-Core 104 includes two Virtual Entities (HDLBs) 105. Each HDLB 105 is an instantiated simulation object in VEnv 100 based on a corresponding Mod 111 that defines the applicable behavioral rules, perceptual characteristics and other properties of the virtual entity. The combination of the C-Core 104, HDLBs 105, and Modules 111 make up Constructor interface entity 110 of FIG. 3, which is capable of passing instructions to a VEnv Kernel.

Figure 5:
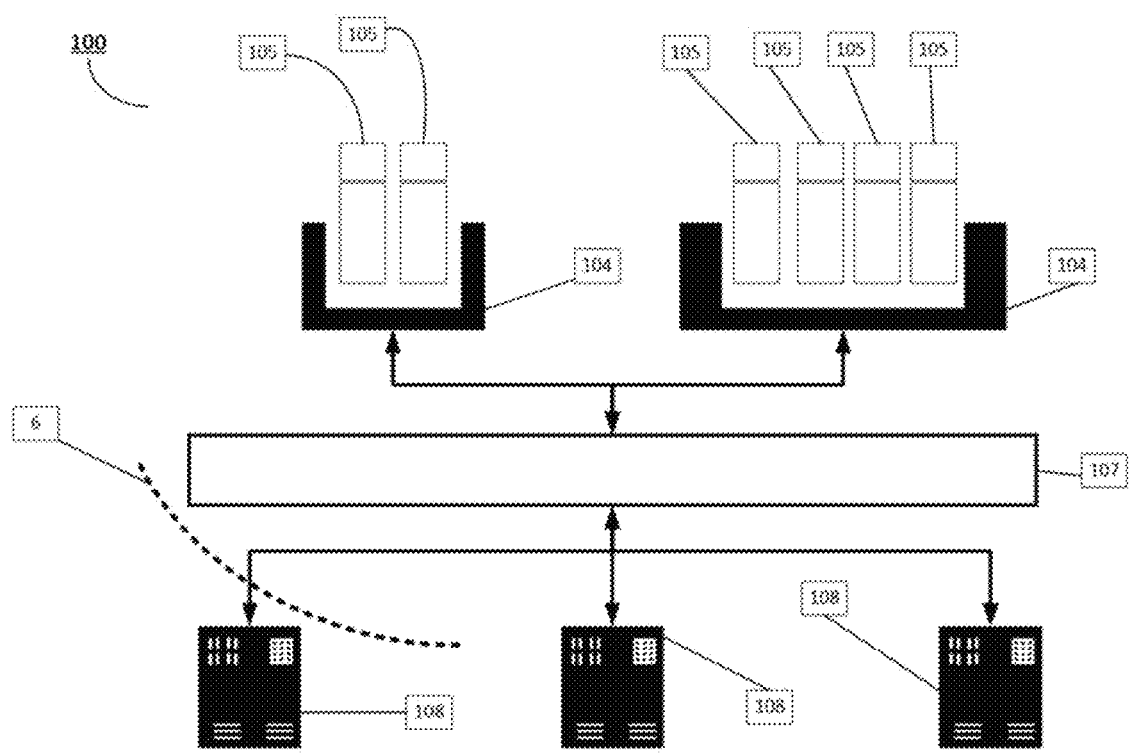
FIG. 5 is a functional block diagram illustrating an example of a VEnv Kernel (VEnvK) 107 that may be utilized when implementing an embodiment of the inventive system and methods.

Each Module (Mod) 111 is an abstract entity representing/defining a set of rules governing the behavior of the corresponding HDLB 105, as well as its perceptual characteristics and properties. An HDLB is created by the actions of a module, but once created, due to its characteristics and structure, it is independent of the module and largely autonomous. C-Core 104 is an actor/user defined framework containing libraries, tools, and services utilized by a set of Modules 111 and common to those Modules (note that depending upon the actor/user, C-Core 104 may be defined by default, by selection from a set of pre-defined categories, or by a system or platform operator based on information provided by the user). As an example, C-Core 104 may contain a template upon which the Modules 111 are based. Constructor 110 is an entity capable of passing instructions to the VEnv Kernel servers or processing elements. In some embodiments, it comprises a C-Core 104, a set of Modules 111, and HDLBs 105 that are capable of passing instructions to the VEnv Kernel 107, as shown in FIG. 5.

As shown in FIG. 4(a), VEnv 100 is created by the actions of instantiated C-Core(s) 104, each of which produces a perceptible virtual space 103 and where instantiated HDLBs 105 within a C-Core 104 produce a perceptible interactive entity 102, 112 that may be interacted with, viewed, or otherwise perceived by one or more actors 101. Interactive perceivable domain objects 102, 112 are rendered for presentation to users or actors 101 using one or more devices capable of producing perceivable representations of real or abstract entities, as will be described with reference to FIG. 15. A perceptible representation is a representation that can either be comprehended by a human being or by a machine and may use (by way of example, but not limitation), vision, sound, touch, smell, taste and other ways of being perceived. Note that in some sense, each perceivable domain object 102, 112 is a virtual entity representing a region of the virtual environment possessing its own set of rules and/or properties. These rules and properties may operate to place constraints on the virtual entities.

As described, each C-Core 104 defines a virtual space in a virtual environment and is rendered for perception as virtual space representation 103, in accordance with the definitions and rules provided by the C-Core 104. The instantiated virtual entities/HDLBs 105 in each C-Core 104 are rendered for perception as perceptible domain objects 102, 112. Note that for some Modules 111, multiple HDLBs 105 may be instantiated with multiple perceivable domain objects. For example, multiple business processes with similar characteristics can be instantiated from one module, or multiple documents of a specific document type and/or format can be instantiated from the same module.

As described, a Heuristic Digital Logic Block (HDLB) is created in a virtual space through modules that exist within the context of the virtual space. Once a HDLB has been created, it exists independently of the virtual space that created it. This is a result of a HDLB containing sufficient internal logic to allow it to interact with HDLBs that were created in other C-Cores. To achieve this degree of autonomous operation (either partial or full), an HDLB includes certain components, processes, or functionality—these exist as part of its "Core" layer (as described in greater detail with reference to FIG. 4(b)), and may include one or more of the following elements or structures:

A resource requester/allocator;
  In some embodiments, this is part of the HDLB root runtime—it is used to allocate resources to the HDLB by communicating with the underlying system/host platform to reserve computational resources (such as processor capacity, data storage, memory, etc.);
A security subsystem that handles access as well as incoming code updates;
  In some embodiments, this is part of the HDLB root runtime—it is uses a claim based or other type of security model to control/restrict access to the different parts of the HDLB structure and functionality;
  Also part of the HDLB root runtime is a process that operates similar to a "virus scanner" to inspect incoming code updates to determine if they are legitimate/safe;
Internal data/information storage;
  A storage block that communicates with the resource allocator to reserve storage space for HDLB data;
A communication capability based on the emission and reception of "events";
  In some embodiments, this is part of the HDLB root runtime—it is capable of receiving and sending events, and typically "listens" for events on a given port. Also use to send outgoing events to the local event handler (i.e., one associated with the C-Core in which the HDLB is currently residing);
One or more applicable encryption algorithms;
  This is part of the HDLB security subsystem;
A code/microcode compiler;
  This operates to compile incoming microcode, and is typically part of the HDLB root runtime;
A unique label/identifier;
  This is typically embedded in the Root Metadata block; and
One or more self-optimization components that update internal logic on a continuous or regular basis;
  Typically executes in the HDLB Root Runtime Block;
  May use one or more of a genetic algorithm, linear programming model, or code directed a-cyclical graph optimization (e.g., to reduce the number of branch decisions to get to target values) to rewrite internal logic. In some embodiments, uses an observer system and a sandbox, operates as a low priority process, and resides in the HDLB Root Runtime Block.

Note that with regards to resource allocation, a HDLB requests one or more resources through the C-Core that it is in (either the one that created it, or one that it has moved to). The C-Core then requests the data from the underlying system components or elements (e.g., physical hardware, operating system (OS), distributed memory, etc.).

In some embodiments, an HDLB is able to update its own code without shutting itself down. It may do this by creating a parallel logic block, which processes new requests while gradually shutting down the older instance of itself as requests that were in-flight are processed. Note that during the update process, the HDLB will require additional resources to maintain two instances of itself.

Figure 4B:
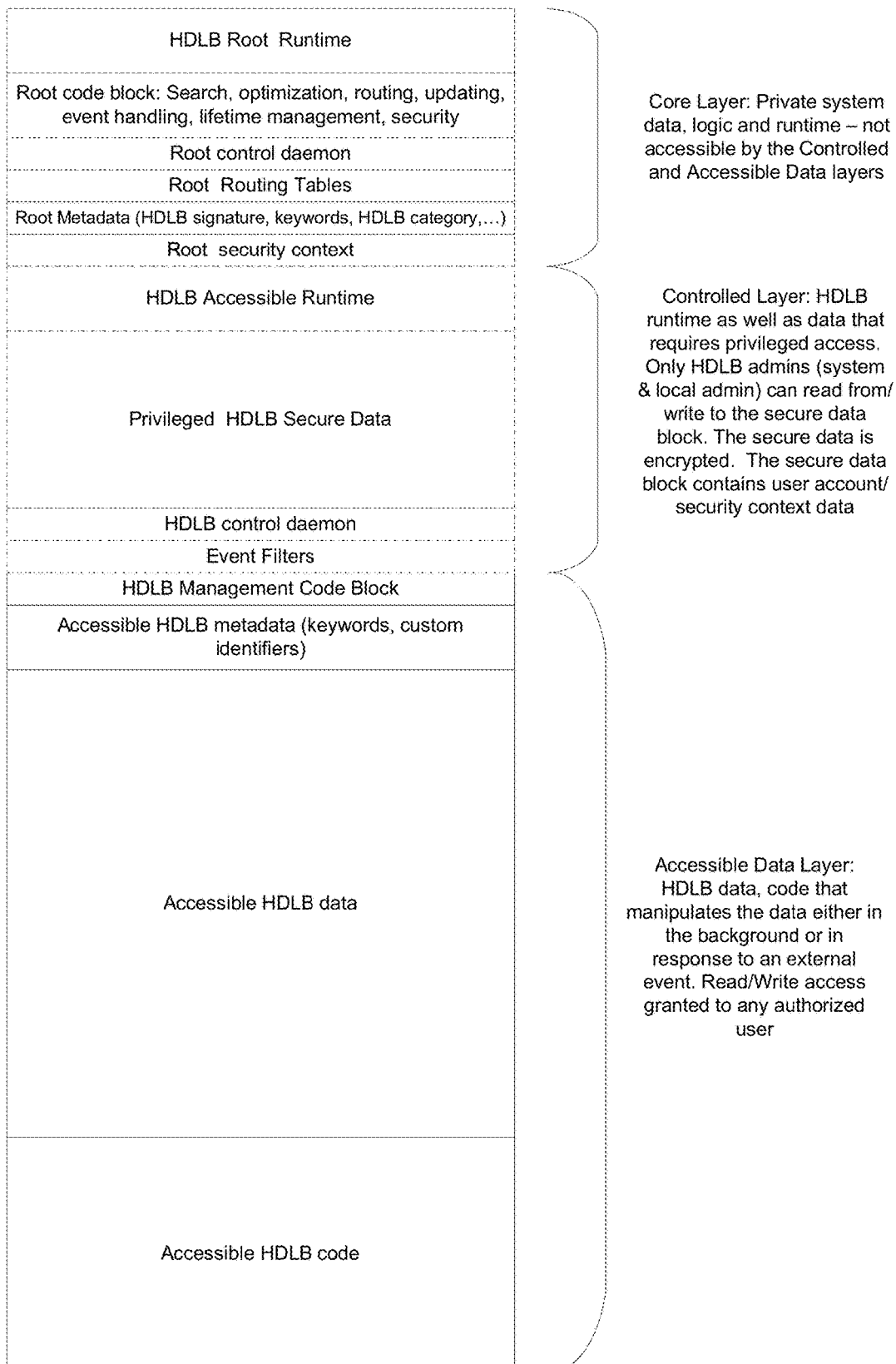
FIG. 4(b) is a diagram illustrating the structure and contents of an example of a virtual entity (HDLB) that may be created in an embodiment of the inventive system.

FIG. 4(b) is a diagram illustrating the structure and contents of an example of a type of virtual entity (a HDLB) that may be created in an embodiment of the inventive system. As shown in the figure, a typical HDLB may consist of a Core Layer that the system will attach to code that has been compiled to run in the system. The Core Layer contains private data that typical users won't be able to access, as well as system logic. This logic may include basic system APIs, security context, private runtime, etc. The Controlled Layer of the HDLB contains a runtime that the developer of the HDLB uses to execute his/her code as well as a secure data region that only privileged accounts can access, such as the system account as well as a designated "admin". Lastly, there is the Accessible Layer, where user code will reside as well as user data. There are typically strict security boundaries between the different layers. For example, only specific accounts can access the Controlled Layer, while valid users can access the Accessible Layer but not the Core and Controlled layers.

Figure 4C:
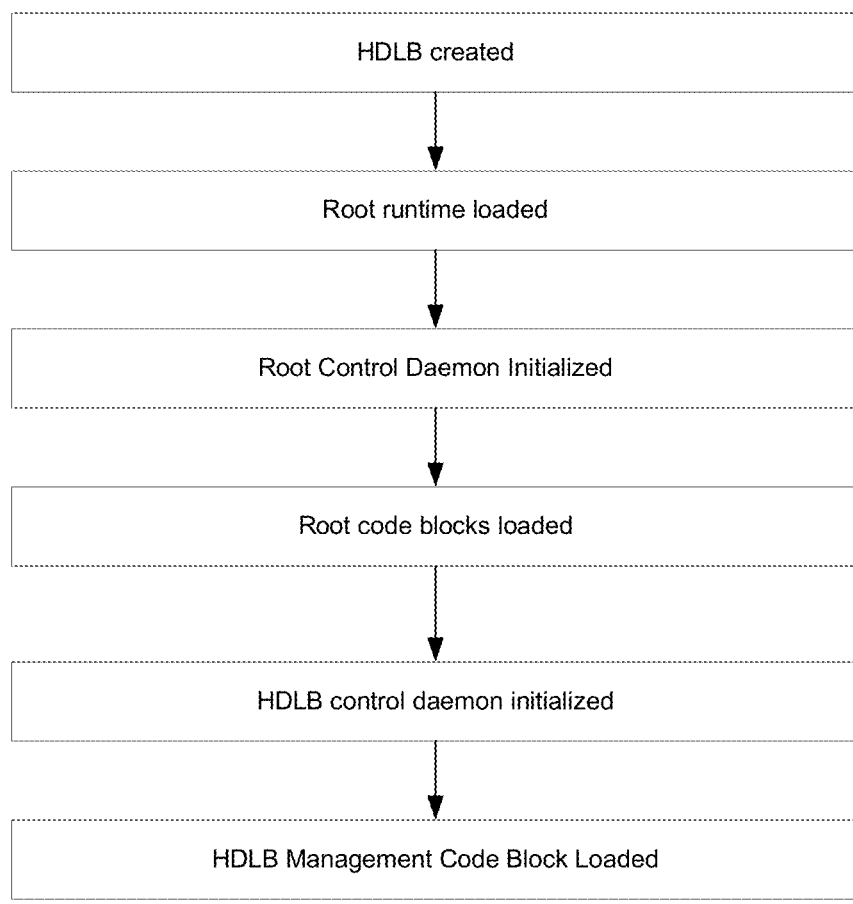
FIG. 4(c) is a diagram illustrating an example of the HDLB management logic that uses an interface that a HDLB control daemon can call.

When a module creates a HDLB, the module will attach the user created data and code block to a Core and/or Controlled Layer block. Once the Core and Controlled blocks come to "life", then the HDLB is "alive". Note that the user who wrote the code may specify a user created block of code that will be executed when the HDLB comes to life. The HDLB management logic uses an interface that the HDLB control daemon can call, as illustrated in FIG. 4(c). As shown in the figure, the following operations, processes, functions, or stages may occur in a typical use case:

1) HDLB is created by module as a result of external activation, for example, a received event;
2) HDLB has a handle that allows the module to initialize the HDLB by loading the root runtime;
3) The root runtime loads the root control daemon;
4) Root control daemon launches various HDLB subsystems/code blocks (e.g., resource management, security, communications, etc.);
5) Root Control Daemon launches the Control Daemon responsible for local security administration, compiler, and event filters—also responsible for executing various pieces of user code based on received events; and
6) Root control daemon launches one or more HDLB management code blocks—for example, a set of user defined code to perform action, function, or operation.

As described, a virtual space, termed a construct core or (C-Core), is a container for a form of virtual entity, termed a HDLB. The HDLBs are created by modules, which are executable units contained within the C-Core runtime that in turn generate the HDLBs. In some embodiments and implementations, a module can create one or more HDLBs (typically having similar structure, functionality, and characteristics). Further, typically, a module does not need to be present for an event to be handled. The C-Core itself typically contains no logic. Instead, in some embodiments, it is a bounded environment that provides the following services:
 1. Loading of Modules, which embody logic that creates HDLBs;
 2. Routing of events to HDLBs that exist within the C-Core context; and
 3. Resource management (e.g., memory management, computing management, I/O management, etc.).

As noted, once a HDLB is created, it exists independently of the C-Core in which it was created. A HDLB contains logic, base data, and a "listener" for detecting "events". HDLBs are both a source of and a sink for events, where events are the means of communication with and between HDLBs, and with and between a HDLB and its environment.

A HDLB represents an entity that exists in a digital environment and that represents an object that could exist in the real world. In some embodiments, a HDLB may have one or more of the following characteristics:
 1. The HDLB contains data describing its intrinsic properties—for example, if the HDLB represents a human voice, then it contains a range of frequencies encompassing the human voice;
 2. The HDLB belongs to a family of similar HDLBs sharing some specific characteristics—for example, the HDLB represents a family of similar HDLBs representing human voices;
 3. The HDLB contains logic that determines the HDLB's behavior—for example, the HDLB contains logic regarding what happens when the owner of the voice gets angry or sad, etc.;
 4. The HDLB contains a subsystem that is able to conduct a search of that HDLB based on metadata—for example, suppose an external entity is conducting a search of all the HDLBs that have certain voice characteristics. In that case, each HDLB can conduct its own internal search to see if that HDLB meets the criteria being searched for;
 5. The HDLB is an event based entity—there is no central controlling body that manages when the HDLB comes into existence, the lifetime of the HDLB, when the HDLB goes into a period of low activity, etc. In this sense, the HDLB's behavior originates from 2 sources:
  a. Internal HDLB logic; and
  b. An event originating from an external agent; and
 6. The HDLB contains algorithms or other forms of decision processes to identify nearest peers and to enable an exchange of events with them.

As noted, a module imparts logic to an HDLB. In some respects, a HDLB consists of an execution layer that contains logic, an event handler, and storage that contains data that a HDLB needs to access in order to function. When a HDLB is created, it requests the C-Core for resources to function—a block of memory and units of compute power. A HDLB may contain little or no logic, or it may contain relatively complex logic. A HDLB is persistent—once a HDLB has been created, it will remain active until one of the following occurs:
 1. Internal logic instructs it to terminate;
 2. It receives a signal to terminate; or
 3. A C-Core forcibly de-allocates resources associated with a HDLB.

The reason for this behavior is that if the module that created the HDLB no longer exists or even the C-Core in which the module was created ceases to exist, then the HDLB may need to (and is able to) persist. Because of this need or desired feature, the HDLBs are designed to be self-contained to an extent necessary to properly function and operate within one or more virtual environments. For example, the HDLBs typically use asynchronous messaging to communicate. This is intended to prevent a HDLB from depending on a call to be completed by a remote HDLB and to improve performance, as well as reducing the risk of a denial of service (DoS) attack on the system. As noted, a HDLB registers with the containing C-Core. Note that by making the HDLBs operate as independent logic units, they are able to move between and across environments and systems—this behavior enables the overall system to scale more efficiently.

Figure 19:
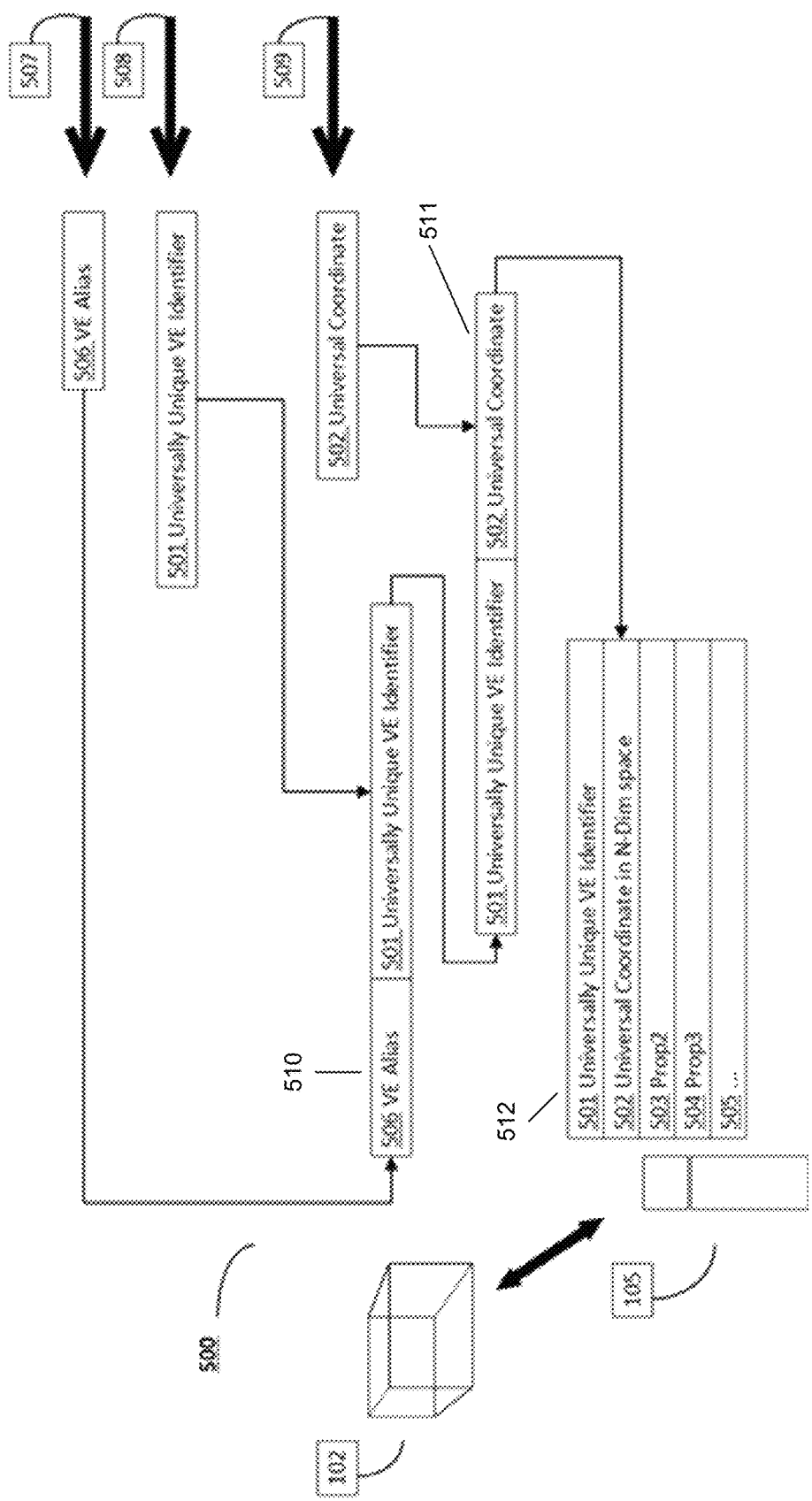
FIG. 19 is a data diagram illustrating an example of a central register that may be used to assist in locating a virtual entity within a virtual space.

As described further with regards to FIG. 19, a HDLB can also query other HDLBs and may maintain an internal lookup table containing identifiers for other HDLBs. In this respect, they can implement a similar search logic as was described with reference to C-Cores. When a HDLB moves into a C-Core, it will register with that C-Core—this is called the HDLB Coordinate. The HDLB has a friendly name (alpha-numeric), a 128 bit unique identifier, and a 128 bit locator identifier corresponding to the C-Core. Each C-Core has a 128 bit locator identifier. As each VEnv has a unique identifier, it is possible to locate an individual HDLB regardless of its location.

A HDLB typically belongs to a certain class—this class is determined by the module that created it. A module can impart one or more classes to a HDLB, where the class determines what events a HDLB is capable of "listening" to. In some embodiments, every HDLB implements a base class on top of the classes that are imparted to it by the module, as there are typically universal events that each HDLB is expected to understand.

The C-Cores are divided into a public, private and a blocked layer. The public layer is what the end user sees and exposes data that the end user is allowed to use. The private layer is the environment descriptor layer. This may include information regarding the visibility of the C-Core (visible, abstract), the cardinality (bounded, unbounded), basic environmental parameters (physics, global lighting rules, etc.), security, accessibility, globalization, resource access (databases, LDAP systems, SMTP etc.), and computing power (# of computations, storage, I/O). The restricted layer includes event handling and internal system messaging, which includes C-Core control logic (e.g., telling the C-Core to go to sleep, to unload, etc.).

Note that C-Cores do not control HDLBs and have no intrinsic logic other than that necessary to ensure that the system or instantiated environment not use too many resources, to terminate when told to do so, etc. Other than that, a C-Core may typically be characterized as a block of parameters that a HDLB can read from and/or write to.

As described further, the C-Cores are organized according to a peer based lookup system. Every C-Core has knowledge or awareness of a handful of (typically local) C-Cores. When a new C-Core is created, it is connected to some peers at random. The number of connectors depends on the level of discoverability that the user is willing to "pay" for or accept. The system will naturally form a small world network as more and more C-Cores are added. This means that messaging in the system is generally efficient. Typically, there is no central registry of V-Envs, C-Cores, or HDLBs; instead, search operations are performed via lookup tables located in the entities that exist in the system.

In some embodiments, C-Cores can be created by users to host specific activities. For example, it is possible to allocate/create a temporary C-Core in which a complex device is created and HDLBs that are needed for the construction of that device can be hosted. C-Cores can also be used as a way of grouping sets of HDLBs. For example, if a user desires to run a complex economic simulation, then the C-Cores may represent specific economic entities such as a central bank, corporations, or even individuals. In such an example use case, the HDLBs would represent certain functions or processes of these entities.

Another example use case might be one in which a logical grouping of HDLBs is used to represent a physical object. For example, a car may have its own internal model that is contained in a C-Core that represents that car. In this use case, the HDLBs could represent various components of the car, such as the fuel injection system. In such a model, each HDLB behaves like its real-world counterpart, so that if a fault is detected, then it is possible to identify the source of the problem. In addition, this type of model would make it possible to generate "predictions" regarding the possible failure of a given component in order to give the driver a chance to fix the problem before it occurs or develops into a serious issue.

Yet another use of an embodiment of the inventive system could be as part of an air traffic control system, where each HDLB represents a plane with its own set of functions and state values. This type of air traffic control system would be preferable to conventional ones as it would be possible to incorporate detailed data or characteristics of the plane into the control/flight decisions, where such characteristics or data may include maintenance records, capacity, velocity, altitude, known performance issues, and pilot or crew status, while at the same time making it easier to hand off control to another control tower. Note that as the HDLB is an independent entity, this does not require a shared database between the two control towers and hence is both efficient and provides for more informed decision making. This use case provides an example of how the independent/autonomous nature of the HDLBs can provide advantages over standard systems that attempt to control or track a large number of entities moving within multiple spaces or regions by relying on a centralized source of data.

Similarly, such a model may be used to represent other types of networks, such as computing or transportation networks. In these use cases, each node of the network (such as a computing element, router, switch, vehicle, etc.) may be represented by a suitably configured HDLB; this type of model permits a higher degree of independence and cooperation than conventional models. These features may provide benefits in terms of dynamic scheduling, load balancing, and resource allocation across the entire network.

In general, HDLBs utilize "events" in order to communicate (i.e., transmit and/or receive) information. In this context, an event is a standard transportable binary packet that is used to transmit information and instructions between HDLBs. An event typically implements one of three "actions" or verbs:

1. QUERY;
2. NOTIFY; or
3. EXECUTE.

That is, each event in the system contains or is associated with one of three "verbs" and operates to communicate (notify), to request data (query), or to execute logic (execute).

In some embodiments, an event is standardized to include the following data/information (note that FIG. 24 is a diagram illustrating an example of the format and content of a typical "event" packet):

A header
A 64 bit date/time stamp
Applicable class identifiers
Event type
Event Identifier
Source identifier
Expiry date/time
Security context
Security token
Event signature
Encryption method (AES, etc.)
Hashing method (SHA512, etc.)
Data
Data checksum
Data (microcode, data, etc.)

Here, microcode contains basic instructions as to the code address offset start and end, whether it is being used to replace, insert, move (start and end address needed) or delete code, as well as the code being used to replace, insert etc.

In one example, microcode can be used to update/alter existing functionality in the Core, Control, or Accessible layers of an HDLB. This provides an effective way to pass a security patch/fix or a code "bug" fix to one or more HDLBs via inter-HDLB communications. Note that a HDLB does not need to know or be in communication with a central update server for this to occur. Instead, it can rely on other HDLBs to propagate the update event until it receives the update code and can incorporate any changes into its own code.

Microcode (or some other form of instructions or controls) could also be used to provide new or enhanced functionality to one or more HDLBs. For example, if the inventive system is being used to create and operate an aircraft simulation, then an event being used to transport or communicate microcode could be used to give a component (e.g., a turbine) additional functionality, such as being made of a different material (e.g., a metal or a composite material that the aircraft part didn't originally know about). In a similar way, microcode could be used to alter the behavior of entities in an economic simulation by applying a new phenomenon or constraint (such as a change in economic policy, the introduction of deregulation, etc.). Similarly, microcode could be used to update or revise a simulation of a physical system (such as a group of particles) by updating the code of a family of HDLBs (e.g., protons) as new properties or relationships are discovered. Note that such an update can be made to occur without having to shut the simulation down and revise it while off-line.

An event may address one or more individual HDLBs, a class of HDLBs, or every HDLB, where, as mentioned, an event can be responsible for one of a query, a notification, or microcode (corresponding to the "execute" action implemented by an event). The event will cause a recipient HDLB to respond by performing an action, such as generating a notification, performing a search, or executing a set of instructions. An event in the form of a query can be used to initiate a request for information from a class or classes of HDLBs. For example, assume there exists HDLBs that belong to a class of HDLBs representing documents having a certain format; in such a case an event can initiate a search through a set of documents by sending a request through the C-Cores (as illustrated and described with reference to FIG. 21). This is because part of the global logic enabled by a HDLB is a search through its associated data block, which can be used to identify the HDLB or HDLBs that are the object of the search (for instance by using events to initiate a search, followed by generating a notification if the search query is satisfied).

Signaling/communications between HDLBs enables uses including managing traffic, where each HDLB may belong to a family of cars, trucks, emergency vehicles, service vehicles, etc. By updating the movement/flow of vehicles on a continuous basis, it is possible to perform a more realistic and accurate traffic simulation. Another valuable use case is that of real-time financial transactions, as each HDLB can represent a buyer or seller with its own set of known data, decision processes, heuristics, rules, or algorithms.

Other implementations of the inventive system could provide capabilities for real-time modeling of a business, its changing inventory, and its supplier relationships. In this type of use case, each HDLB could represent a product with a certain set of properties (such as size, color, style, length of time in inventory, etc.). Note that an advantage of implementing this type of model using an embodiment of the inventive system is that a central database is not needed, which means that HDLBs can be moved from a supplier to store, or from store to store, just like their real-world counterpart products. This capability can be used to run simulations to manage inventories, track returns, coordinate shipments, optimize profit margins, etc. With the use of HDLBs and other elements or processes that are part of the inventive system, a company would not need to share their databases with other vendors or entities, while still creating a highly efficient supply chain system that contained multiple players.

As noted, an event can also contain microcode. This means that if a HDLB allows it, it can be reprogrammed by an event to alter existing functionality or to acquire additional behaviors. For example, in order to fix a software error or to add new capabilities, microcode could include the underlying code written in a standard programming language, along with an instruction offset, and any relevant access control or security features (for example, to prevent unauthorized calling of a specified routine). The microcode could be used to replace a search function with a more optimized version, fix a software bug, or update the currently installed version of a piece of HDLB code.

Figure 4D:
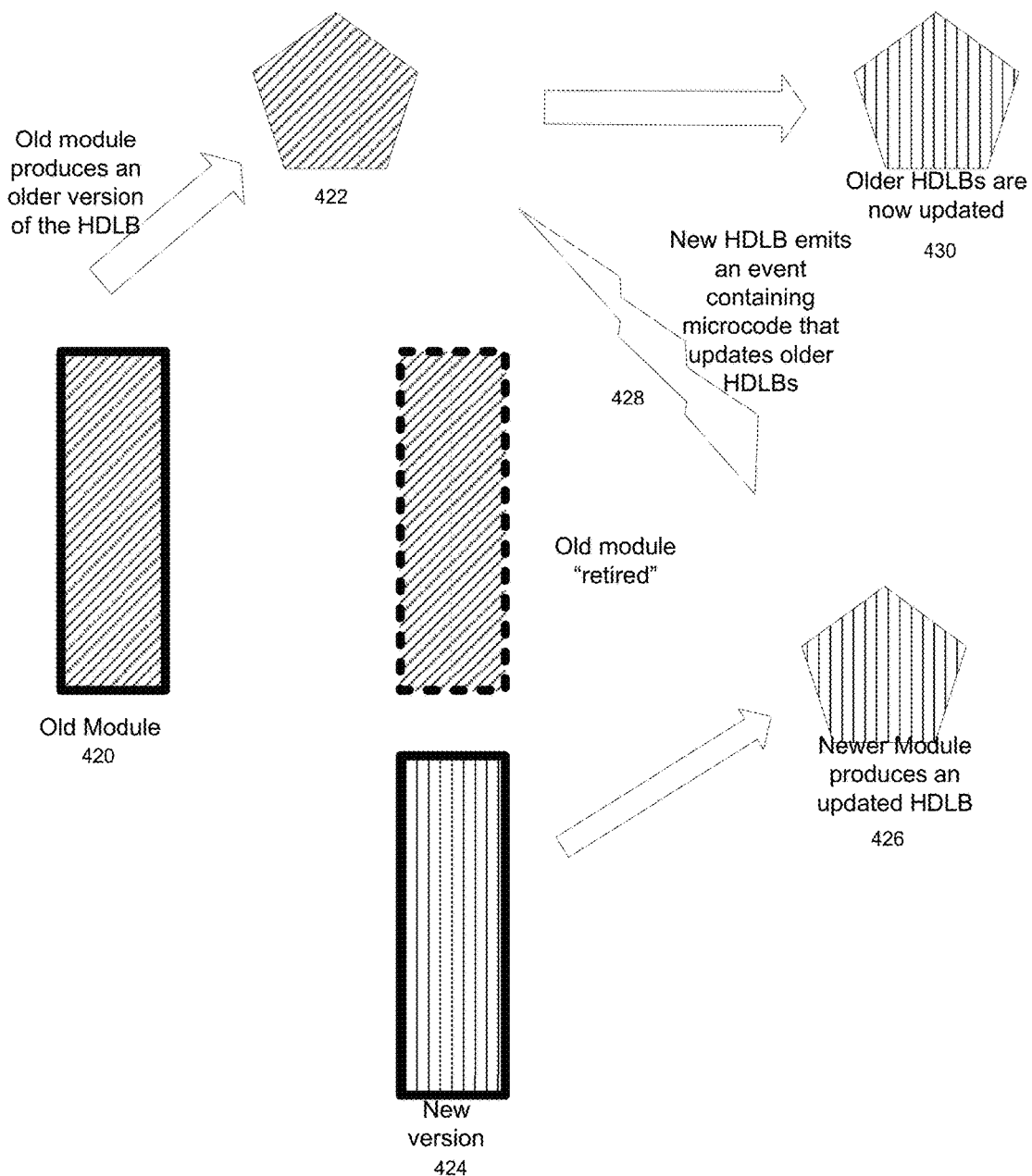
FIG. 4(d) is a diagram illustrating how when a new version of a Module is created, the HDLBs created by the new Module generate HDLBs that produce update events that contain microcode to update the other HDLBs created by the older version of the Module.

For example, as shown in FIG. 4(d), a module that created an older version of an HDLB may become retired, but the HDLB persists within the relevant C-Core of the system. Then a new module comes on line to produce a new version of the HDLB. This new HDLB emits events that update existing HDLBs that were produced by the older module. This illustrates how when a new version of a Module is created, the HDLBs created by the new Module generate HDLBs that produce update events that contain microcode to update the HDLBs created by the older version of the Module. As shown in the figure, an "Old module" 420 is retired by sending instructions to the containing C-Core to "stop it". In the illustrated case, the Old module has previously created a HDLB 422. A "New module" 424 is now loaded in the C-Core and starts to produce new HDLBs 426. The new HDLB(s) will emit events 428 that are received and processed by an older HDLB 422 to instruct the older HDLB to update its code; thus, the older HDLBs are now updated 430.

As a result of this form of "self-optimization", an HDLB can emit an event to let other HDLBs know about certain changes or revisions to its own code or structure. This event may contain microcode and its "payload" is spread virally across the network of HDLBs, which provides for an efficient update of a portion (e.g., based on class, or a common HDLB characteristic or parameter value) or of an entire network of HDLBs. This means that a security fix could be caused to propagate through the network relatively quickly (i.e., proportionally to Log (N), where N=the number of HDLBs).

Note that the source of an event is another HDLB, as HDLBs both emit and receive events. This introduces some valuable properties to HDLBs; for example, it is possible to initiate a continuous evolution of HDLBs, as well as introduce forms of self-organization within a set of HDLBs to optimize certain activities or functions. This capability is because a HDLB can initiate programmatic changes to other HDLBs.

An example (which was referred to previously) is that of a class of HDLBs representing documents and being used to spread microcode for use in optimizing searches among those documents. This process can be triggered by sending an event to a HDLB containing microcode that contains a specific genetic search algorithm. In one example, the genetic algorithm could be a set of Turing Machine type instructions, with the fitness algorithm being the time it takes to return a block of data that is being searched for. To reduce the number of possible tested algorithms, one could start with a known set of search algorithms and produce modifications to critical areas of the code (e.g., switching out instructions as long as the resulting set of instructions still operates as desired) and compare the relative search efficiencies. As search efficiency varies by the type of data being searched, multiple algorithms may be constructed and the most optimal combination would be the one selected. This optimal search algorithm or methodology will then be spread (communicated) to other HDLBs through the emission and reception of events.

In this example, microcode may instruct a receiving HDLB to modify its own search algorithm, and if it finds something more efficient (which in this case could be evaluated by the time it takes to return the set of HDLBs that contain a search string), then it will broadcast an event containing the more efficient microcode to other HDLBs belonging to its class (or defined by another criteria). Each HDLB will optimize its own search process and then send out an event containing microcode implementing the improved search method. This enables very rapid dissemination of optimizations, fixes, patches, etc.

As discussed, sending out bug fixes, security patches, etc. is made both simpler and more efficient using a set of HDLBs, as they are optimized for transmission of code. This optimization relies on the routing tables in each HDLB—as a result of each of the HDLBs maintaining a set of known HDLBs, a small world network is created as some HDLBs naturally form "Hubs". As a result of this the microcode is able to be propagated at a speed proportional to Log (N), where N=the number of HDLBs. Other aspects of an HDLB that could be optimized include resource utilization by the HDLB (e.g., size, processor utilization, memory, etc.) and resiliency of the HDLB to attacks (by finding and fixing known security failure types, such as buffer overflows, lock contention issues, use of uninitialized memory, etc.). In the case of concurrency in particular, constant optimization may be necessary as many race conditions can only be understood during runtime.

Optimizations that are performed within a set of HDLBs may be based one or more processes or techniques; these may include:
1. Genetic algorithms that optimize based on preset criteria;
2. Linear Programming models that optimize for certain sets of constraints—the constraints could (for example) be based on one or more of efficiency of the program in reaching its objective, the size of the program, resources used, complexity of the program (e.g., based on number of for loops, conditional statements, etc.); or
3. Optimizations from other HDLBs that are communicated through events.

As recognized by the inventor, the combination of possible optimization processes/models and the characteristics of HDLBs enable one or more of the following properties:
1. Self-organization of HDLBs belonging to the same or different classes;
2. Continuous optimization and evolutionary behavior of a set of HDLBs;
3. "Gestalt" behavior—individual HDLBs interacting with each other and producing some emergent (novel) behavior;
4. Distributed processing—as each HDLB is intelligent, multiple HDLBs belonging to a given class can be distributed across many different physical machines hosting a VEnv (such as a simulation or system model) and thereby handle processing of data in an efficient manner;
5. Self-healing/updating system—as described, if a bug/flaw is found, a fix can be transmitted via an event and the receiving HDLB(s) can update their own code when able to do so safely, and each HDLB can disseminate the fix to other HDLBs; and
6. Portability—a HDLB can be moved from one C-Core to any other C-Core, thereby transferring knowledge and capabilities to another environment in which it can operate, transmit code, trigger events, etc.

A useful property of feature (5) in the context of document processing is that if a document format is updated to include additional properties (e.g., better compression of data), then the document can instruct HDLBs that were programmed to handle the old document format how to handle the new one.

Figure 4E:
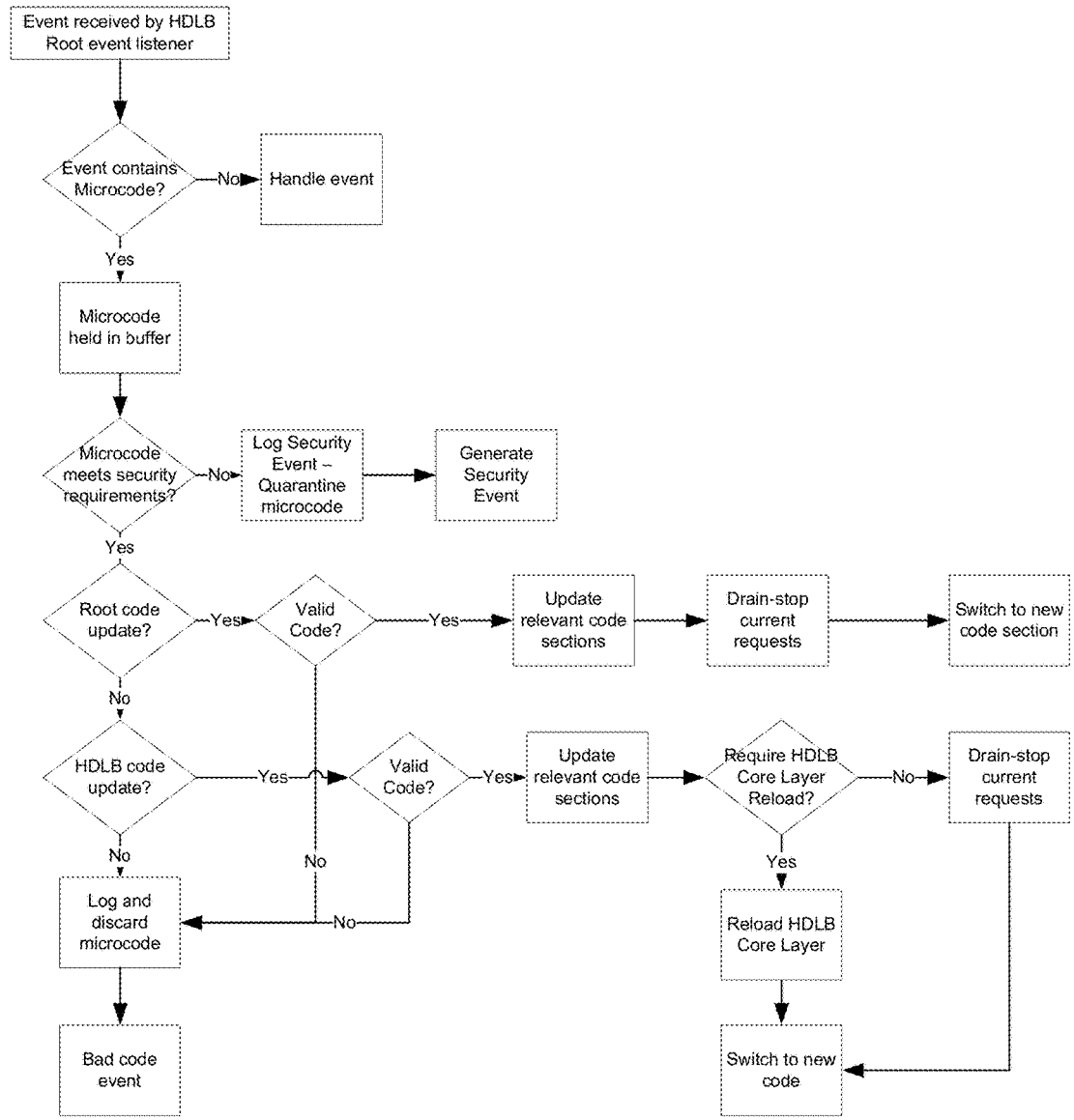
FIG. 4(e) is a flowchart or flow diagram illustrating a method or process by which microcode may be used to update or alter the logic and operation of a HDLB.

FIG. 4(e) is a flowchart or flow diagram illustrating a method or process by which microcode may be used to update or alter the logic and operation of a HDLB. As shown in the figure, when an event is received, it may be determined if the event includes microcode. If so, the microcode may be evaluated to ensure that it meets the designated security requirements. If it does satisfy any relevant security or access control requirements, then it is determined if the microcode relates to an update of root code or other code associated with a HDLB. This is followed by the appropriate loading of the code and reloading of the impacted layer(s).

As an example, suppose an event is received at HDLB root level. A root level event filter determines if it is a root level event. If not, then it passes through the control layer filter. If it is a valid update and meets the relevant security guidelines (determined at the Root and Control levels), then the code is inserted into the relevant section and re-compiled. Note that requests to the old code are gradually weaned off by the control layer and new requests are sent to the newer code. An example of a way to implement the update mechanism is as follows: the code injection mechanism occurs because every function has an empty transfer instruction block. When code is updated a transfer instruction is inserted that points to the code residing in the buffer. When all requests have been processed by the old instruction, the new code will replace the old code block.

Returning to other aspects of an implementation of the inventive system and methods, FIG. 5 is a functional block diagram illustrating an example of a VEnv Kernel (VEnvK) 107 that may be utilized when implementing an embodiment of the inventive system and methods. VEnvK 107 is an entity that may be executed or hosted on one computer or on multiple servers 108 linked over a suitable network. VEnvK 107 may include libraries and services that are consumed by C-Cores 104 or by other entities that may utilize the libraries or services to enable the functioning of HDLBs 105. VEnvK 107 provides a framework in which one or more constructors may be instantiated, where the constructors may function and operate by executing instructions produced by the constructors using a VEnvK runtime, and in which the virtual entities generated by the action of Modules within the constructors can interact with each other.

Figure 6:
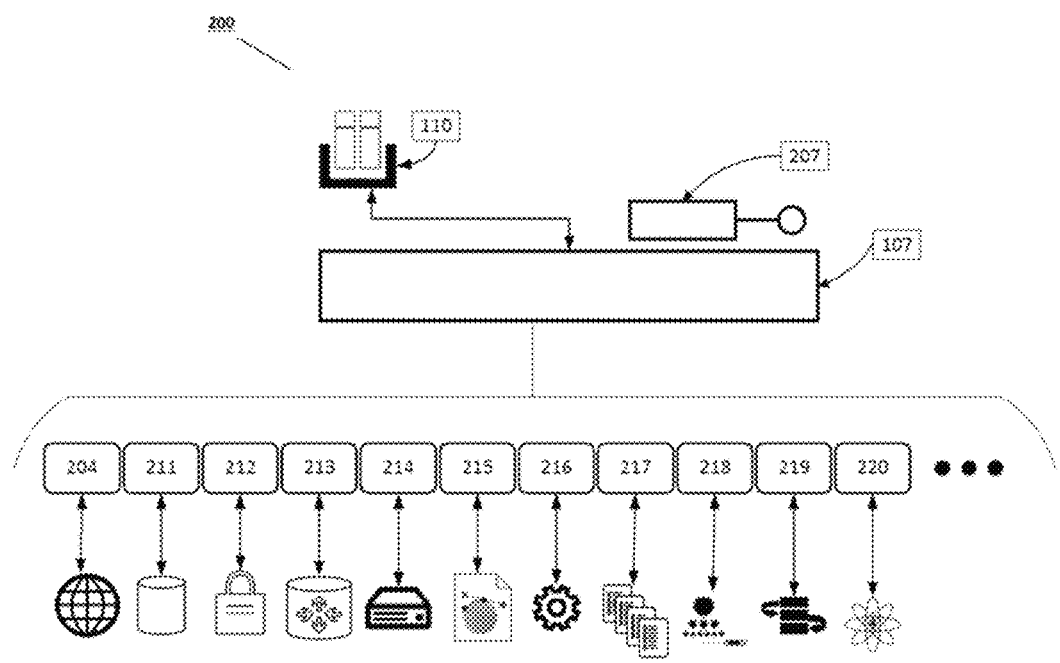
FIG. 6 is a diagram illustrating how the libraries of VEnvK 107 expose capabilities to a programmer that permit the creation of programmable structures representing virtual entities 105.

FIG. 6 is a diagram illustrating how the libraries of VEnvK 107 expose capabilities to a programmer that permit the creation of programmable structures representing virtual entities 105. These capabilities may include, but are not limited to, database access 211, security functions 212, communication inside and outside of the virtual environment, such as between HDLBs and between HDLBs and actor devices 213, storage allocation 214, graphics and rendering operations 215, computational resource allocation 216, tracing 217, management 218, runtime core such as data structures, threading etc. 219, global environment characteristics, such as physics model(s) 220, and globalization and localization functions 204.

Examples of services that may be provided by the VEnvK are: a service to convert instructions produced by a C-Core into machine readable instructions that can execute on a computer or network of computers 108; a service to reserve memory and file storage for a plurality of Constructors; a service to enable communication between VEnvs and communication between HDLBs, as well as between VEnvs and the real world through devices or other methods; a service to instantiate and enable the activities of HDLBs, a service to interpret signals from the HDLBs and send signals to the HDLBs; and a service to provide authentication, authorization, and tracing capabilities for actors, such as users and developers. FIG. 6 also shows VEnv Services (VEnvServ) 207, which is a set of Application Programmer Interfaces (APIs) exposed by the VEnvK 107 to enable integration of the VEnv 100 into systems and processes external to the VEnv 100.

When a C-Core is created, in one example, a security level may be selected for the C-Core. For example, a first security level may be "Isolated", where the C-Core is not part of a broader network, it has a private Kerberos instance, and a private key store. A second possible security level may be "Partially Joined", where the C-Core is part of a broader network; it has a shared Kerberos subsystem, such as Lightweight Directory Access Protocol (LDAP), and a private key store. A third security level may be "Joined", where the C-Core is part of a broader network and may be controlled by the network's security framework, it has a shared Kerberos subsystem, and a shared key store. If the C-Core belongs to a corporate network, then the private Kerberos subsystem may be replaced with the corporation's LDAP system to ensure authentication, and the key store may be part of the corporate infrastructure.

Note that the C-Cores 104 in this implementation/embodiment are generally inert in the sense that a C-Core can initiate one behavior, and that is to launch Modules. The C-Core 104 may describe the 3D space, physics, dynamics and environmental properties of a virtual space or model. In order for the C-Core to perform an action, a Module is created and associated with the C-Core.

Modules in turn create Heuristic Digital Logic Blocks (HDLB), the semi- or fully autonomous entities possessing an internal runtime, data and logic, as well as event handlers and event filters. HDLBs also possess sufficient security logic to verify that the event is trusted and comes from the correct source. A HDLB is created and is usually associated with an owner. One way to visualize this is that the Module is a "factory" and the HDLB is the thing that is created and is then assigned to an owner. The HDLB may possess additional logic to initiate the creation of a copy of another HDLB that may (or may not) belong to its own family. An HDLB itself cannot create other HDLBs, but an HDLB may know of a module that is able to initiate the creation of another HDLB.

Figure 7A:
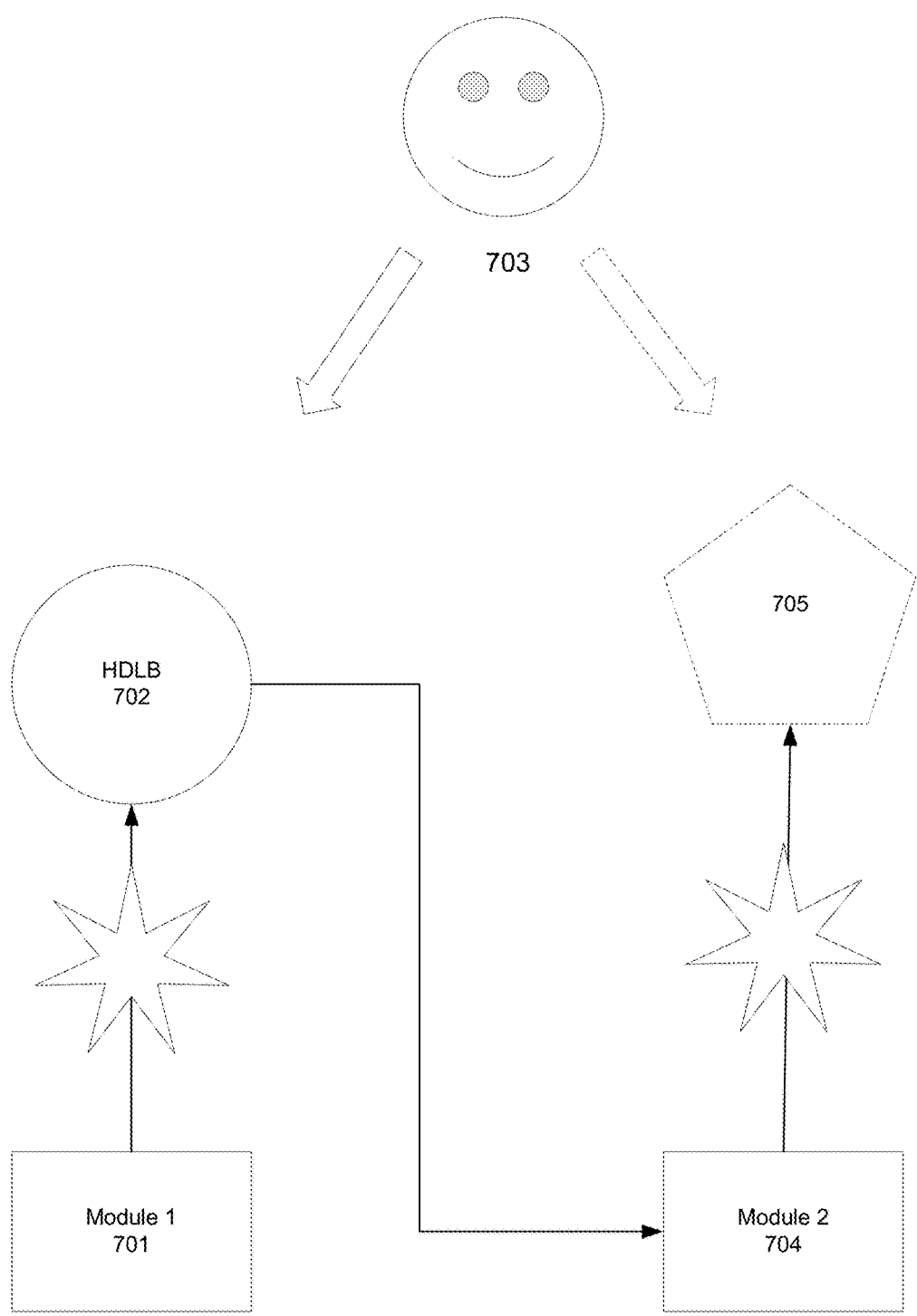
FIG. 7(a) is a diagram illustrating the process of a module creating a first HDLB, which then initiates a process by a second module that creates a second HDLB, both of which are associated with the same "owner"

In one example of this process (shown in FIG. 7(a)), a first module 701 (Module 1) creates a circle HDLB 702, which is assigned to a given owner 703. That HDLB 702 then initiates the creation of a second HDLB by causing a second module 704 (Module 2) to operate to create a new HDLB, for example, a pentagon 705. The owner of the circle 703 is then automatically assigned ownership of the pentagon.

If there is no activity associated with a C-Core because the C-Core has not received messages or nothing else has triggered an event for the C-Core, then the C-Core may be put into "sleep" mode. This means that the C-Core's state is either written to a block of memory or written to bulk storage, such as a disk. The runtime supporting the C-Core, however, remains active because it manages message routing as well as bringing the C-Core out of sleep mode if it detects that a user is attempting to access the C-Core. A runtime typically doesn't unload once it is created unless the C-Core owner or an administrator decides to freeze the C-Core, i.e., place it into a "frozen" mode. If a C-Core is frozen, users cannot interact with it. An administrator or the C-Core owner is needed to explicitly "thaw" it before it can be used again. The following table illustrates an example of possible C-Core states in an embodiment or embodiments of the inventive system and methods:

| State | Description | Responsiveness |
|---|---|---|
| Active | A C-Core is loaded and a module is present | Real-time |
| Sleeping 1 | The C-Core's state is written to memory (as well as the Module's). The runtime is still loaded. | Slight lag |
| Sleeping 2 | The C-Core's state is written to disk (as well as the Module's). The runtime is still loaded. | Longer lag |
| Inert | There are no modules in the C-Core—users cannot interact with the C-Core. The runtime is still loaded. | Unresponsive |
| Frozen | The runtime is unloaded | Unresponsive |

In some embodiments, there are 2 ways in which events can propagate. A first is using the C-Core native event router. In some respects, C-Cores form a small world network and so events can be propagated relatively quickly. Each C-Core is aware of the HDLBs inside it and is able to route the event to a specific HDLB. A second way for an event to propagate is that an event may be propagated to an HDLB of a given class, where that HDLB is aware of another HDLB and is able to send the message directly to it (thereby bypassing the C-Core event router). Note that in some embodiments, the C-Core event router is functionality that is appended to the C-Core at compile time.

Figure 7B:
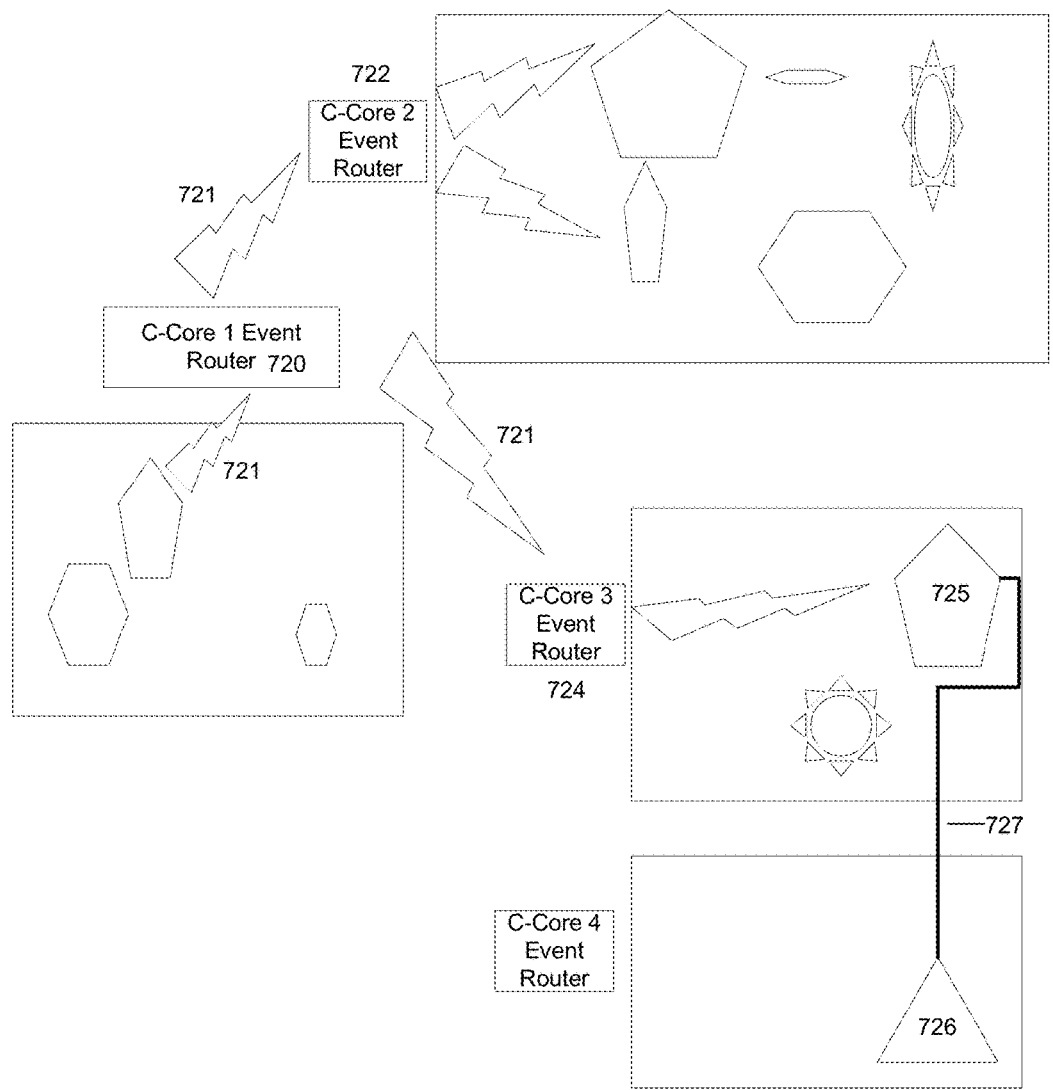
FIG. 7(b) is a diagram illustrating the operation of a C-Core event router which may be part of the implementation of an embodiment of the inventive system and methods.

In the example shown in FIG. 7(b), if an HDLB represents the family of 5 sided objects and an event is propagated to only 5 sided objects, then the C-Core event router will send the event out and only the 5 sided objects will pay attention (i.e., receive and process the event). Also, a given HDLB may be aware of other HDLBs who may not necessarily belong to the same family but who might be interested in the message and/or can pass the event to members of the desired recipient class or group.

The operations shown in the figure illustrate how event propagation works in the inventive system. As shown, a C-core event router 720 receives a given event 721 that is intended for a specific class of HDLBs (e.g., C1). This event is then forwarded to the HDLBs belonging to the (C1) class for which the event is intended (as suggested by C-Core 2 Event Router 722 and C-Core 3 Event Router 724). In some situations, a member of C1 may be aware of other HDLBs in its class, and will re-transmit the event to them based on its internal routing mechanism. This occurs by notifying it's containing C-Core that it has an event and to pass the event on. In this case, the containing C-Core will transmit the event to known C-Cores until a C-Core that contains one or more HDLBs belonging to C1 receives it and routes it to the HDLB or HDLBs inside it belonging to C1. One or more members of C1 (such as element 725 in the figure) may also know about another HDLB belonging to a separate class C2 (such as element 726 in the figure) that might be interested in the event, and may send the event to that member of the different class (as suggested by path 727).

Events can be viewed as "operators" that cause a change in state of a system, HDLB, or group of HDLBs. For example, if $S_0$ is the initial state of the system, then, for a given event $e_j$, the HDLB will perform action $A_M$ $(e_j, S_0) = S_{1j}$, which will take the system from a state $S_0$ to state $S_{1j}$. This may be simplified by stating that the event $e_j$ will result in an operation $A_{\{M,j\}}$ on the system state $S_0$ that will take the system to the state $S_{1j}$. As an example, suppose that there is a system consisting of a sphere and the current system state is that the sphere is black. The state space is small—just the color of the sphere. An event occurs, e.g., a virtual button is pressed, and an action occurs that turns the sphere white, representing a change in state of the system.

If (or when) a given HDLB wants to move from C-Core 1 to C-Core 2, it requires that there exist a trust relationship between the two C-Cores that is maintained/administered by a claims based model, a Kerberos type of model, etc.

Transfer between the C-Cores is a matter of de-registering from one C-Core and registering with the other. This process may be described as:
1. HDLB is in C-Core 1 and wants to go to C-Core 2;
2. HDLB notifies C-Core 1 that it wants to leave. C-Core 1 marks the HDLB as leave pending in its registry, but will still relay events to the HDLB;
3. C-Core 1 sends an event to C-Core 2 with the transfer request. C-Core 2 sends an event with the answer to the transfer request (allow/denied);
4. If the transfer request is allowed, then C-Core 2 then adds HDLB to its registry marked as pending transfer and sends a second event to C-Core 1 saying that it has done so (or it might have sent the completion info in the answer event in (3) for efficiency);
5. C-Core 1 then removes the registration data for HDLB from its registry and notifies C-Core 2 that it has done so along with a sequence of any unprocessed events (if there are any) for the HDLB; and
6. C-Core 2 then changes the status of the HDLB from pending to active, and sends the sequence of unprocessed events to the HDLB; from that point on C-Core 2 is responsible for relaying events to the HDLB.

Because embodiments of the inventive system utilize events to transfer information, initiate processes, configure members of a group, etc., the processing of events in an efficient and accurate manner is an important aspect of the system. As recognized by the inventor, such processing may be accelerated through a variety of approaches. One approach is caching of dormant or inactive C-Cores to free up resources for active C-Cores. Another approach is to provide additional computing resources, such as by adding additional servers or processor cores to the hardware platform supporting the shared VEnv. Because certain embodiments of the VEnv are able to support a relatively large number of users and C-Cores in a shared environment, the additional hardware may be utilized more cost-effectively and, therefore, greater computing resources may be made available to a greater number of users than for conventional non-shared environments.

Still another approach to accelerating performance that also benefits from the shared VEnv environment is that of Bayesian caching of object behavior. In some embodiments, based on accumulated event data from the experience of large numbers of users and objects, a Bayesian predictive caching approach may be utilized to improve the responsiveness of the VEnv to events.

Predictive caching is based on the ability to make "predictions" as to what data will be needed or what event will occur (or is likely to occur) next and to (pre)generate and store the data, system state, or values that are most likely to be needed or used. In some embodiments, a VEnv may use this technique to reduce the flow of network traffic (thereby reducing the bandwidth needed) or the overhead associated with decrypting memory content by making predictions as to what would be the most likely next state of a system. More specifically, in the case of a VEnv, a form of predictive caching may be applied to events. An event in a VEnv will generally result in an action or transformation of the state of a system (as suggested by the previous discussion regarding events and operations). In some cases the transformation may be idempotent, meaning that once it is applied it doesn't impact the state even if it is applied again.

When an event occurs, it triggers an operation, transformation, or transition between states of a system or environment. If a reasonably accurate prediction can be made as to which event(s) will take place next, then it is possible to pre-calculate the resulting transformation/transition and store it in memory in anticipation of the occurrence of the expected/predicted event. This may improve the response of the VEnv system and deliver a more seamless experience to a user. For example, suppose that Event 1 happens and this causes an action A and then, shortly thereafter, Event 2 happens, which triggers action B. Statistically, the VEnv determines that Event 2 is highly likely to occur after Event 1, which means that if Event 1 occurs, then the result of operation or transformation B may be calculated and the resultant state stored in memory until it is needed.

Figure 26:
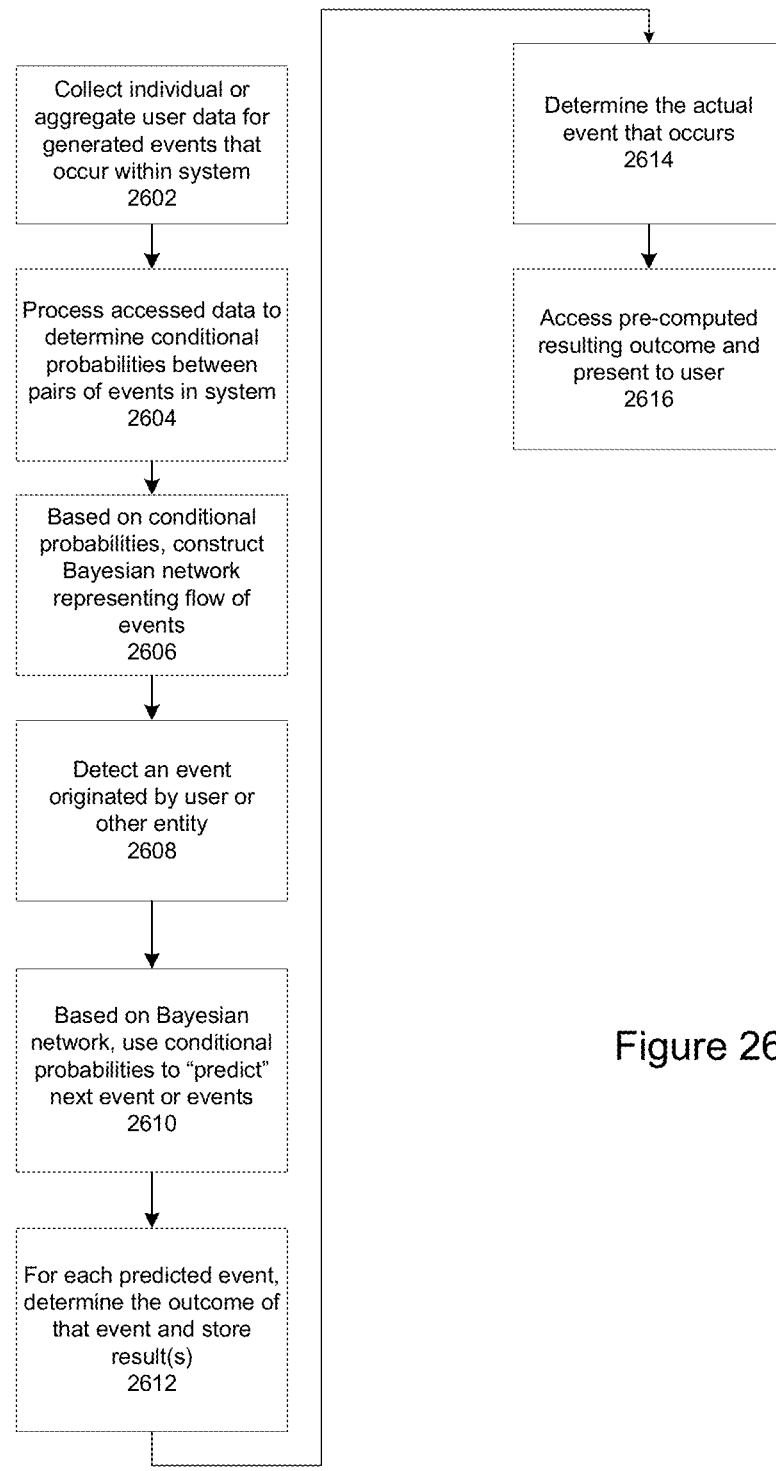
FIG. 26 is a flow chart or flow diagram illustrating a method, process, operation, or function that may be used to optimize the processing of events in an implementation of an embodiment of the inventive system.

FIG. 26 is a flow chart or flow diagram illustrating a method, process, operation, or function that may be used to optimize the processing of events in an implementation of an embodiment of the inventive system. In this method, process, operation, or function, a sequence of events is represented as an operator acting on an initial state of system to cause it to move to a next state.

As shown in the figure, events occurring within the system are monitored or detected. These events may include only those involving a certain HDLB, those involving a defined group of HDLBs (e.g., those with a specified characteristic or parameter value, those associated with a specified account, those belonging to a specific class, etc.), or every HDLB, for example, as suggested by step or stage 2602. The data is then processed to determine one or more conditional probabilities between pairs of events, as suggested by step or stage 2604. Based on the determined conditional probabilities, a Bayesian network of connected nodes is constructed, where each node represents a state of the system, as suggested by step or stage 2606 (an example of which is described in further detail with reference to FIG. 8).

Next, an event is detected, where that event was originated by a user or another HDLB, as suggested by step or stage 2608. Using the Bayesian network model, the conditional probabilities that were determined are used to "predict" the next likely event or events, as suggested by step or stage 2610. For each "predicted" event the outcome of that event is generated and stored, as suggested by step or stage 2612. Note that in some embodiments, this means that the state of the system after exposure to each of the likely or predicted events is determined and stored. Next, an actual event or operation that occurs is detected and/or determined, as suggested by step or stage 2614. Based on the actual event, the appropriate previously computed/determined system state is accessed and presented to the user, as suggested by step or stage 2616.

Figure 8:
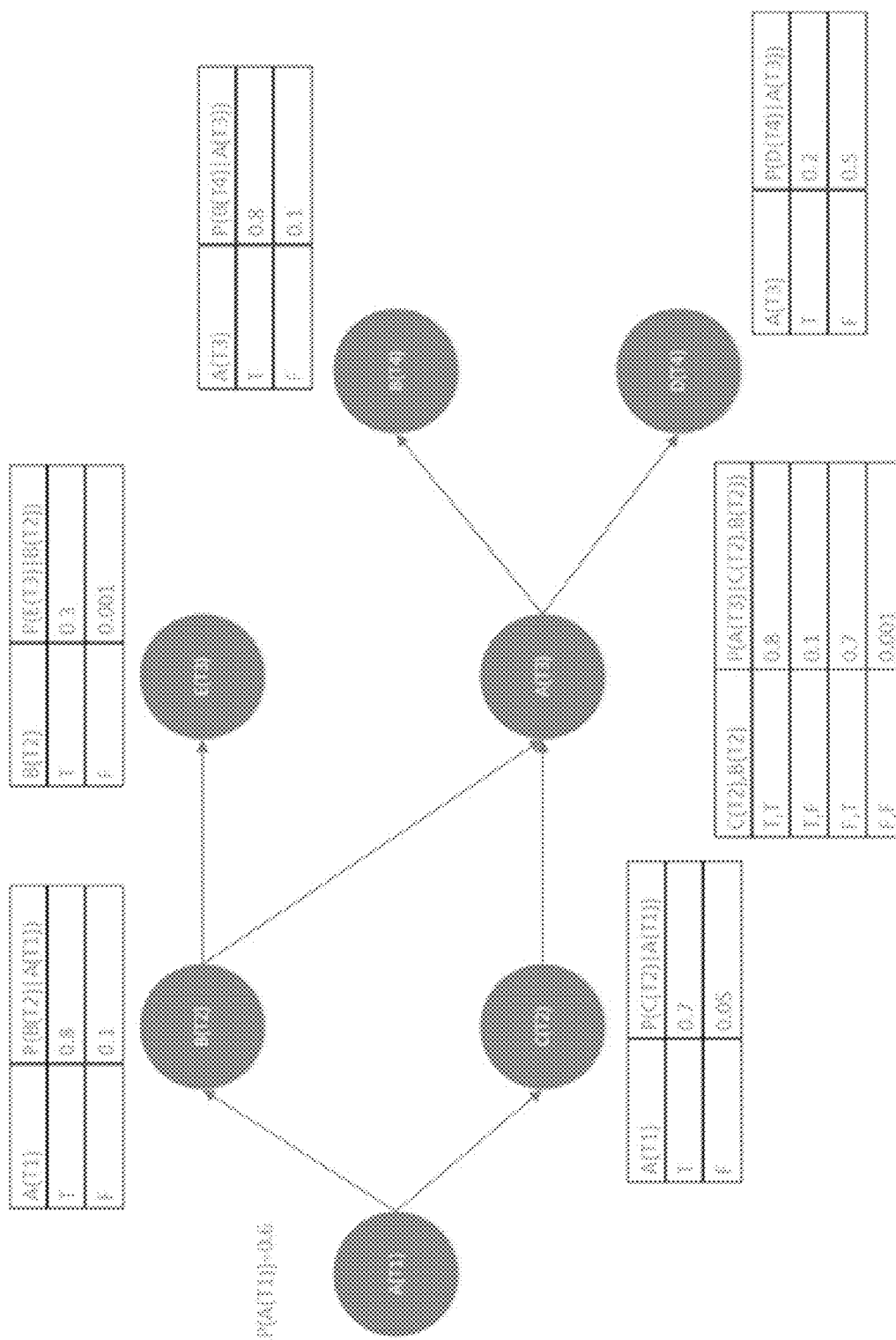
FIG. 8 is a state diagram illustrating one example of a Bayesian predictive tree that may be generated for a set of events.

FIG. 8 is a state diagram illustrating one example of a Bayesian predictive tree that may be generated for a set of events. In this example, assume that based on past behavior data, it is observed that if event A happens at T1, then it is highly likely that transformations B and C will occur at T2 (where B and/or C may represent operations, decisions, etc.). In such a case, an implementation of a VEnv using this Bayesian tree may load transformations B and C into memory so that the VEnv can more quickly provide B or C if it occurs at T2. Further, assume that the past behavioral data also show that if events B and C occur then it's likely that A will occur again at T3 and also highly likely that B will occur again at T4. Further, events E and D each have a relatively low probability of occurring. Therefore, the VEnv stores events A, B and C in memory because it is likely that these events will occur again. Thus, the figure represents a Bayesian network illustrating conditional probabilities that might arise from a sequence of Events within a system.

Figure 28:
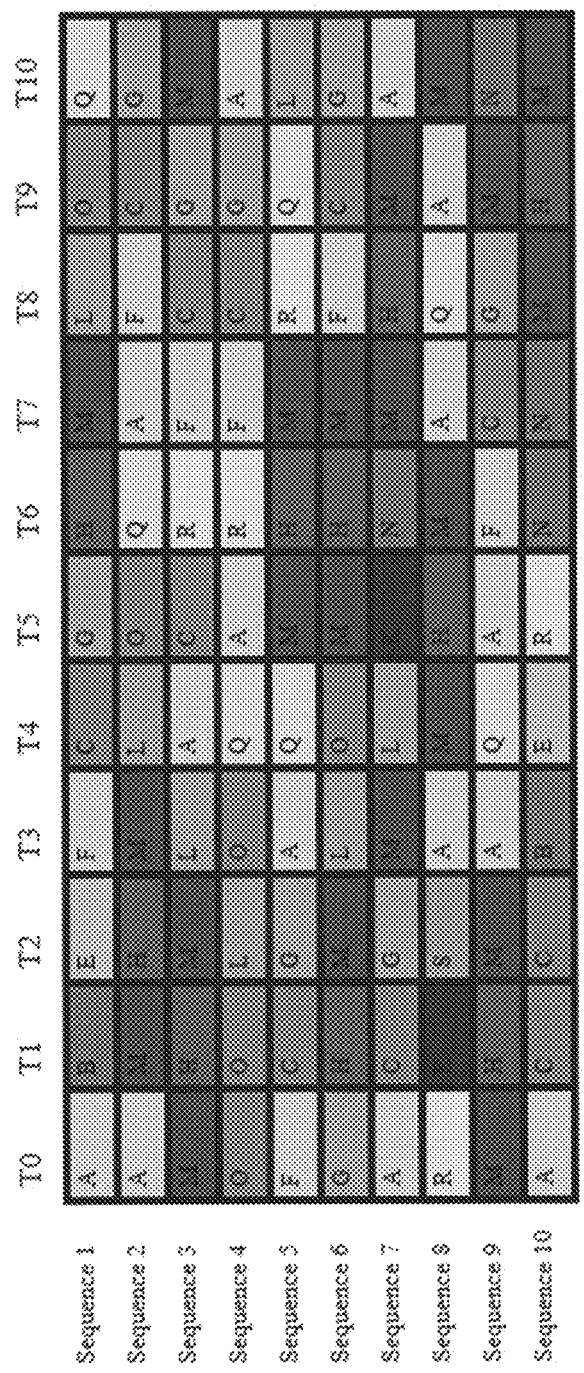
FIG. 28 is a Table illustrating an example of multiple events occurring simultaneously (in the example shown in the figure, there are ten independent threads functioning, with each thread representing a specific calculation) and how the application of a statistical analysis may permit the detection or observance of certain patterns and used to determine a likely set of transformations that a VEnv might store in memory.

As illustrated in the table shown in FIG. 28, in some cases multiple events may occur simultaneously. In the example shown in the figure, there are ten independent threads functioning (with each thread representing a specific calculation—for example, components of a climate model) and each of them are capable of receiving events. From the application of a statistical analysis, certain patterns may be detected or observed and used to determine a likely set of transformations that a VEnv might store in memory. In this example, the Bayesian network indicates that if the transformation set {H,M,C,G,F,A} is loaded into memory, then for over 60% of the time, the VEnv will not need to make a network query or decrypt data even though the set represents only 30% of the possible transformations (these observations are based on a counting of events/transformations within a given time interval ΔT).

Note that typically, Bayesian networks are represented by a-cyclical (that is, non-cyclical) graphs. However, in the context of a Markov chain that is time distributed, a cyclical Bayesian network may be more effective. The reason for this is that A at time T1 is not the same object as A at time T2. So even though the graph appears cyclical, if the network is ordered by time, then it is a-cyclical.

This behavior results because normal (typical) Bayesian networks don't differentiate between something that occurs at time T1 and the same event occurring at time T2. For example, a medical expert system doesn't care about time in this regard and so an event A (person has a fever) at time T1 is the same as event A (the same person has a fever) occurring at T2. This is largely because time is not a relevant dimension in this situation. However, in the inventive system, an event A occurring at T1 is considered to be different from the same event A occurring at T2 (i.e., time is a differentiator).

As described, in some cases a user may interact with an embodiment of the inventive system (and hence with one or more hosted virtual environments) using an external device. This may require use of an intermediate process or element to enable conversion and transmission of signals and data between the user/device and the system. Such intermediate processes or elements are referred to as "adaptors" herein.

However, note that HDLBs may be fully autonomous and self-contained (they contain data and logic that is executed). Therefore, in some cases HDLBs do not have to be associated with a typical "user" (either machine or human) to be able to operate and function within an environment.

When HDLBs communicate with the external world, they may utilize optimized data transmission channels to reduce the volume of data that needs to be transmitted without losing fidelity. In addition, the execution of instructions by HDLBs may be optimized using predictive logic and learning networks which may adapt to both the user as well as to the specifics of the HDLB logic. This combination of optimized execution of instructions or code and optimized data transfer may be performed by elements of the previously mentioned adaptors in conjunction with other elements or processes of the inventive system. Further, certain of the elements or processes of the adaptor may be resident on a client device or a more central server or platform.

Figure 9:
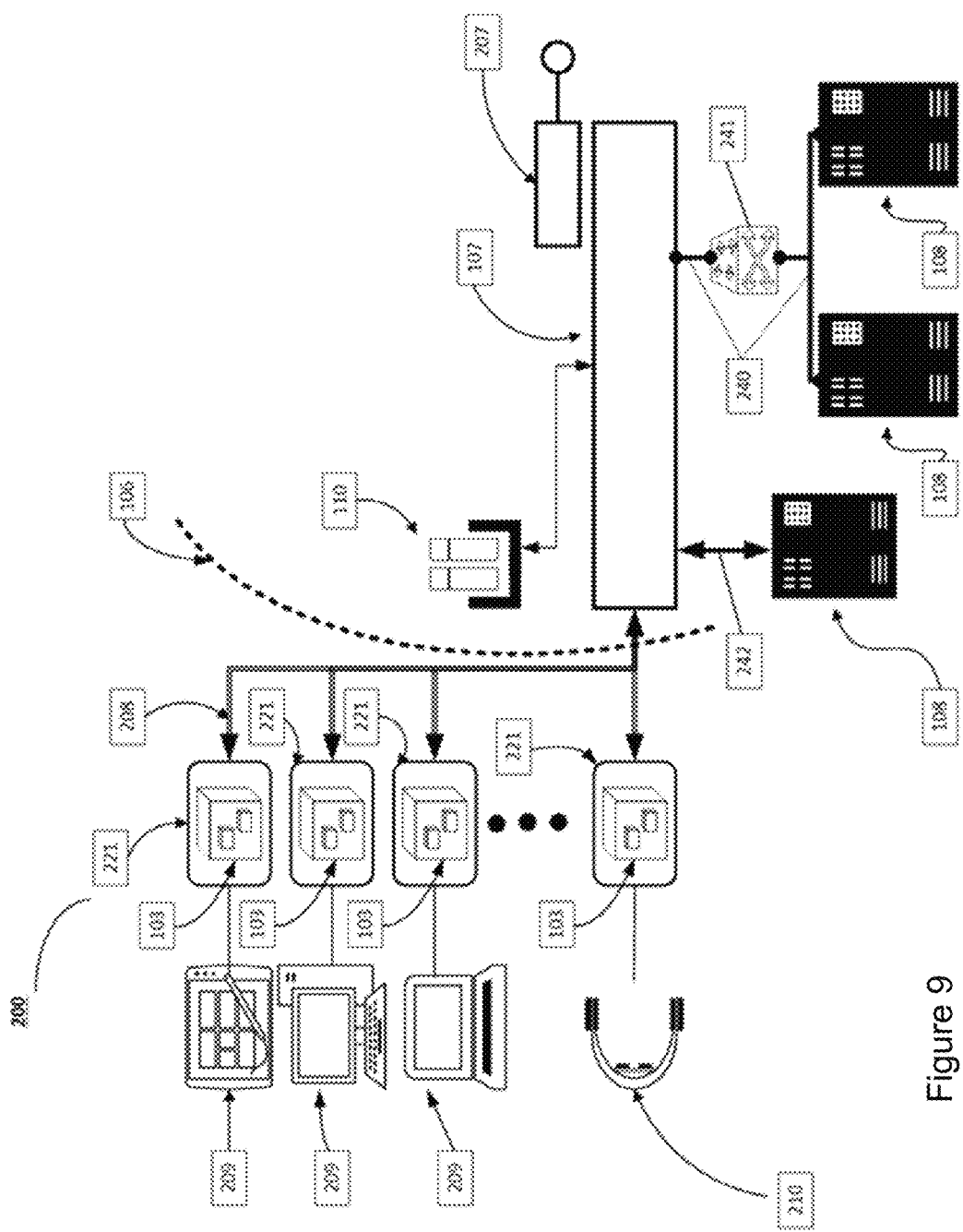
FIG. 9 is a functional block diagram illustrating an example of an architecture 200 for which multiple interface devices 209 are enabled for interaction with virtual entities 103 through the use of adaptors 221.

FIG. 9 is a functional block diagram illustrating an example of an architecture 200 for which multiple interface devices 209 are enabled for interaction with virtual entities 103 through the use of adaptors 221. Adaptors 221 are intermediate entities that convert a stream of data coming through network 208 from the VEnv 106 into a form specific to an attached device 209 (which may be one of multiple device types), as well as converting data received from device 209 into a form that can be understood by the VEnv 106. In one embodiment, sensor information from a device 209 corresponding to the actions of the user of the device interacting with the VEnv 106 is converted into a form that the VEnv can process. Examples of the types of devices that may be used include tablets, smart phones, desktop computers, laptops computers, gaming consoles, and 3D visors. By way of example, in some cases, the adaptor may be a separate hardware device connected to a user's computing device and in other cases the adaptor may be a software program or a component of a software program executing on a computing device directly.

In the example of FIG. 9, VEnvK 107 may be hosted on a single server 242 or a group of networked of servers 240 connected together by bridging system 241 (such as a switch, hub or other front end device that routes processing and message traffic between the VEnvK 107 and the multiple servers). The server configurations provide VEnvK 107 with the resources for the Constructors 110 to generate virtual spaces 221 and, consequently, perceivable representations 103 to the end user. A Constructor 110, once instantiated, will pass instructions to the VEnv kernel 107 which will in turn execute those instructions on a computer or network of computers on which the VEnv kernel is running. The example VEnvK 107 described herein converts instructions created by the constructors into instructions that can (for example) be executed on a single server, a network of servers, or servers distributed across the Internet.

VEnvK 107 may expose capabilities and functions through an application programming interface (API) 207 that enables local and/or remote computing devices to perform actions on the VEnvK 107, such as modifying or deleting data, passing data to the VEnvK 107, or receiving data from the VEnvK 107. As one of ordinary skill in the art will appreciate, API 207 may take one of many suitable forms that enable a program to expose capabilities or data to local and/or remote programs. In this sense API 207 specifies how two systems interact with each other, whether the two systems are local are remote from one another. These suitable forms for API 207 include, but are not limited to, sets of functions that enable a local program or entity to interact with another local program or entity, a set of functions exposed via the Hypertext Transfer Protocol (HTTP) to enable local and/or remote programs to interact, a set of functions exposed using the Common Object Request Broker Architecture (CORBA) to enable local and/or remote programs to interact, or a remote procedure call (RPC) to enable local and/or remote programs to interact.

Figure 10:
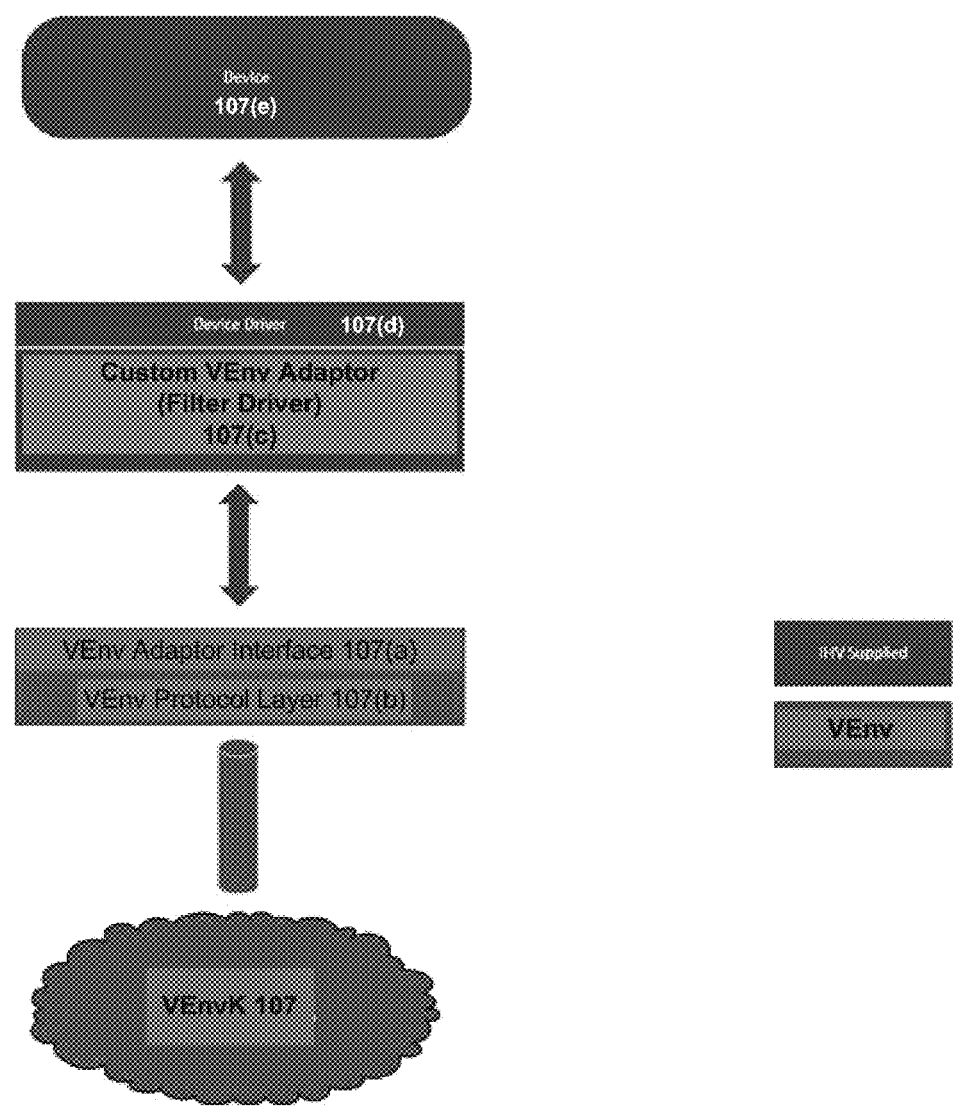
FIG. 10 is a logical layer diagram illustrating an example of the communication link between a device 209 and VEnvK 107.

FIG. 10 is a logical layer diagram illustrating an example of the communication link between a device 209 and VEnvK 107. In this example, VEnvK 107 provides a standard VEnv Adaptor Interface (element 107(*a*)) and VEnv Protocol Layer (element 107(*b*)) for communication with VEnvK 107 and the virtual entities within the virtual environment. In some examples, an Independent Hardware Vendor (IHV) may provide a custom VEnv Adaptor (element 107(*c*)) that converts the communications of a device driver (107(*d*)) for the vendor device (107(*e*)) into the standard VEnv Adaptor Interface and Protocol Layer. This allows hardware vendors to develop devices to interface with the VEnv that are able to communicate and/or interact with substantially any object in the virtual environment.

Figure 11:
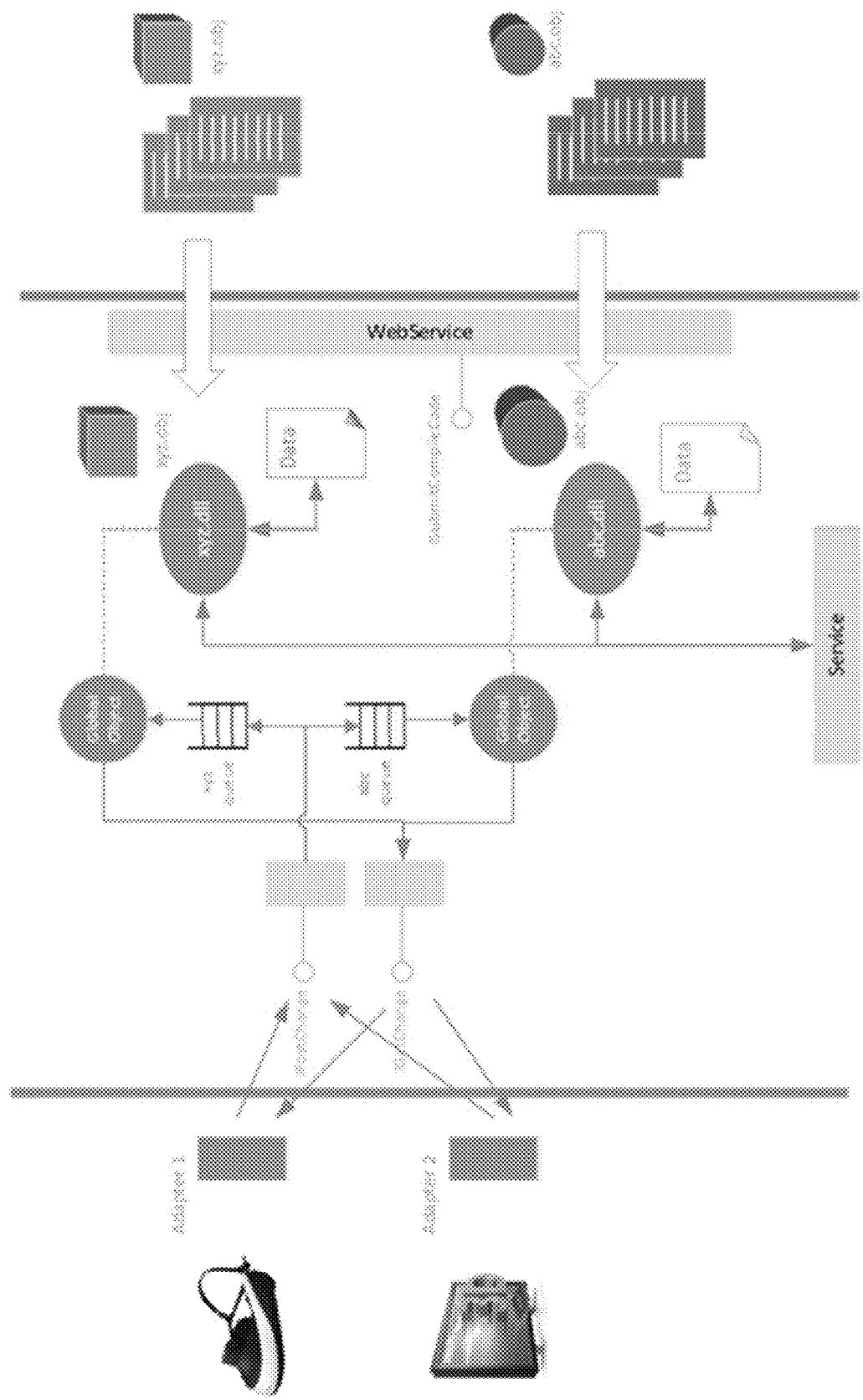
FIG. 11 is a diagram illustrating an example architecture of a web based VEnv system that may be implemented as part of an embodiment of the inventive system and methods.

FIG. 11 is a diagram illustrating an example architecture of a web based VEnv system that may be implemented as part of an embodiment of the inventive system and methods. The example architecture shown in FIG. 11 follows a standard 3-tier architecture with a "thin" web service layer, an extended hosting farm, and a data layer. At a high level, the VEnv system is a cloud-based service that exposes APIs to enable developers to onboard content and to enable users to interact with that content. The code components are typically hosted in a "sandbox" that is, in turn, managed by a daemon/service. The sandbox itself is a runtime that exposes rich functionality for use by the components. Components typically cannot directly call a subsystem in the VEnv system because they are running at the lowest trust level. To interact with a VEnv subsystem, the component must make use of the sandbox runtime that will isolate the Modules by restricting access to subsystems. The sandbox can call the subsystems, but the sandbox is typically restricted to accessing a set of resources and cannot access resources outside of this set. For example, the sandbox may be restricted to only writing to a particular area of a disk, or accessing only a certain range of memory addresses, etc.

In FIG. 11, object code Module xyz.obj is submitted to the VEnv system via a webservice SubmitCompileCode( ), which is added to the VEnv libraries via xyz.dll. Note that Xyz.dll will be the C-Core and the service creates a runtime for the C-Core. The global object is an entity that is managed by the runtime to handle incoming and outgoing messages for the xyz C-Core and to serialize them. The xyz.obj may be executed to instantiate a global object xyz with xyz queue to handle signaling for the object. An abc.obj code Module may be similarly submitted and instantiated in the VEnv. Global objects xyz and abc have access to VEnv subsystem resources through the VEnv sandbox service. Global objects xyz and abc communicate with a HUD (heads up display) device through Adaptor 1 and with a 3D display interface device through Adaptor 2. When a user of the devices acts upon objects in the VEnv, the adaptors post the action as a message signal through a webservice IPostChange( ), which places the message signal on a messaging queue for the appropriate object (e.g., global object xyz or abc). Each global object processes the messages in its queue to determine the changes to objects in the VEnv and, based on the processing, typically provides the changes for access by the Adaptors using webservice IGetChange( ). Thus, user interactions with objects in the VEnv are processed and presented to the users for perception, display, expression, etc.

Figure 12:
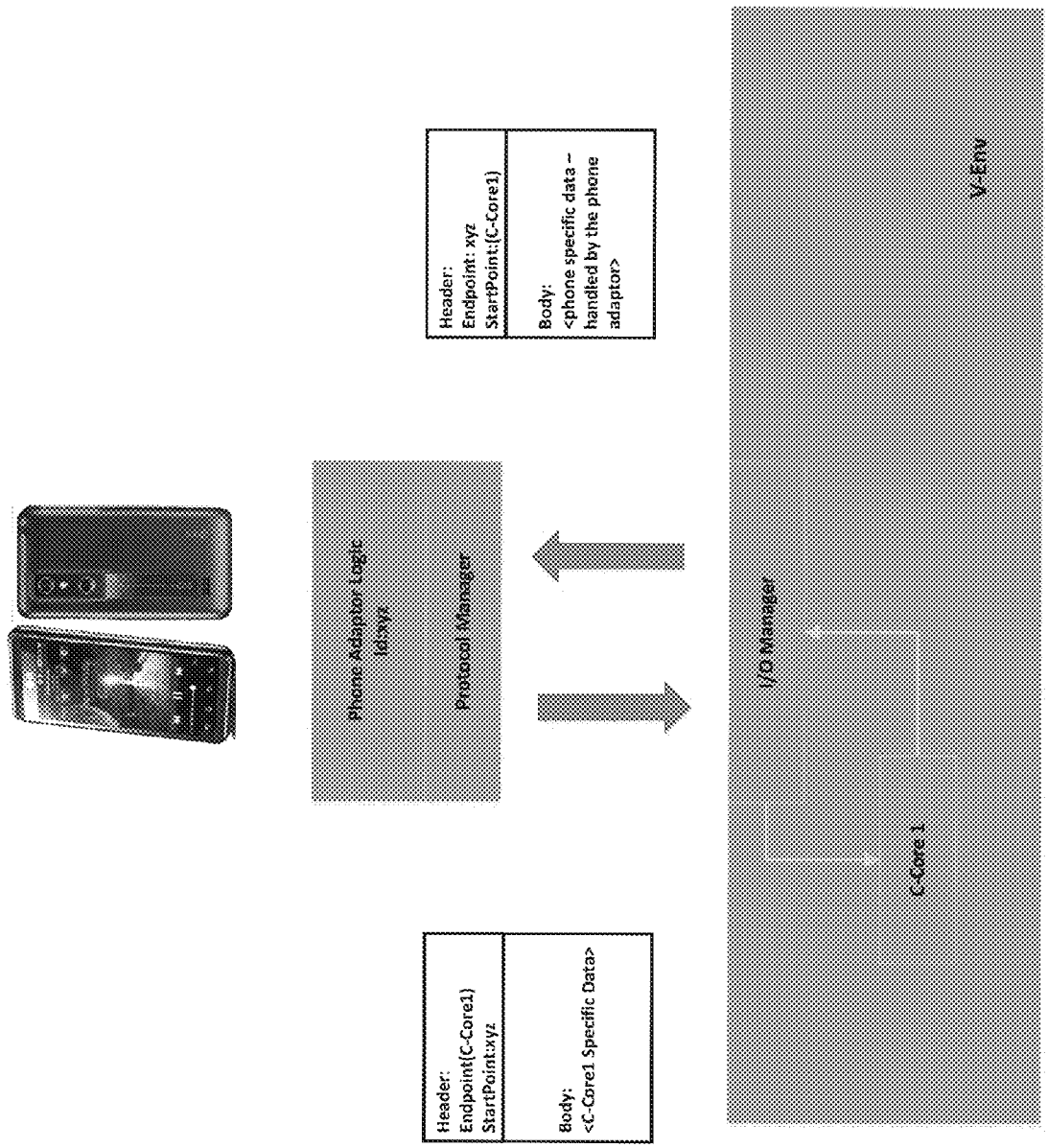
FIG. 12 is a diagram illustrating one example of an interaction between an adaptor for a phone device and a Virtual Entity residing within a C-Core.

FIG. 12 is a diagram illustrating one example of an interaction between an adaptor for a phone device and a Virtual Entity residing within a C-Core. For example, the phone device corresponding to the phone adaptor is a real-world device, while the virtual entity in the C-Core is a virtual phone in a virtual room corresponding to the C-Core. Calls may be made between the real and virtual phones by users/actors, i.e., a call from the real-world phone to the virtual entity phone results in the virtual phone ringing and an actor in the virtual room may answer the virtual phone and conduct a conversation. In the example of FIG. 12, the Phone Adaptor, which contains logic for translating communication traffic between the real-world phone and the VEnv, has a UUID of "xyz". A Protocol Manager is associated with an endpoint inside the VEnv, which is C-Core1. Data is streamed to and from the VEnv through the Phone Adaptor and the Protocol Manager. A packet sent to the VEnv includes a Header that contains information about the start point as well as the virtual address of C-Core1 (e.g., Header: Endpoint(C-Core1); StartPoint: xyz; Body: <C-Core1 specific data>). The body of the packet contains data that may be processed by the logic of a Module within C-Core1, e.g., phone control logic.

An I/O Manager in the VEnv receives the packet from the Phone Adaptor and Protocol Manager and routes the message to the identified endpoint, e.g. C-Core1, based on routing and handling protocols that are standard throughout the VEnv. C-Core1 determines a virtual entity (e.g., a HDLB) within C-Core1 for which the message is intended, and sends an appropriate event message with the message data to the event message queue for the virtual entity. The virtual entity in C-Core1 processes its message event queue, receives the data in the body of the packet, and processes that data according to logic defined in the Module corresponding to the virtual entity.

For example, the logic for the virtual entity may interpret the body of the message as a phone call to the virtual entity, which is a virtual phone in the virtual room defined by C-Core1, and cause the virtual phone to audibly ring within the virtual room. A user or actor who is virtually present in the virtual room will hear the audible ringing as it is rendered in the VEnv and sent to the user's interface device or devices. The user may interact with the virtual phone, e.g., by directing the user's avatar to pick up the virtual phone, which causes the logic for the virtual entity to send an answer message to the Phone Adaptor Logic for "xyz" (e.g., Header: Endpoint: xyz; StartPoint: (C-Core1); Body: <phone specific data—handled by the phone adaptor>). The adaptor logic and virtual entity logic then interact to establish a voice channel between the Phone Adaptor "xyz" and the virtual phone in C-Core 1. Thus, in this example, a phone call may be maintained between a real-world phone supported by Phone Adaptor Logic Id:xyz and a virtual phone in C-Core1, where communications to the virtual phone are rendered and sent to the user's interface device for perception. This can enable the user of the real-world phone and the user in the virtual room for C-Core1 to speak to one another. A service provider and/or a hardware vendor for the real-world phone may develop and make available through the VEnv the Phone Adaptor and C-Core1 for use by other users or actors in the VEnv. These virtual objects may be offered for sale or the service provider may charge for the service of using the virtual objects.

Figure 13:
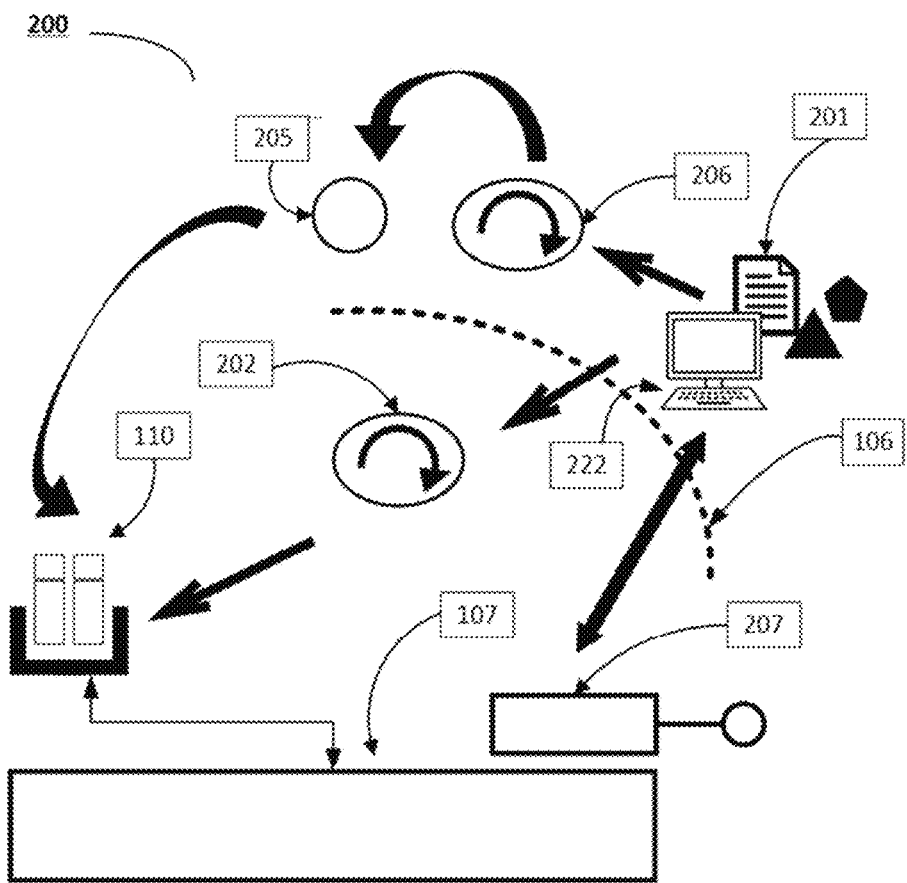
FIG. 13 illustrates an example of how a Constructor may be created by a programmer, compiled, and instantiated.

FIG. 13 illustrates an example of how a Constructor may be created by a programmer, compiled, and instantiated. In some embodiments, developers may submit code to the VEnv service where the compiler will take that code and create binaries. In one example, two types of component binaries exist. The first builds the C-Core and provides instructions to the VEnv as to what the C-Core environment will look like, as well as any associated behaviors. The second type generates the Modules. The C-Core and Module code needs to support a set of APIs for the VEnv and the code can, in turn, make use of standard APIs that are exposed by the VEnv Kernel. An Integrated Development Environment (IDE) may be provided to allow developers to validate their code and an emulator to allow developers to test code before releasing it into the VEnv.

As described, in some embodiments, each virtual entity (HDLB) may be individually programmed to exhibit individual and intrinsic behavior. In the example of FIG. 13, the HDLB is based on a Constructor that contains Modules that are examples of compiled code driving the behavior of the HDLB. One or more programming languages may be used to program the behavior of the HDLB. A package 201 containing source code and associated resources is created by a developer using a suitable programming language. One example of a process for creating a constructor involves a developer using a local computing device 222 to create package 201, which is then submitted to the VEnvK 107 using a service provided by the API 207. Package 201 is compiled by VEnv compiler 202 to create an executable binary for Constructor 110 and its associated Modules. In another example of a process, the developer uses a local compiler 206 on the computing device 222 to produce a compiled binary object 205 that is submitted to VEnvK 107 using a service provided by the VEnvK API 207. The binaries for Constructor 110 permit it to be instantiated along with its associated Modules to create a virtual space and associated virtual entities. The developer in this case is an entity that is capable of producing source code that may be compiled, e.g., a human or a machine.

Constructor 110 may execute instructions in any suitable way inside a VEnv, such as executing instructions in a VEnv runtime. For example, as an active process, Constructor 110 will stay in residence and perform any background task carried out by a Module. If all its Modules are idle, Constructor 110 may become dormant until activated by a condition, such as when another HDLB interacts with a HDLB generated by the Constructor 110.

In one example, Constructors 110 may persist in an active executing state and execute continuously, or constructors may stop execution at some point in their programming, such as when an indicated action or event has occurred. A Constructor may be destroyed, which means that it no longer exists in the VEnv 106. This event may occur, for example, if the Constructor has completed a programmed set of activities, the Constructor has been dormant or in a non-executing state for some time, a command is issued to terminate the Constructor, or some other triggering event has occurred. Similarly, virtual entities generated within a Constructor may be terminated when the corresponding Constructor is destroyed, when the Module that created the virtual entity issues a command to terminate it, or when the underlying Module is moved into a non-executing state or some other such event has occurred.

It is also possible that a virtual entity (a HDLB) will persist, in which case termination is either the result of a system "housekeeping service" that removes HDLBs that are inactive or are impacting the ability of the system/platform as a whole to function, or by action of the owner of the HDLB. Note that when an HDLB is created by triggering a module to create it, the HDLB is assigned an owner. The owner may be billed for resources used by the HDLB and also has complete rights to the HDLB, which includes managing its use as well as access to the HDLB.

HDLBs move from one C-Core to another by de-registering from one C-Core and registering with another. In order for a HDLB to register with a C-Core, certain conditions may need to be met. For example, a first might be that basic security protocols verify that the HDLB does not contain malicious code, a second condition that the HDLB is well formed, and a third that the family of the HDLB is one that is allowed by the C-Core.

Note that in some embodiments, HDLBs can form associations or a group of connected entities. This may be possible if each HDLB (or a sub-set of the total set of HDLBs, such as those of a certain class) maintains a table that contains a set of other HDLBs. This is typically a system maintained table and the HDLB identifiers are held temporarily. There may be a second table that is populated and is capable of maintaining a persistent list of external HDLB identifiers. This arrangement allows a set of HDLBs to form a loose event-driven network.

Such a network may be useful in many situations. For example, this arrangement may be useful for simulating a complex machine, where one HDLB represents a turbine, another represents a low pressure shaft, a third represents a combustion chamber, etc. In this case, each HDLB has certain inherent properties and behaviors. One or more of the HDLB, for example, may contain material properties such as tolerances, the HDLB representing the low pressure shaft communicates to the turbine HDLB via an event, and the turbine HDLB in turn sends out an event indicating that it has exceeded allowable torque.

As noted, a user or actor may interact with a virtual entity by perceiving and/or acting upon the HDLB in a number of ways. Perception could include, among many things, seeing, hearing, tasting, and smelling. Acting upon a HDLB may include, for example, virtual transformations of the HDLB such as translation or rotation, manipulating data, or entering data. An actor will interact with a HDLB through a system that is capable of transmitting actions to the virtual environment in which the HDLB exists and/or receiving data from the virtual environment. Perception and action will typically involve use of a suitable adaptor (which, as described, is a device, program or system capable of transforming a signal emanating from the virtual environment into a signal that can be comprehended by one of the devices or systems and/or, conversely, transforming a signal specific to a single device or system into a signal that is consumable and actionable by the virtual environment).

Figure 14:
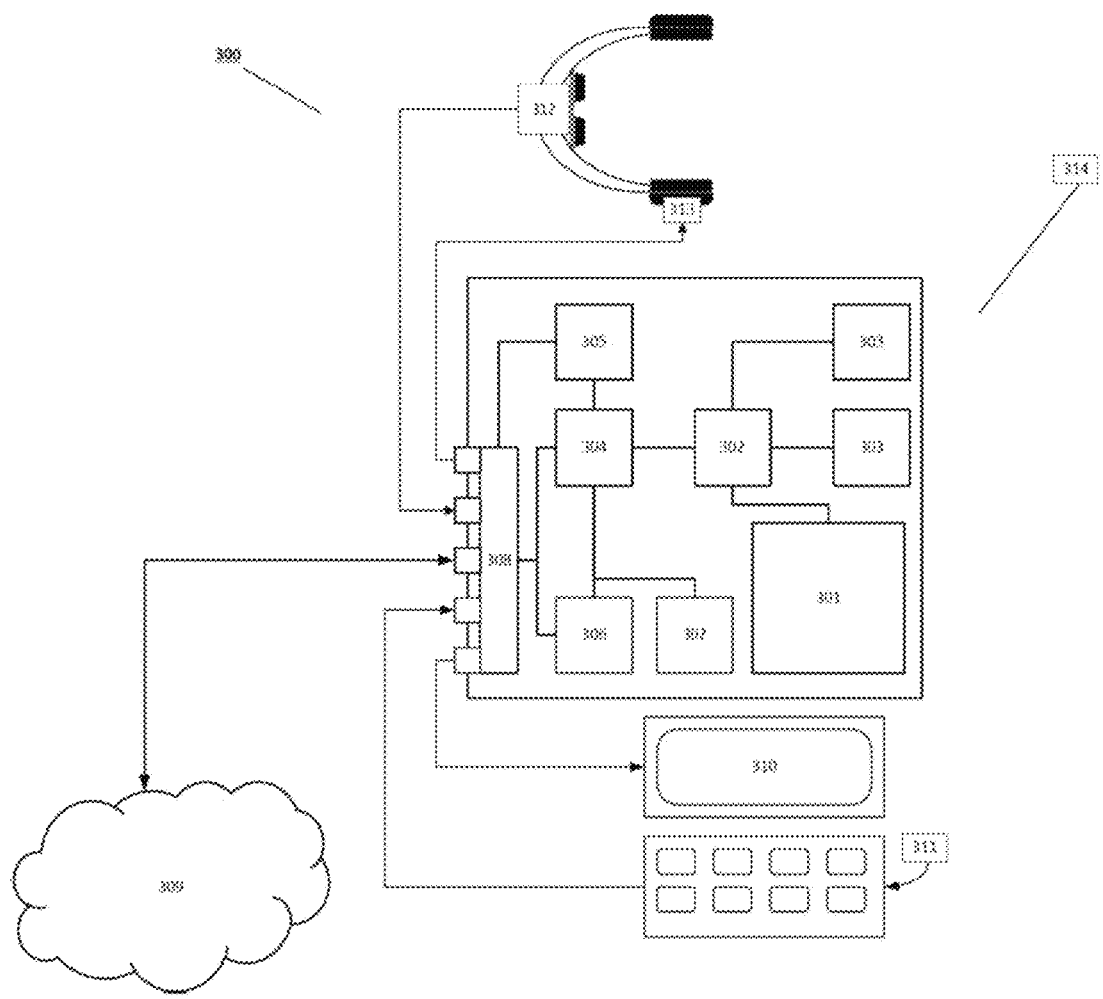
FIG. 14 is a block diagram illustrating an example of an adaptor that is implemented in the form of a hardware device 314.

FIG. 14 is a block diagram illustrating an example of an adaptor that is implemented in the form of a hardware device 314. In this example, adaptor 314 includes a Central Processing Unit (CPU) 301, northbridge memory controller 302 that is connected to random access memory (RAM) Modules 303, southbridge I/O controller hub 304, which in turn is connected to the onboard graphics controller 305, input and output controller 306 connected to I/O ports 308, and may be connected to a mass storage device. Read only memory (ROM) device 307 may also be connected to southbridge hub 304. Ports 308 may support various connection methods, such as universal serial bus (USB), high definition multimedia interface (HDMI), Bluetooth and/or other wireless protocols (e.g., IEEE 802.11, Mini DisplayPort (MDP) and other suitable connection technologies), and are connected to I/O controller 304 and onboard graphics controller 305.

In the example shown in FIG. 14, an external device, head mounted display (HMD) 300, has a set of sensors 312 that may include, but are not limited to, accelerometers, proximity sensors, light sensors, cameras, and/or other suitable sensors, and an input port or ports 313 that may support one or more connection methods through ports 308. The HMD 300 is connected to adaptor 314 through I/O ports 308, receives signals from sensor array 312, and sends signals to the input ports 313. The adaptor 314 is connected to the virtual environment (VEnv 309) using one or more of several possible ways, including, but not limited to, wireless local area network (WLAN), Bluetooth, USB and other suitable methods. The adaptor 314 also sends and receives signals to and from the VEnv. Adaptor 314 is also coupled to an actor device display 310 and input 311 (e.g., a game console), which also sends and receives signals with the VEnv through adaptor 314.

Figure 15:
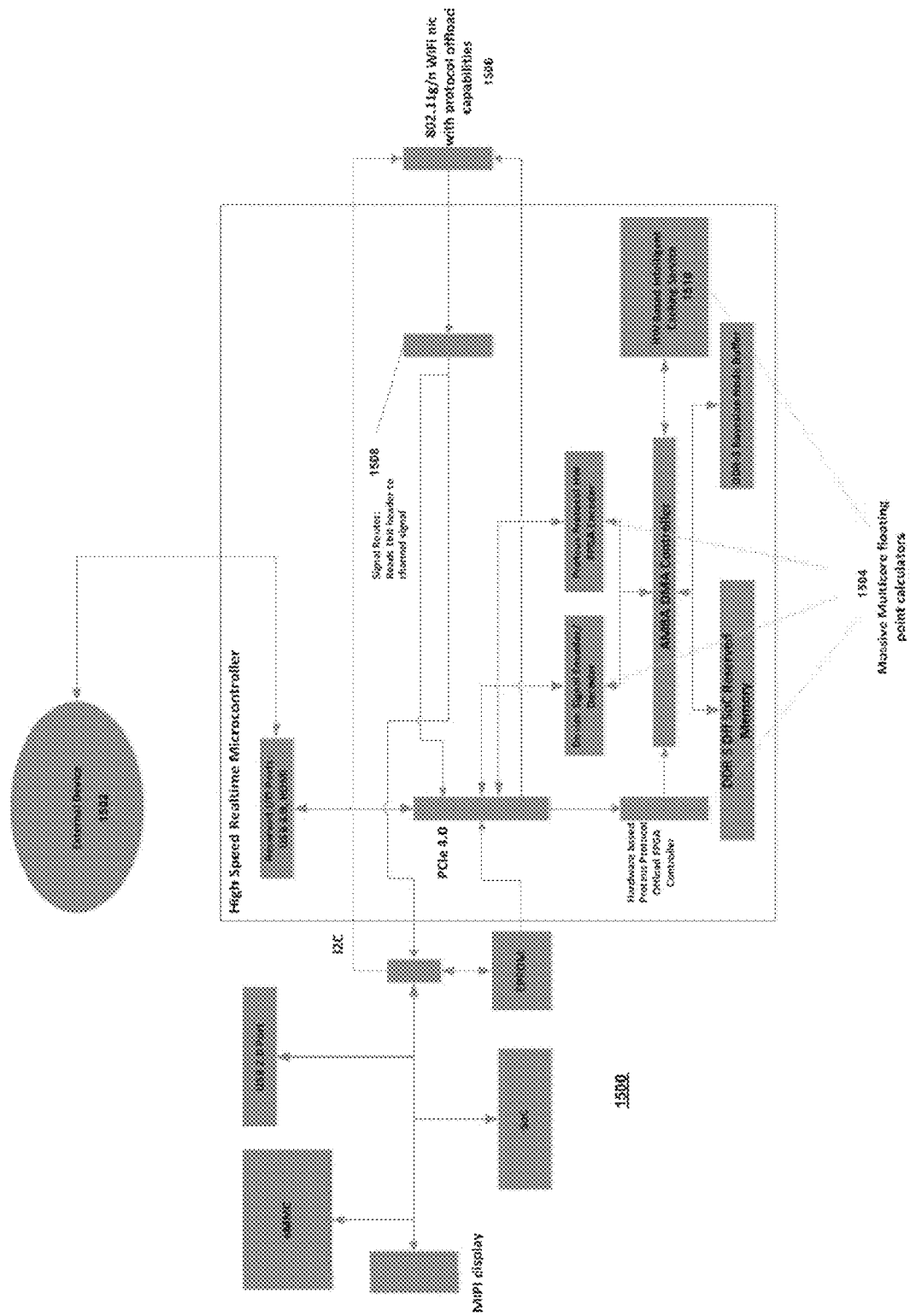
FIG. 15 is a diagram showing certain elements or processes of an example adaptor device for providing an interface between an external user device and a virtual environment.

FIG. 15 is a diagram showing certain elements or processes of an example adaptor device 1500 for providing an interface between an external user device 1502 and a virtual environment. The illustrated adaptor device utilizes multiple multicore floating point calculators 1504 to accelerate the processing of signals between the external device 1502 and the VEnv. For example, protocol offloading of VEnv signal routing may be implemented by the adaptor, wherein incoming packets on a Wi-Fi NIC 1506 are monitored by a signal router 1508 that looks for a flag or signal bit that causes VEnv packets to be diverted to specialized hardware configured for device 1504 signal encoding/decoding, VEnv protocol handling, or DMA access to accelerate processing of a VEnv originated signal for the external device.

In the illustrated example, the adaptor 1500 includes an embedded Bayesian intelligent caching service 1510 (or other predictive pattern matching based process or service, such as that described with reference to FIG. 26) for use in predictive processing operations. The Bayesian network may be configured to be updatable from the VEnv cloud-based platform in order to obtain Bayesian network data from a larger (i.e., aggregate) dataset, such as one based on behavioral data for multiple users. Predictive processing may be used to reduce perceived latency and improve the user experience, such as by downloading graphic primitives in advance of a time when they will be needed based on predictions of the graphics that might be used (e.g., based on past activity for a game or for a user).

Note that predictive resource allocation in the VEnv may utilize the concept of saliency to allocate additional resources for processing signal activity. For example, if activity in the VEnv deviates from established patterns (suggesting that it might be more relevant in that situation), then an unsupervised learning system can operate to recognize the activity/deviation and generate requests for additional resources to process the new activity.

The structure, function, operation, and implementation of a neural network that is capable of recognizing potentially salient features or events is described in greater detail in the United States Non-Provisional Patent Application entitled "System, Apparatus and Methods for Adaptive Data Transport and Optimization of Application Execution", application Ser. No. 14/878,854, assigned to the same entity as the present application and filed concurrently with this application, and the contents of which are hereby incorporated by reference in their entirety for all purposes.

In contrast, conventional systems typically reside on a local device and utilize an assumed Poisson distribution for predictions. Other conventional implementations may be reactionary and allocate resources in response to a spike in usage instead of anticipating the increased need for resources; this approach can result in greater latency. However, the predictive approaches used in some embodiments of the inventive system and methods may utilize self-learning for intelligent resource allocation in order to increase the performance of a cloud architecture for hosting a virtual environment, as well as support scalability and more efficient use of resources.

As described, the inventive adaptors enable devices and humans to interact with the virtual environments and entities in an effective and efficient manner. These are needed as viewing high fidelity content (such as a virtual reality environment) is currently unfeasible unless the content is downloaded ahead of time. This restricts certain types of real-time behavior as it is not possible to update the content frequently enough for a satisfactory user experience. In some cases, such as a gaming environment, this may not be a serious problem, but in scenarios where the object(s) being viewed are updated continuously (such as a simulation, system model, or virtual landscape), this can pose serious limitations.

The inventive adaptors provide a solution to this problem through implementation of one or more of several mechanisms and processes:

Logic that "predicts" (i.e., attempts to make an intelligent prediction of) what the user or device is going to do next. One method (as described with reference to FIG. 26) is to determine connections between events, such as determining that when event A occurs there is a sufficiently high likelihood of event B happening. This allows the system to pre-compute the impact of event B on the state of a system or environment.

For example, it is possible that an event could represent an action such as moving in a 3D space. If the system notices that moving to the left is followed by moving straight, then it will precompute moving straight. This can be determined using a Bayesian network. A key aspect to note is that as everything is event driven, one can correlate events and make event predictions, which translates to applying an operator to a HDLB to cause it to move from one state to another. As described, the use of a Bayesian network in the context of the inventive system differs from the conventional use of a Bayesian network, as it is possible that a given event may occur multiple times in a graph. Note this is more in accordance with human behavior and experience.

With the approach described, it is possible to generate an unsupervised learning machine (for example, the previously described neural network) that is able to map out dependencies and causal relationships (note that in a typical Bayesian network, causality is implied but not guaranteed). In the case of the inventive system, it is more likely that the Bayesian network can identify a root cause of an event, as it can analyze a sequence of possibly repeating events and identify events that are highly likely to cause a change in state. Another advantage of this approach is that, because the network is unsupervised, it is able to dynamically update itself as more information arrives. In contrast, most implementations of Bayesian networks have difficulty doing this (or are unable to) because cyclical Bayesian networks are typically prohibited.

This approach is different from conventional predictive systems that are used to optimize data traffic, as conventionally, prediction is based on identifying data that is most frequently accessed and storing that data on the client side, with the less frequently accessed data stored on the data server side (this is conventionally termed "intelligent caching").

The inventive approach "learns" from the user and makes predictions about what the user is expected to do next, and then prepares the configuration of the system for the anticipated behavior. This is different from (and more effective than) conventional methods because it is capable of understanding more complex behavior than simply identifying the most frequently used data.

For example, one implementation could be to break down operations into logical "memes", construct the system based on instruction sequences and then make predictions as to what will be executed next. In this approach, events correspond to distinct operations. It is assumed that when an event S is received, an action A(S) is executed, where A is a logical function or operation, as represented by a meme. By analyzing an example of the network, the system can learn that if A happens, then it is likely that action B or C will happen next (but not E or D). This allows the system to pre-compute the actions of A, B, and C, on the state of the system and store the results, or to pre-compute a sequence of actions and pre-load an instruction sequence for more rapid execution.

Note that this approach is different from conventional approaches, such as data or instruction prefetching, because in the case of pre-fetching a system is analyzing application usage and then pre-loading data that the application is expected to need. In contrast, in the case of the inventive system, predictions are made at the instruction level, followed by pre-loading and executing those instructions, with the outcome being stored in memory.

For example, suppose that the system predicts that there is a high probability that if a user (A) draws a triangle, then he will want to draw a rectangle next. In such a case, the algorithm will make the rectangle available for drawing. On the other hand, if user (B) shows no such pattern, then the system makes such no optimization decision;

Another example use case could be a flight simulator where a pilot may take one action (such as changing the pitch of the aileron) which could result in a descent or a roll, but mostly the pilot initiates a roll. In this case, the system will load the code and associated resources relevant to a roll.

In another case, a financial simulation system responds to market inputs. When an event happens, the response could be minimal or the response could be profound. A profound change would mean a lot of computing resources brought to bear, whereas a minor change will not require as many additional computations. For example, one consequence of a rise in the price of oil could be an increase in interest rates as well as lower short term bond prices, and a likely drop in other commodity prices. Or instead, it could mean that nothing happens because the rise will not impact inflation. If the simulation realizes that the second case is more likely, then it won't bother allocating more resources, whereas if it sees that the first case is more likely (possibly because of another factor, such as that real estate prices are showing sharp increases), then it will pre-load some or all of the code and resources that it needs to compute the event flow and processing for that scenario.

Another example use case might be that the system realizes that the user is more likely to read emails in a new window than in the reading pane; in this case, the system will be able to pre-load the resources needed to launch the new window at start-up. Moreover, if the user reads emails from certain users first, then the system can pre-load those emails into memory. Conversely, if the user tends to mostly read emails in the reading pane, then the system won't respond in the same way.

Yet another example might be that the system realizes that a given user is a poor coder and so will respond by pre-loading code analysis and exception analysis systems into memory.

Saliency based load balancing. Using this technique, the system is able to understand when the user/device (actor) is about to change its behavior and then notify the back-end processing elements to prepare for the change in behavior (by, for example, adding more computational resources, or pre-buffering data). As mentioned, the structure, function, operation, and implementation of a neural network that is capable of recognizing potentially salient features or events is described in greater detail in the United States Non-Provisional Patent Application No. 14/878,854, entitled "System, Apparatus and Methods for Adaptive Data Transport and Optimization of Application Execution", the contents of which are hereby incorporated by reference in their entirety for all purposes;

For example, an understanding of the relative saliency of an event occurring within a system can be used to identify and implement changes in resource usage needs, either by making decisions as to when to de-allocate resources or (conversely) when to allocate resources. Saliency can also be used by a system to identify errors, and to determine whether there has been a possible security breach by noticing variations in a user's behaviour that are inconsistent with previous behavior;

Event sequence caching. If the system detects a clustering of events, then it will cache them and download content from the back end server that is required for handling the set of events, instead of all of the possibly relevant content;

An example of this use case is that of the operation of a gaming system—in a gaming environment, if common things occur (such as some area of virtual gaming being used), then there could be markers in this gaming area. If the system recognizes that a standard set of markers are encountered in sequence or nearly in sequence as a result of a user taking some action (such as opening a door and going down a corridor), then when a user hits one of these markers, the game system will have already downloaded the resources/assets it needs to render the parts of the environment that the user is likely to traverse next because it recognizes that the marker was part of a sequence. Similarly, the gaming system will not download other aspects or areas of the game that are not expected to be used;

Another possible use case is that of a "smart" house that is able to recognize that its owner typically follows a certain sequence when entering the house—e.g., comes in, goes into the living room, starts the fireplace, turns on the TV, goes to the refrigerator, etc. In such as case, as soon as the house detects that the owner is approaching the house, it could start up the fireplace, turn on the TV, turn on the lights in the living room etc.;

Data interpolation. In this situation, the system applies an auto-associative neural network to reconstruct data using partial information. This can be used to reduce the amount of data that is needed to be transferred over a network in order to provide a user with a satisfactory level of content fidelity—the implementation and application of this technique is discussed in greater detail in the previously mentioned United States Non-Provisional Patent Application No. 14/878,854, entitled "System, Apparatus and Methods for Adaptive Data Transport and Optimization of Application Execution", the contents of which are hereby incorporated by reference in their entirety for all purposes;

Perception based logic that adapts to human perception (e.g., incorporation of high resolution in the center of vision, with a more blurred exterior to mimic the behavior of the human eye and mind); or Application of a technique based on discrete differential geometry—in this approach, rather than specifying every node in a 3D mesh, the system can make reconstructions/interpolations based on the anticipated curvature of a space or region. This approach uses certain recognized local information about the curvature/geometry of a shape to reduce the amount of data that is needed to be transferred over a network to define that shape to a client device or system.

A hardware based implementation of an embodiment of the inventive adaptor will be responsible for a large amount of processing and therefore will consume a significant amount of power. In some embodiments, the system may use one or more of several methods to minimize or reduce power consumption, such as:

- Using FPGAs to handle most of the AI logic in hardware without losing the ability to update the hardware;
- Non-essential parts of the hardware are handled by a low power processor;
- Use a minimalist user interface;
- No sensors or peripherals;
- Aggressive sleep policies;
- Passive liquid based cooling system;
- Ultra-low power wireless components;
- Low power buses for non-critical operations; or
- Using the Peltier Effect for some amount of power recovery.

It is also possible to provide most, if not all, of the adaptor as a software application, running on a standard computing device such as a PC, tablet, cell-phone, IoT (internet of things) device, printer, camera, or any other device with an onboard computer. Naturally, the capabilities will be more restricted as the adaptor will not utilize the same amount of processing capability due to the resident device's power constraints.

Figure 16:
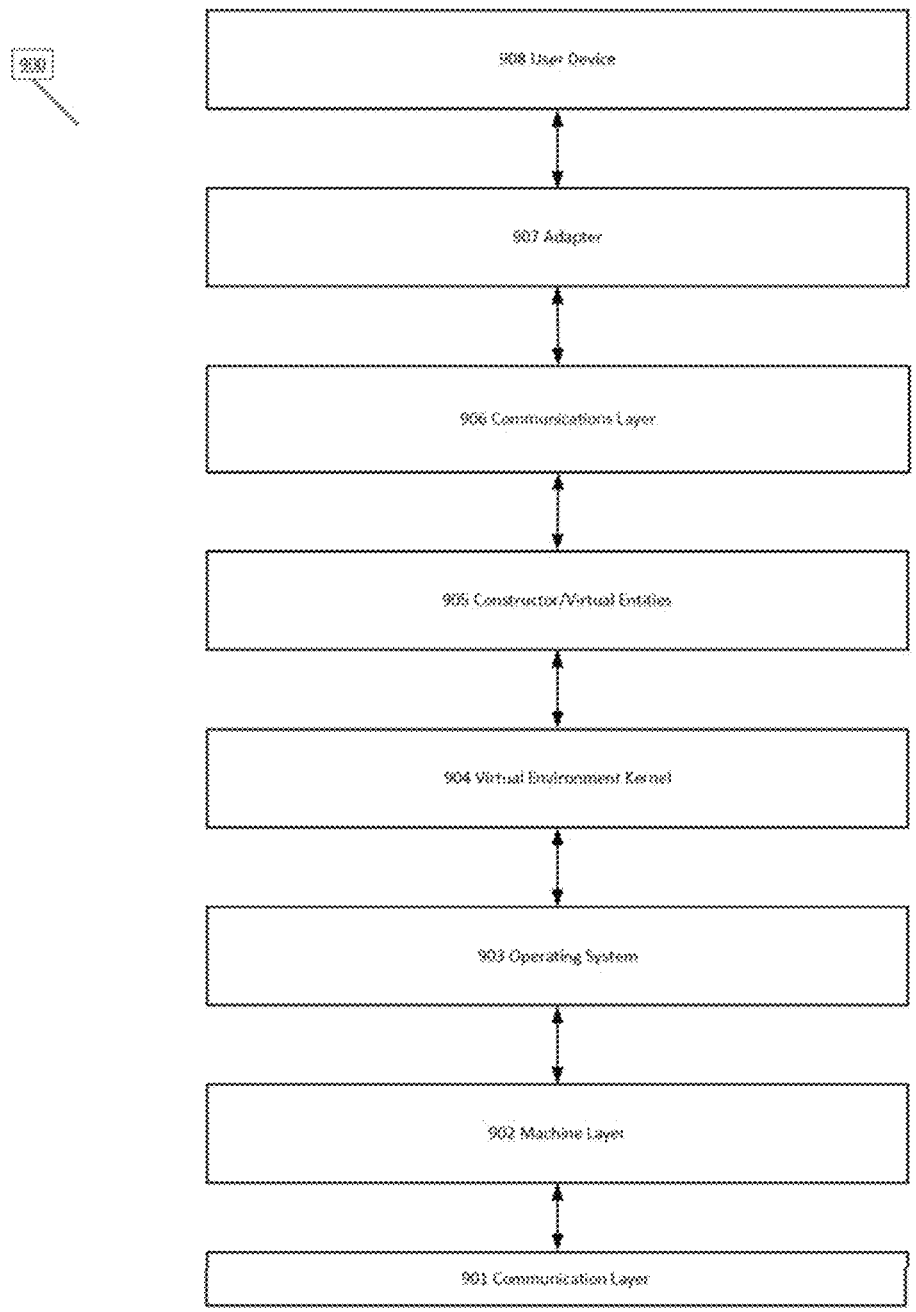
FIG. 16 is a diagram illustrating an example process flow for how interaction with a VEnv logically occurs in an embodiment of the inventive system.

FIG. 16 is a diagram illustrating an example process flow 900 for how interaction with a VEnv logically occurs in an embodiment of the inventive system. Referring to the figure, an actor/user device 908 (such as a phone, laptop, HUD, or personal computer) exchanges signals with adaptor 907. Adaptor 907 exchanges signals through communications layer 906 to virtual entity (HDLB) 905. Virtual entity 905 sends instructions to and receives instructions from VEnvK 904. VEnvK 904 sends instructions to and receives instructions from the operating system 903. Operating system 903 sends information to and receives signals from a machine layer 902, which, in this example, is a server device/platform that supports the VEnv. The server/machine layer 902 may be connected to other servers through a communications layer 901 and may send signals to and receive signals from them.

Figure 17:
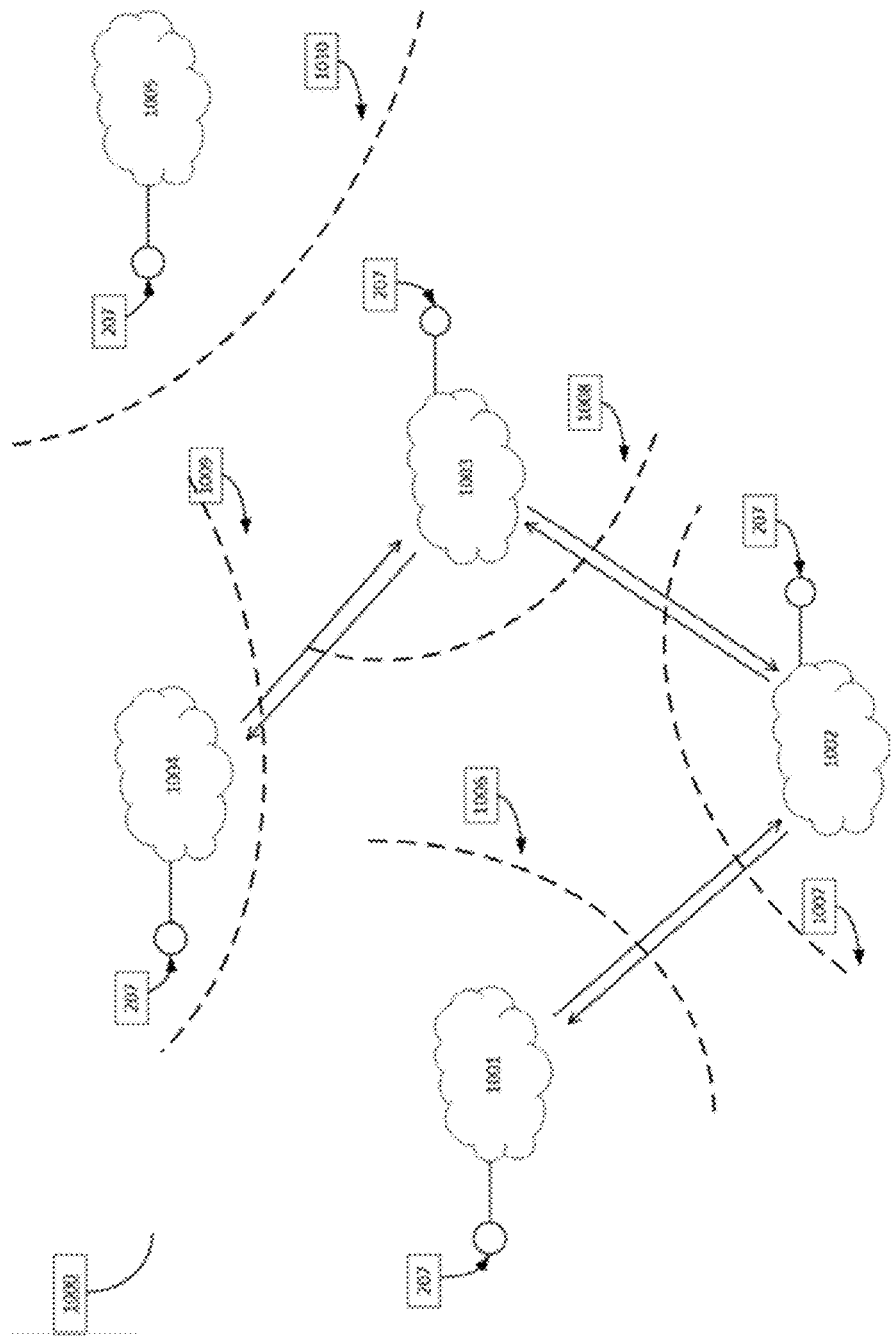
FIG. 17 is a diagram illustrating an example of multiple VEnvs, where several of the VEnvs may interact.

In some embodiments, Virtual Environments may be enabled to interact with one another. FIG. 17 is a diagram illustrating an example of multiple VEnvs (elements 1001, 1002, 1003, etc.), where several of the VEnvs may interact. A VEnv may be able to interact with one or more other VEnvs using a suitable interface 207, such as a Simple Object Access Protocol (SOAP) interface, Common Object Request Broker Architecture (CORBA) interface, Representational State Transfer (REST) interface, or other interface. Interaction among VEnvs may involve such actions as manipulating a HDLB in a remote VEnv, transmitting data to or receiving data from another VEnv, creating or destroying constructors, or similar actions.

In FIG. 17, a first VEnv 1001 communicates with a second VEnv 1002 through two boundaries 1006 and 1007. A boundary is a separation between two network segments, which is set by access and network traffic controls using routers and network gateways. The second VEnv 1002 communicates across boundaries 1007, 1008 to a third VEnv 1003. The third VEnv 1003 communicates through boundaries 1008, 1009 to a fourth VEnv 1004. A fifth VEnv 1005 exists behind a boundary 1010 and is not communicating to any other VEnv.

As an example use case, a VEnv may interact with another VEnv if a HDLB in one VEnv is requesting read or write access to a HDLB in the other VEnv. Another example use is when an actor who is accessing one VEnv is attempting to access a HDLB, a resource, or some other entity in another VEnv. If access to a resource or entity is controlled, then the actor will typically be required to supply correct credentials showing that it is authorized to access the entity in the other VEnv. Similarly, if one HDLB belonging to a given VEnv is attempting to access a resource or entity in another VEnv, then the HDLB will typically be required to show that it is authorized to access the resource or entity, if access to the resource or entity is controlled. The credentials supplied by the HDLB may, for example, consist of an actor name and password pair, a certificate based regime, or other suitable access control mechanism. Access control may be implemented in any suitable manner, including, an access control list (ACLs), Kerberos, or other security mechanisms that can limit access to resources or entities to those authorized.

In some embodiments, virtual environment perceptions may be combined with real-world perceptions to produce an augmented reality environment. Augmented reality is a technique wherein real-world information is combined with information from a virtual environment to provide greater context to real-world objects. For example, in certain embodiments of a VEnv, virtual entities may interact with information produced by entities outside of the VEnv.

Figure 18:
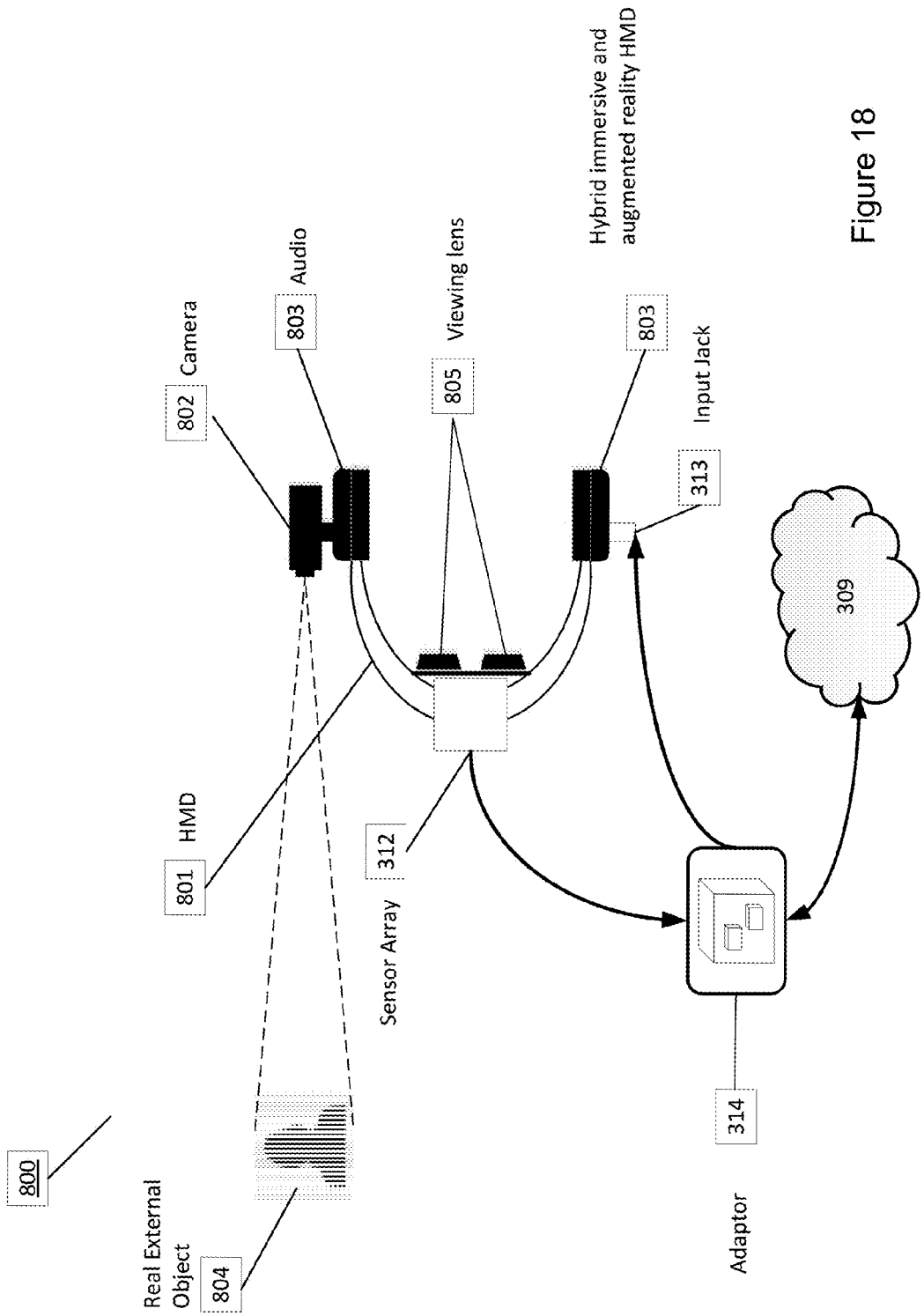
FIG. 18 is a diagram illustrating a system 800 wherein information from a source external to a virtual environment (VEnv 309) is combined with information generated, exposed, modified or used by a virtual entity, and is presented to a user who may act on the merged information if desired.

FIG. 18 is a diagram illustrating a system 800 wherein information from a source external to a virtual environment (VEnv 309) is combined with information generated, exposed, modified or used by a virtual entity (such as a HDLB), and is presented to a user who may act on the merged information if desired. Note that FIG. 18 illustrates one example of a configuration that may be used to present an augmented reality experience to an actor. The example shown in FIG. 18 includes a head mounted display (HMD) 801 connected to an embodiment of the inventive adaptor 314, which, in turn, is in communication with VEnv 309 that hosts virtual entity/HDLB. Adaptor 314 is connected to the HMD's input 313 and output ports 312. The HMD 801 is equipped with a sensor 802, such as a camera, that is capable of detecting a real world object 804. The device is able to combine data provided by VEnv 309 and data provided via camera 802 into virtual entity/HDLB to produce a merged data flow representation. This merged representation may then be presented to an actor through actor interfaces, such as viewing lenses 805, headphones 803 or other mechanisms capable of presenting a manifestation of virtual entity/HDLB to a user or actor.

Certain embodiments of the inventive system may also provide a method of locating a virtual entity in a virtual space. One example method of providing this capability is by constructing a central register identification system, which is shown in the data diagram of FIG. 19. Note that this example is for purposes of illustration and other systems may exist that can serve a similar function. In this example, a virtual entity has several key attributes including a universally unique VE identifier 501 (such as a universal unique identifier (UUID)), which has the characteristic that, with a high degree of probability, it is unique in the system. Another attribute of a virtual entity is a universal coordinate locator 502 that indicates a location of the HDLB in a virtual space.

In the example identification system of FIG. 19, a user input 507 is received that includes a HDLB alias 506, which is an actor readable name (e.g., a tag) for a universal unique identifier (UUID) 501. Each identifier may be associated with one or more aliases, but a single alias may be associated with only one UUID. A suitable data table 510 is maintained that associates a HDLB alias with a UUID 501. A second table 511 associates each UUID with a universal address 512 (a form of universal coordinate, similar in function to an IP address).

The universal coordinate identifies a location in N-dimensional virtual space where the HDLB corresponding to the HDLB alias may be found. Note that the universal coordinate may span multiple virtual environments. Thus, by providing a HDLB alias name, a user can obtain the virtual space 102 in which the HDLB 105 is instantiated.

In some examples of VEnvs, objects may be either addressable or non-addressable. Non-addressable objects do not have an identifier and cannot be manipulated. An example of a non-addressable object could be a background filler object, e.g. a decorative painting in a virtual room. Addressable objects, on the other hand, generally can be manipulated and are each associated with a UUID.

However, maintaining a central register of object coordinates may limit the scalability of certain VEnv implementations. Therefore, in some embodiments, there is no central register for addressing the virtual objects. Instead, each C-Core maintains a registry for the objects it contains. In this embodiment, each C-Core maintains its own co-ordinate system and the coordinates of an object are relative and not absolute. C-Cores are segmented into namespaces. In this embodiment, an object's address is the UUID of the C-Core that contains the object. Because there is no central register for all addresses, addressing is handled by the C-Cores themselves, which may improve scalability.

Figure 27:
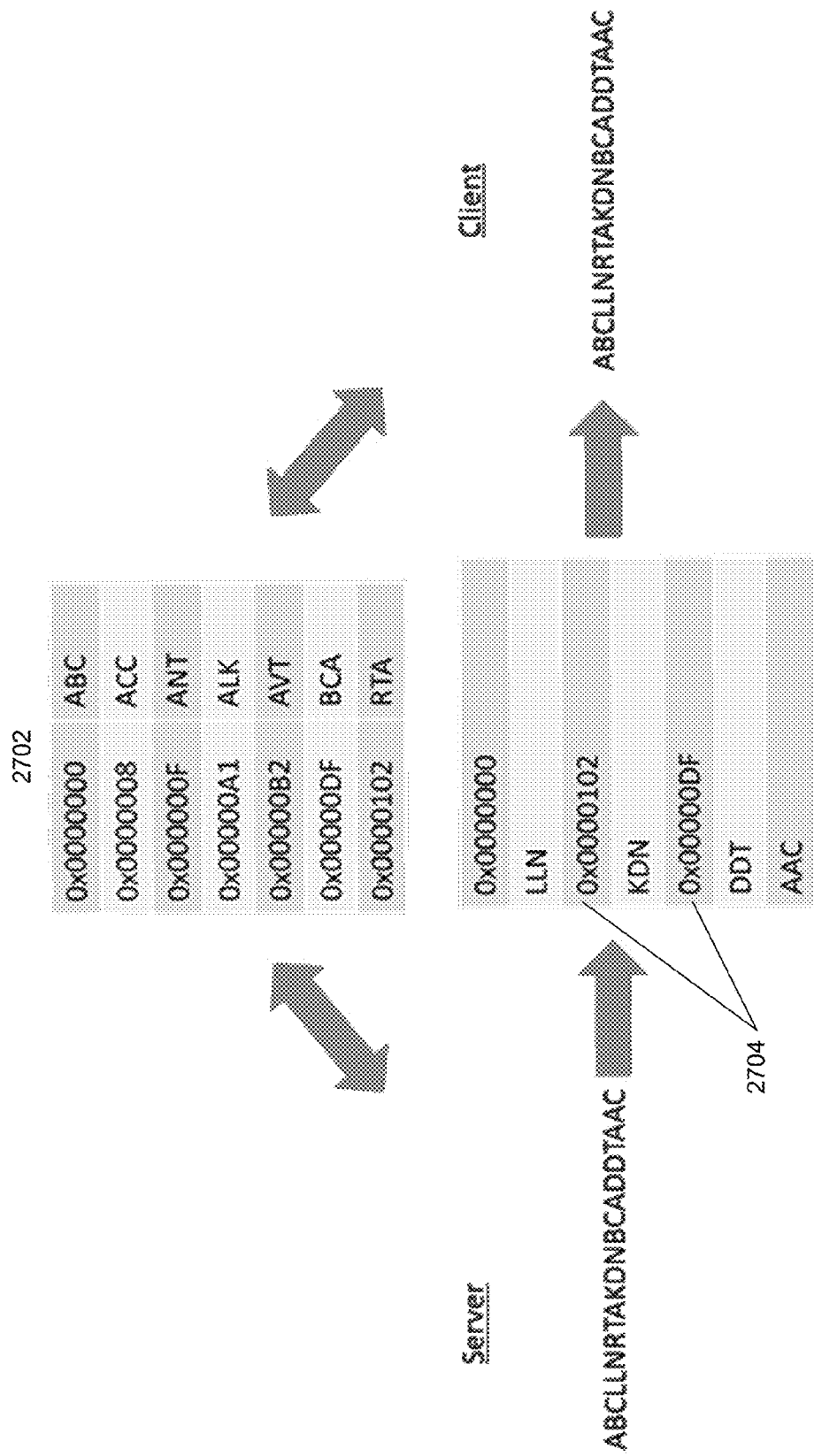
FIG. 27 is a diagram illustrating how a communication between two HDLBs may be optimized based on common state information in an implementation of an embodiment of the inventive system.

As shown in FIG. 27 (which is a diagram illustrating how a communication between two HDLBs may be optimized based on common state information), assume that two HDLBs want to send each other information. Suppose HDLB 1 performs a data analysis and determines that a certain set of sequences occurs "often" in its data, and so it stores it in a state file (as suggested by element 2702 in the figure). A second HDLB, HDLB 2 sends an event to HDLB 1. Normally, this would require sending an entire data sequence. However, if HDLB 1 & HDLB 2 communicate sufficiently in the course of the system operation, then they will share one or more of each other's state tables. As a result, the event message sizes can be decreased by replacing certain data sequences by a pointer to a sequence stored in the state table, and specifically sending data where such a pointer does not exist. Thus, in the example, HDLB 2 will perform a lookup in the shared table (2702), replace the appropriate sequences with pointers (2704), and then send the reduced sized event to HDLB 1.

The arrangement of C-Cores in the inventive system (in terms of their inter-communications capability) follows what is termed "a small world" pattern. This provides for an efficient mechanism for communications and search, as it means that the distance between any two nodes is proportional to log (N), where N is the number of C-Cores in the overall system/platform. This type of network architecture or pattern is formed as a result of the retransmission behavior of the network nodes—as one node receives and broadcasts a message to at least some of its surrounding nodes, the message ends up being made available to a much larger set of nodes at greater distances (i.e., hops) from the originating node. It also will naturally result in identifying certain focal points or "hub" nodes in the network; these are nodes that are positioned to provide the most efficient way to communicate with the largest number of network nodes.

As an example, in this type of communication system, C-Core A sends out a request to ten (10) other C-Cores that are registered in its routing tables. Each of these recipient C-Cores will then broadcast the request to another set (some of which are expected to differ from those sent the request by C-Core A). This iterative process continues until a larger number of C-Cores are made aware of the request/message. Further, because of the small world network characteristic, all C-Cores are reachable and will receive the request. Because some of the C-Cores are "heavy hitters" (a property of small world networks), in that they are aware of a relatively large number of C-Cores, in the end the longest route (the number of hops) will be less than Log(N), where N is the number of nodes.

Figure 21:
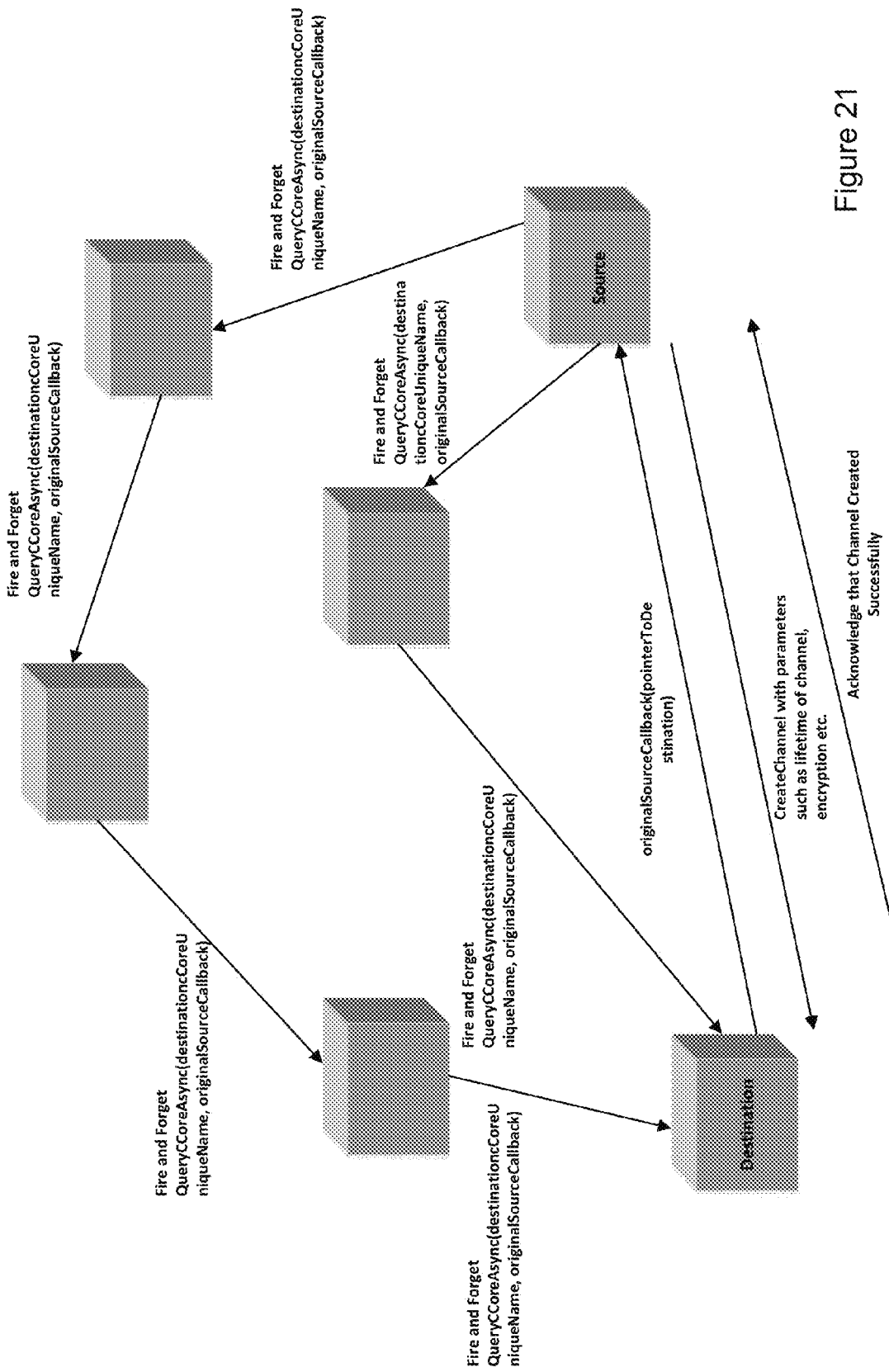
FIG. 21 is a diagram illustrating an example of a messaging sequence used to establish a communication channel between a source C-Core and a destination C-Core.

A routing table may itself be formed as a result of receiving and fulfilling a query request. In this example, a C-Core is looking for a particular HDLB; to find the HDLB, it broadcasts a request to the C-Cores in its routing table (i.e., its "known" C-Cores). The recipient C-Cores in turn broadcast the request to their known C-Cores, until the request reaches the C-Core that contains the HDLB being searched for. The C-Core containing the HDLB (the endpoint C-Core) then sends a return signal back to the originating C-Core, notifying the originating C-Core that the endpoint C-Core contains the HDLB being searched for (aspects of this communications process are illustrated in FIG. 21). The endpoint C-Core (the one that contained the HDLB) then stores the originating C-Core address in its routing table and vice versa.

In one sense, a non-centralized addressing model works by partitioning off the space of C-Cores into alpha C-Cores. The alpha C-Cores are small in number and these are the addresses that are stored in a limited central registry. When a request enters the VEnv, it will go initially to an Entry Point alpha C-Core. There may be multiple alpha C-Core entry points for a request and requests may go to multiple alpha C-Core entry points. Each entry point C-Core has information about a few nearby peer C-Cores. Each of those C-Cores has information about a few more nearby peer C-Cores and so on, such that the virtual space is linked together.

Figure 20:
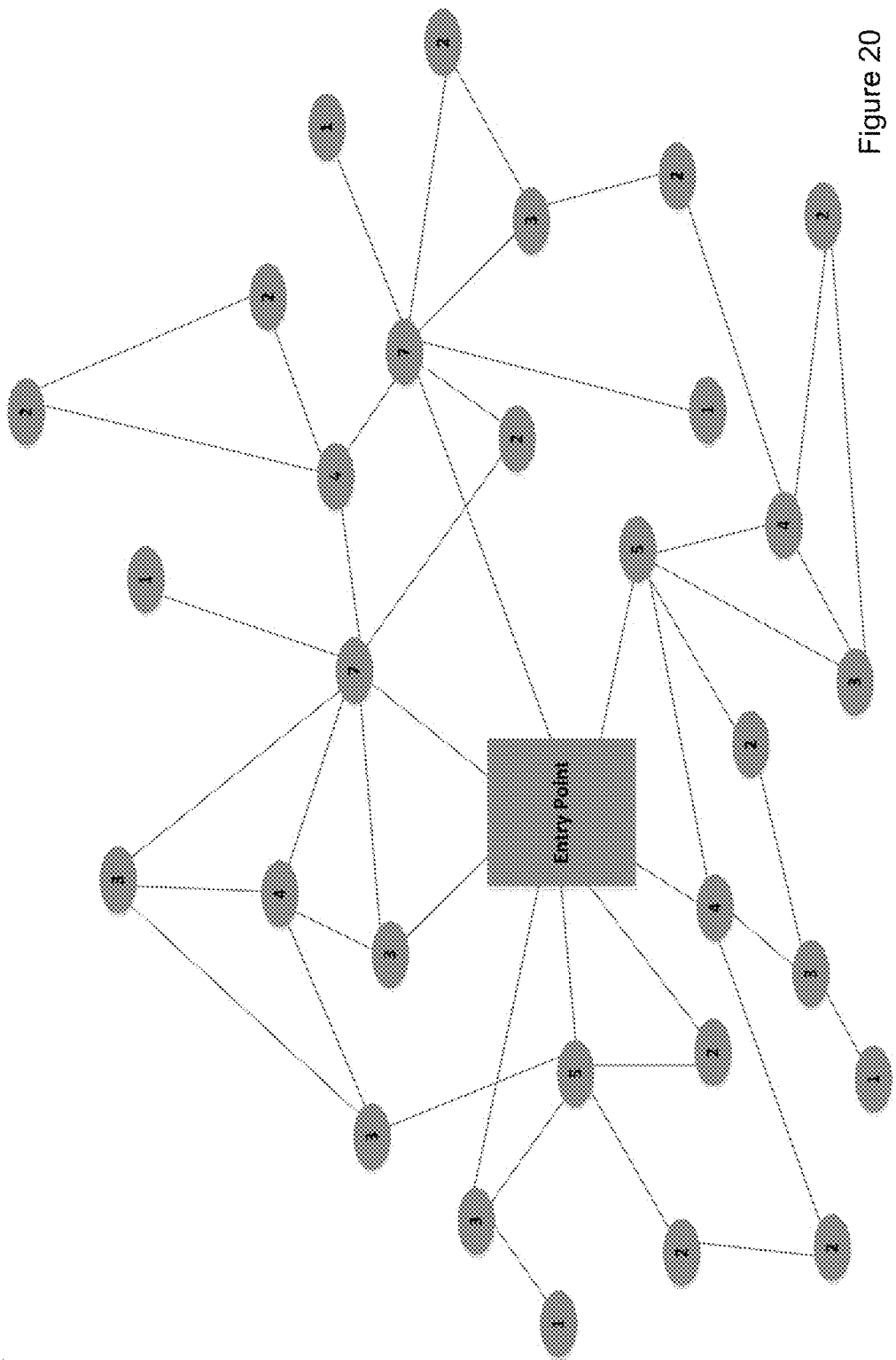
FIG. 20 is a diagram illustrating an example of a network of interconnected C-Cores.

FIG. 20 is a diagram illustrating an example of a network of C-Cores that are interconnected in this small world pattern manner. As noted, this is an efficient mechanism for search as it means that the distance from any two nodes is proportional to log (N), where N is the number of C-Cores in the VEnv. If a C-Core sends a message to another C-Core, then it will go through a process where it will send the message to its peers, who will send it to their peer C-Cores and so on, until the message arrives at its intended destination. When the message reaches the destination, the destination makes a "callback" to the original message sender with a pointer to itself. The original message sender caches the pointer so that a message can be sent directly to the destination the next time. If the two C-Cores have not communicated for some period of time, then the pointer may be removed from the cache.

FIG. 21 is a diagram illustrating an example of a messaging sequence used to establish a communication channel between a source C-Core and a destination C-Core. In this example, a Source C-Core with a message for a Destination C-Core sends an asynchronous C-Core query to the two C-Cores to which the source C-Core is linked. These messages take the form "QueryC-CoreAsync(destinationCoreUniqueName, originalSourceCallback)", which includes the UUID of the destination C-Core and requests a callback message to the Source C-Core. Each of the linked C-Cores forwards the message to its linked C-Cores until the message reaches the Destination C-Core. The Destination C-Core responds to the message with a Callback message to the original Source C-Core that contains a pointer to the Destination C-Core. The Source C-Core uses the pointer to the Destination C-Core to send a Create Channel message to the Destination C-Core that may include parameters for the channel, such as the lifetime or encryption method for the channel. The Destination C-Core sends an acknowledgement that the channel was created successfully. The channel may then be used for messaging between the Source and Destination C-Cores.

Figure 22:
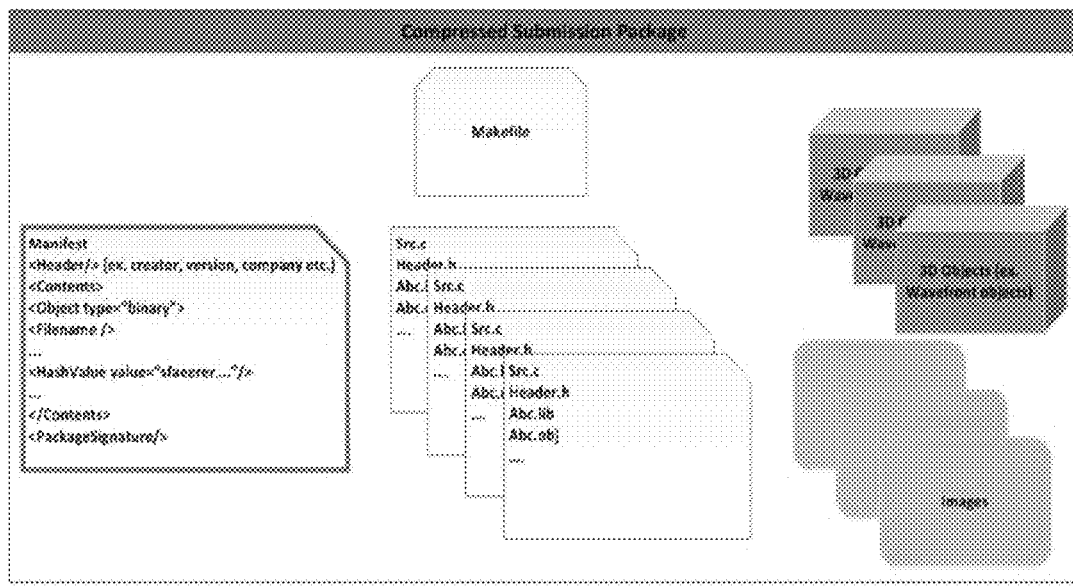
FIGS. 22 and 23 illustrate examples of a compressed submission package that may be used to describe a C-Core or a Module for use in an embodiment of the inventive system.
Figure 23:
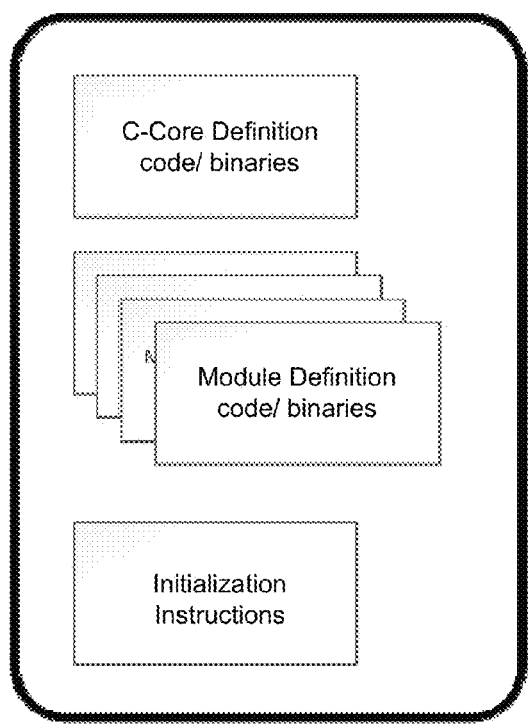

As noted, an independent development environment (IDE) may be provided for use with some examples of the inventive system. In such an embodiment, when a user first submits code or binaries to the system, certain basic evaluation processes may be performed and then the C-Core is created inside a sandbox. Code or binaries are typically submitted in compressed submission packages with manifests. Packages can describe either C-Cores or Modules. There are typically separate interfaces and libraries for creating modules and for creating C-Cores. FIGS. 22 and 23 illustrate examples of a compressed submission package that may be used to describe a C-Core or a Module for use in an embodiment of the inventive system. To register as a C-Core definition, the C-Core object is capable of supporting the C-Core interfaces. A single C-Core is included in each submission. Similarly, Modules support a certain set of libraries that enable event handling, data access, and other functionality.

Once a C-Core has been created, the Modules are loaded into the C-Core using a native function call that is inaccessible from the C-Core itself. In addition to the C-Core and Module definitions, an initialization file is included. The initialization file (the "init" file) is executed by the sandbox, which "activates" the C-Core. The C-Core itself typically does not require a user defined initialization routine and, as soon as it is compiled, the C-Core may be launched. Modules, however, may require logic to initialize, such as the creation of data files, system parameters, file locations, or other resources.

The initialization file is generally not needed once the C-Core is active. If the C-Core is unloaded or deactivated, then its state is saved in a binary file that is read again when the C-Core is (re)activated or "thaws". If a new module is added to the C-Core, then an initialization file generally needs to be included. If a Module needs to be replaced, then for a short period of time, the existing Module may exist side-by-side with the new Module (its replacement) until it has handled all events that were in its queue. New events are handled by the new Module. This may enable a seamless replacement of Modules or functionality. If a C-Core needs to be replaced, then a new sandbox is typically generated with the new C-Core. Data from the old C-Core is then copied to the new one. Once the copy is completed, all new requests will go to the new C-Core, although there may be a lag period while the C-Core transition occurs.

Note that typically, a user cannot independently create a HDLB; a HDLB has to be created by a Module within an active C-Core. If the Module disappears, then the created HDLB persists. If new versions of the Module are created, two things may happen. The first is that the HDLBs created by the new Module will generate HDLBs that produce update events that contain microcode to update all the other HDLBs created by the older version of the Module, as described with reference to FIG. 4(d). The second possible occurrence is that there may be an instruction that the older HDLBs should not be updated.

As mentioned, a VEnv may pre-define standard events that serve as a common language for the VEnv. Examples of pre-defined standard events may include RotateLeftEvent, RotateRightEvent, and MoveForward. These events are typically instructions that are handled by Modules. Generally, Modules will understand how to deal with the event messages defined for the VEnv system that they may receive. Each of these events may also be associated with parameters. For example, RotateLeftEvent may include a parameter specifying how many degrees to the left. The events defined for a VEnv may be viewed as "elementary events" and each Module may be enabled to process them, although some Modules may be configured such that they do not implement a response to the event. Events from a user device are generally streamed because there will be a standard flow of them. The events are generally sent out at regular intervals and are serialized.

Events are generally extensible; for example, events need not be simple "dumb packets", but may contain instructions that are written in a standard Event Handling Language. These instructions inform the receiving HDLB how to handle the data contained within the HDLB. In one embodiment, the event handling language may be a simple scripting language. As is discussed further below with respect to user management, when a user accesses a C-Core for the first time, a data "blob" may be created that contains user data for that specific C-Core. The data blob may also contain a data handler that is able to understand incoming data, where the data handler executes the instructions contained in the events. For example, a C-Core may have specific sets of behaviors that are unique to that C-Core. The data handlers are defined in the C-Core code and enable instructions to be broken down into elementary events. The following is one example of the instructions for a "DingEvent":

GetDingExecutionSequence( )→DingSequenceArray[,,];
while(DingSequenceArray[x,y,z])
  MoveLeft $x;
  MoveUp $y;
  MoveDown $z.

As mentioned, users own all HDLBs that have been assigned to them as well as the HDLBs that have been created through their HDLBs. As such a user may be billed by a service platform for all of the resources used by their HDLB. If a HDLB does not perform complex logic that requires a lot of computation, then the cost for that HDLB is relatively low; if, on the other hand, their HDLB consumes a lot of resources, then they are billed for the resources used (after consideration of any premiums or discounts). Additionally, users may be charged to host a C-Core and the resources that the C-Core uses.

Note that an embodiment of the inventive system may be configured to span multiple private and public domains. For example, a given company could choose to host an instance of a virtual environment (VEnv) that is private and is not viewable from the rest of the system. There can also be public domains that are open to the public. An instance can be secured using local LDAP and other security/authentication measures, with each instance being associated with a unique 128 bit identifier. Typically, the virtual spaces are application spaces that provide for the creation and subsequent behavior of virtual entities that may or may not have characteristics that enable a user to interact with them. Virtual entities interact with each other and users/actors through events, where an actor may be a special type of virtual entity that represents a physical entity (i.e., something tangible that exists in the real world).

As described, in some embodiments, there is no centralized platform resident logic that controls the behavior of the virtual entities/HDLBs within a virtual environment. This is an intentional feature of the inventive system, and one that provides significant benefits, including autonomy, efficient information transfer, and scalability. Thus, in some cases, the source of active functionality is that of an HDLB's own programmed logic. This makes the system highly decentralized with no central addressing system, and no implied logic beyond ensuring the availability of certain computational and processing resources (e.g., CPU, memory, data storage) when needed.

As a result of the decentralized architecture and semi- or fully autonomous entities, embodiments of the inventive system are capable of exhibiting new behavior and accomplishing tasks in a scalable and more efficient manner than conventional systems. As noted, one aspect is the formation of a "small world" network by the HDLBs with interactions between HDLBs being governed by "events" that can include or represent one of three actions/functions: Notify, Query, or Execute. This means that the network is capable of being searched in a relatively efficient manner, as an HDLB queries its known HDLBs, they query their known HDLBs in turn, and so on. This ensures a Log (N) search capability. It also means that a microcode update can spread exponentially through the system to repair code, patch a security flaw, update the capabilities of one or more HDLBs, etc.

In some embodiments, HDLBs can represent programmable logic, media (e.g., videos, pictures, etc.) along with associated media metadata, or self-assembling blocks/elements that can create more complex structures as a result of signaling to each other and performing a type of self-organization. Examples of this self-organizing behavior may include the construction of large scale simulations, the formation of engineering components (such as aircraft parts) from constituent elements, etc.

A virtual entity (such as a HDLB) may represent data to a user or it may operate without a user being present. As noted, a HDLB could be an autonomous entity that operates without user interactions or the generation of user comprehensible output. In other cases, the HDLB can represent 2D, 3D, or 4D data (e.g., touch, smell, etc.); it can represent mathematical and other computations in a simulation form, or in the form of an application involving some human interaction.

Note that besides uses in gaming or visualizations of 3-dimensional environments, the inventive data nodes/HDLBs can be used for other applications in which it is important to model the development of a network of autonomous or semi-autonomous entities. These include, for example:

Simulation of disease propagation, economics (capital markets, stock markets, etc.), ecology, political decision making, and other phenomenon involving large interconnected systems—in these examples, event propagation and data node behavior may be modified based on events or classes of events;

Artificial intelligence applications in which it is important to utilize an ability to self-organize and process complex information locally at a node;

Scalable parallel computation systems in which nodes distributed across multiple servers or platforms are interconnected and cooperative; and Search engines and search methods in which active nodes can be used to discover, filer, and interpret information located within a larger network of data (such as web pages, documents, etc.).

As described herein, in some embodiments, the inventive system and methods may include one or more of the following aspects, elements, or processes:

1. A set of intelligent, portable, programmable, organizeable, searchable, and interactive data processing and data containing nodes that are capable of participating in complex operations, self-organizing, continuously optimizing, exhibiting "gestalt" behavior, performing distributing processing operations, and self-updating;
2. A runtime model based on event propagation and behavior dissemination between nodes;
3. Use of processes to reduce data traffic and server computational requirements for a highly interactive, data intense service using client side artificial intelligence techniques;
4. An improved data search capability using "smart data" capable of searching itself and communicating the results to the searching entity and to small world networks; and
5. An immersive operating system capable of creating an interconnected set of immersive application domains with distinct functionality, security, and computational (I/O, processing power, memory) requirements that are capable of providing data-intense, real-time interaction with users.

In accordance with at least one embodiment of the invention, the system, apparatus, methods, processes and/or operations for creating, administering, and interacting with virtual entities within one or more virtual environments may be wholly or partially implemented in the form of a set of instructions executed by one or more programmed processors, such as a central processing unit (CPU) or microprocessor. Such processors may be incorporated in an apparatus, server, client or other computing device or platform operated by, or in communication with, other components of the system.

Figure 25:
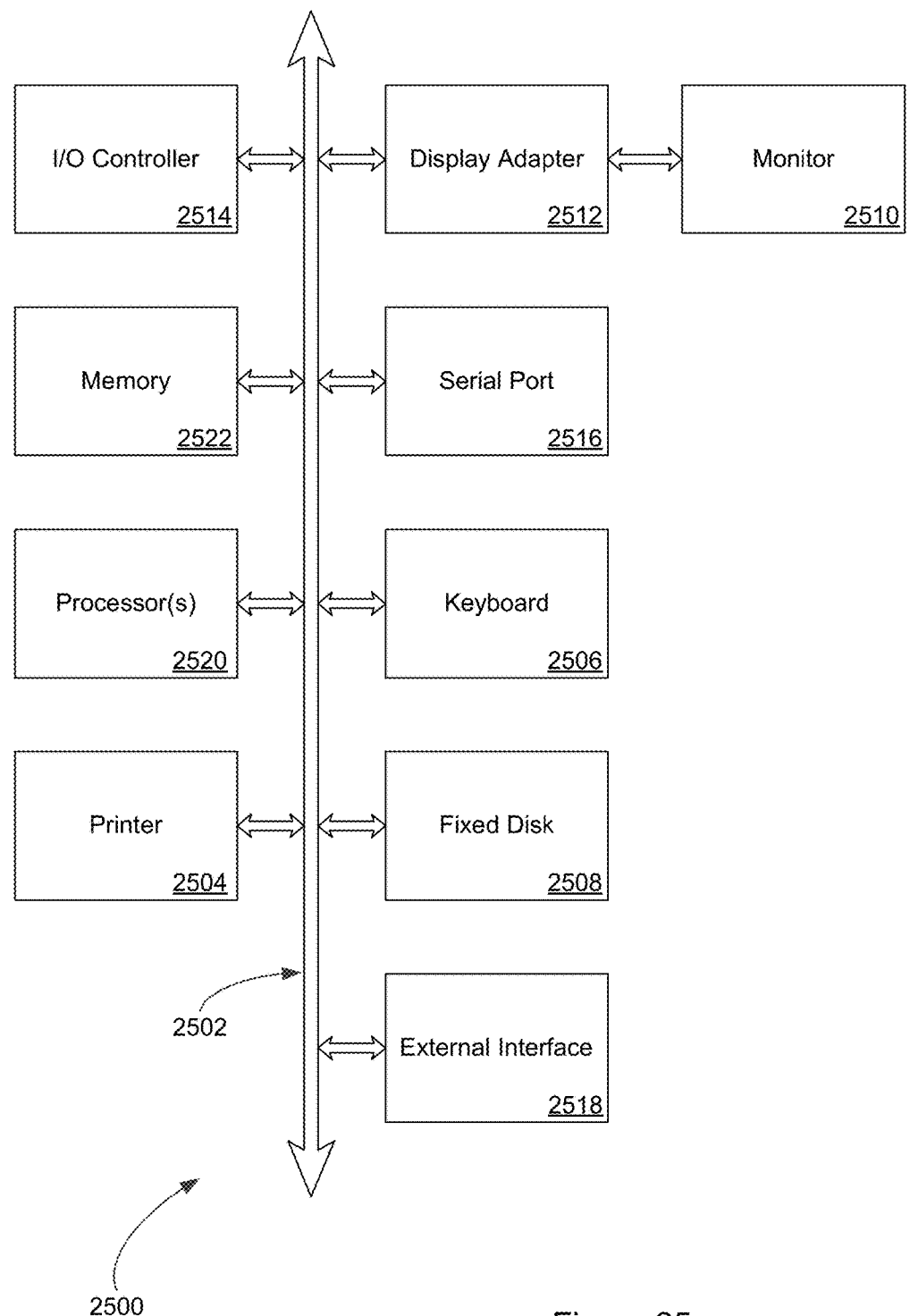
FIG. 25 depicts elements that may be present in a computer device and/or system 2500 configured to implement a method and/or process in accordance with some embodiments of the present invention.

As an example, FIG. 25 depicts aspects of elements that may be present in a computer device and/or system 2500 configured to implement a method and/or process in accordance with some embodiments of the present invention. The subsystems shown in FIG. 25 are interconnected via a system bus 2502. Additional subsystems include a printer 2504, a keyboard 2506, a fixed disk 2508, and a monitor 2510, which is coupled to a display adapter 2512. Peripherals and input/output (I/O) devices, which couple to an I/O controller 2514, can be connected to the computer system by any number of means known in the art, such as a serial port 2516. For example, the serial port 2516 or an external interface 2518 can be utilized to connect the computer device 2500 to further devices and/or systems not shown in FIG. 25 including a wide area network such as the Internet, a mouse input device, and/or a scanner. The interconnection via the system bus 2502 allows one or more processors 2520 to communicate with each subsystem and to control the execution of instructions that may be stored in a system memory 2522 and/or the fixed disk 2508, as well as the exchange of information between subsystems. The system memory 2522 and/or the fixed disk 2508 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A virtual environment system for providing access to virtual entities for multiple users, the system comprising at least one server configured to:
   communicatively connect to at least one communication network, the communication network providing communication to user devices for interfacing with virtual entities in the virtual environment system;
   support a kernel environment that controls at least one of a physics engine, a gaming engine, a rendering engine, data input and output, a runtime, database access, and storage access;
   support a core data structure having modules, wherein each module corresponds to a virtual entity and includes behavior logic and representational data for the corresponding virtual entity;
   create a virtual entity by instantiating the core data structure, creating a foundation runtime for the core data structure configured to execute the behavior logic imparted by the module corresponding to an entity to the entity, and communicate with other core foundation runtimes;
   support event messaging between a first and a second virtual entity and between a virtual entity and the virtual environment by, responsive to detecting an event message, identifying an instantiated core data structure to which the event message is registered, forward the event message to the identified core; and process the event message in accordance with logic defined in the core data structure for handling the received event message;
   render representational data for the virtual entity for presentation to at least one user external to the virtual environment; and
   provide at least one interface for the one user to perceive the virtual entity.

2. The virtual environment system of claim 1, where the system is further configured to provide at least one capability to allow virtual environments originating from different sources or platforms to interact with one another.

3. The virtual environment system of claim 1, where the system is further configured to provide at least one capability to allow a virtual entity to navigate between disparate unrelated virtual environments.

4. The virtual environment system of claim 1, wherein the created virtual entity is associated with an electronically stored data structure, and further, wherein the associated data structure includes an event handler, executable logic, and data storage.

5. The virtual environment system of claim 4, wherein the event handler operates to detect an event emitted by another entity or by the virtual environment, and in response to determine if the detected event is directed to the created virtual entity.

6. The virtual environment system of claim 5, wherein if the detected event is directed to the created virtual entity, then the created virtual entity processes the event by extracting microcode contained within the event.

7. The virtual environment system of claim 6, wherein the extracted microcode is executable by the created virtual entity and operates to alter the executable logic of the created virtual entity.

8. The virtual environment system of claim 7, wherein the extracted microcode functions to correct an error in the current executable logic of the created virtual entity or to alter the functionality of the created virtual entity.

9. The virtual environment system of claim 8, wherein the error is a security flaw within the executable logic.

10. The virtual environment system of claim 5, wherein the detected event is one of a query, a notification, or an executable.

11. The virtual environment system of claim 4, wherein the data structure associated with a created virtual entity includes executable logic that enables the created virtual entity to perform a specified task.

12. The virtual environment system of claim 11, wherein the specified task includes representing the behavior of a real entity external to the virtual environment.

13. The virtual environment system of claim 1, wherein a module is operable to be used to generate one or more virtual entities.

14. The virtual environment system of claim 1, wherein the virtual environment is a representation of one of an economic system, a communications system, a transportation system, or a social group.

15. The virtual environment system of claim 1, wherein the system is configured to cause the dissemination of an event, message, or microcode among a plurality of virtual entities in accordance with a Log (N) behavior, where N is the number of entities.

16. The virtual environment system of claim 1, wherein the kernel environment supports one or more of an executable model of an interaction between a first virtual entity and a second virtual entity or an executable model of an interaction between a virtual entity and a feature of the virtual environment.

17. The virtual environment system of claim 1, wherein the kernel environment supports an executable process to optimize the transfer of data between the virtual environment system and a device operated by a user.

18. The virtual environment system of claim 17, wherein the executable process to optimize the transfer of data includes one or more of a process or sub-process to determine a conditional probability between a plurality of pairs of events occurring within the system for generating the virtual environment, a process or sub-process to generate a prediction of an event or events likely to occur within the system based on the conditional probabilities, and a process or sub-process to pre-compute the expected response or responses to the predicted event or events.

* * * * *